United States Patent
Ueda et al.

(10) Patent No.: US 11,223,101 B2
(45) Date of Patent: *Jan. 11, 2022

(54) ANTENNA DEVICE, ANTENNA MODULE, AND COMMUNICATION APPARATUS

(71) Applicant: Murata Manufacturing Co., Ltd., Kyoto (JP)

(72) Inventors: Hideki Ueda, Kyoto (JP); Shinya Mizoguchi, Kyoto (JP); Tsubasa Nishida, Kyoto (JP); Shinichiro Banba, Kyoto (JP); Osamu Yamaguchi, Kyoto (JP); Akihiro Muranaka, Kyoto (JP); Koji Yasojima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,660

(22) Filed: Mar. 12, 2020

(65) Prior Publication Data
US 2020/0295436 A1    Sep. 17, 2020

(30) Foreign Application Priority Data

Mar. 12, 2019  (JP) .............................. JP2019-044895
Dec. 19, 2019  (JP) .............................. JP2019-229208

(51) Int. Cl.
*H01Q 1/38*   (2006.01)
*H01Q 1/22*   (2006.01)
(Continued)

(52) U.S. Cl.
CPC ......... *H01Q 1/2283* (2013.01); *G02B 27/017* (2013.01); *H01Q 1/38* (2013.01);
(Continued)

(58) Field of Classification Search
CPC ........ H01Q 1/2283; H01Q 5/357; H01Q 1/38; H01Q 9/0407; H01Q 9/30; H01Q 19/005; H01Q 21/30
See application file for complete search history.

(56) References Cited

U.S. PATENT DOCUMENTS

2005/0001768 A1   1/2005  Sekiguchi et al.
2005/0062650 A1   3/2005  Furuno et al.
(Continued)

FOREIGN PATENT DOCUMENTS

JP    H07-288422 A   10/1995
JP    H11-88040 A    3/1999
(Continued)

*Primary Examiner* — Graham P Smith
(74) *Attorney, Agent, or Firm* — Pearne & Gordon LLP

(57) ABSTRACT

A radiation conductor is constructed of a metal plate having a pair of main surfaces pointing in opposite directions. Each main surface of the pair of main surfaces includes a first surface region that includes at least part of a peripheral edge portion of the main surface. At least one main surface of the pair of main surfaces includes a second surface region that is a region other than the first surface region. A dielectric member holds the radiation conductor in such a manner that the first surface region of each main surface of the pair of main surfaces is sandwiched between portions of the dielectric member in a thickness direction of the radiation conductor. A housing supports and accommodates the dielectric member. The second surface region of the at least one main surface is exposed.

20 Claims, 49 Drawing Sheets

(51) Int. Cl.
*H01Q 21/30* (2006.01)
*G02B 27/01* (2006.01)
*H01Q 9/04* (2006.01)
*H01Q 9/30* (2006.01)
*H01Q 19/00* (2006.01)
*H01Q 5/357* (2015.01)

(52) U.S. Cl.
CPC ........... *H01Q 5/357* (2015.01); *H01Q 9/0407* (2013.01); *H01Q 9/30* (2013.01); *H01Q 19/005* (2013.01); *H01Q 21/30* (2013.01)

(56) References Cited

U.S. PATENT DOCUMENTS

2007/0115177 A1    5/2007  Kawahata et al.
2012/0306721 A1*  12/2012  Okegawa ............. H01Q 9/0442
                                                        343/905

FOREIGN PATENT DOCUMENTS

| JP | 2002-335115 A | 11/2002 |
| JP | 2004-048471 A | 2/2004 |
| JP | 2005-086788 A | 3/2005 |
| JP | 3855270 A | 9/2006 |
| JP | 2013-046291 A | 3/2013 |
| WO | 2005/055364 A1 | 6/2005 |

\* cited by examiner

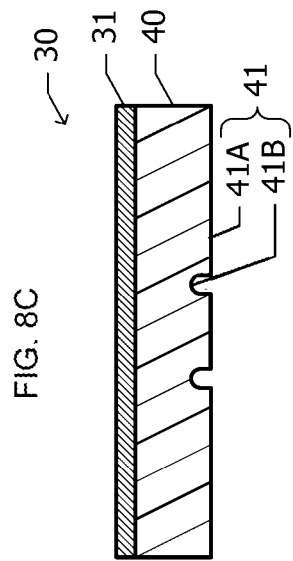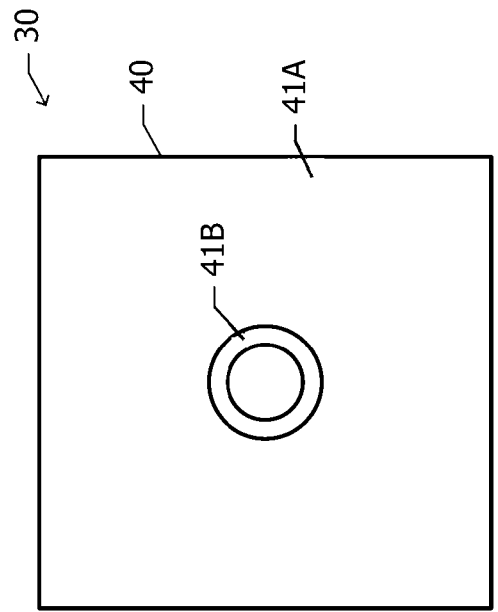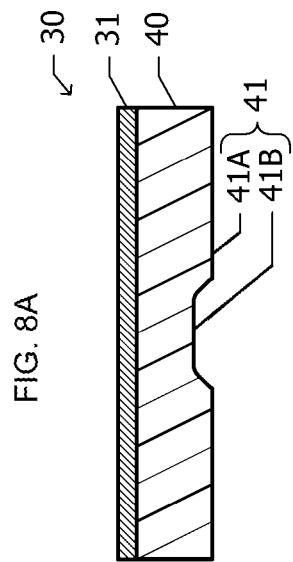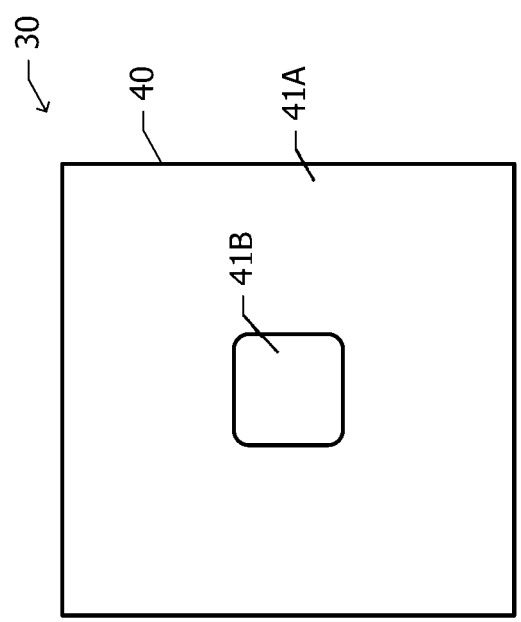

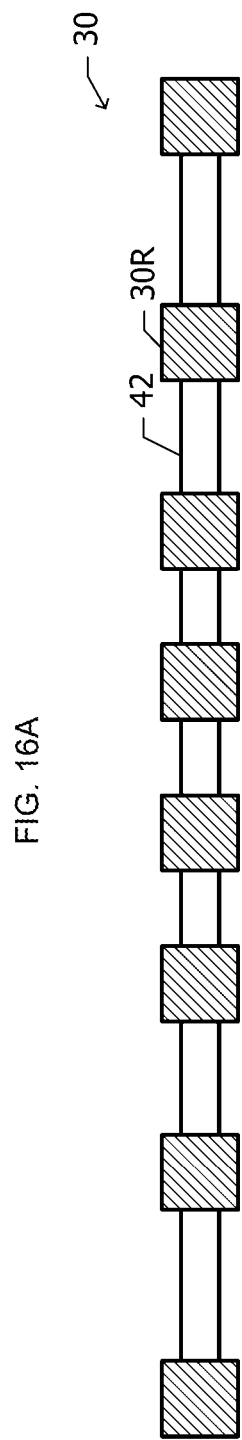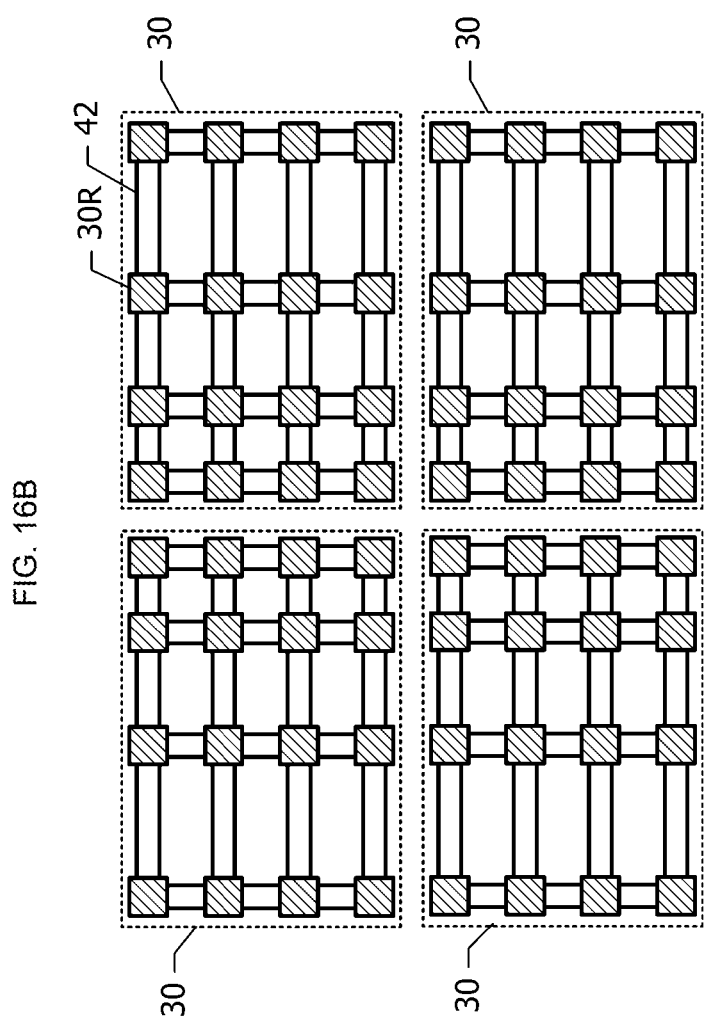

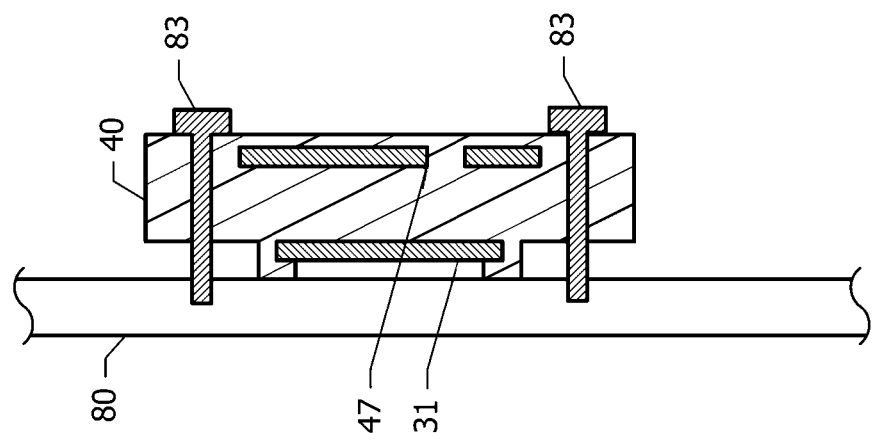
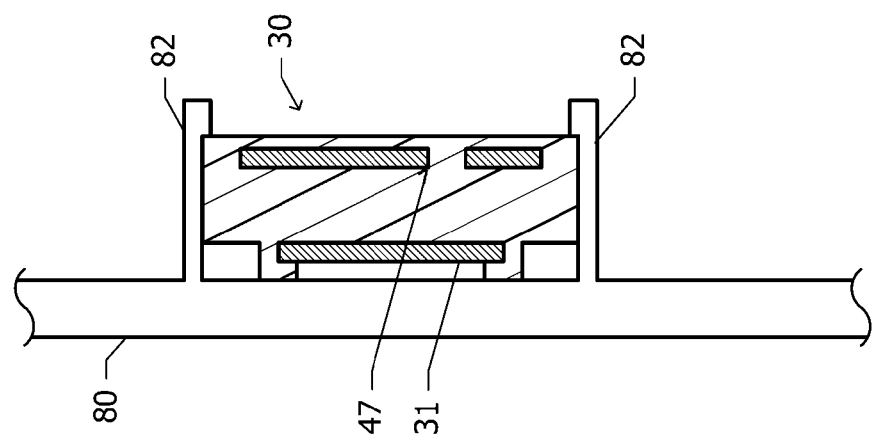

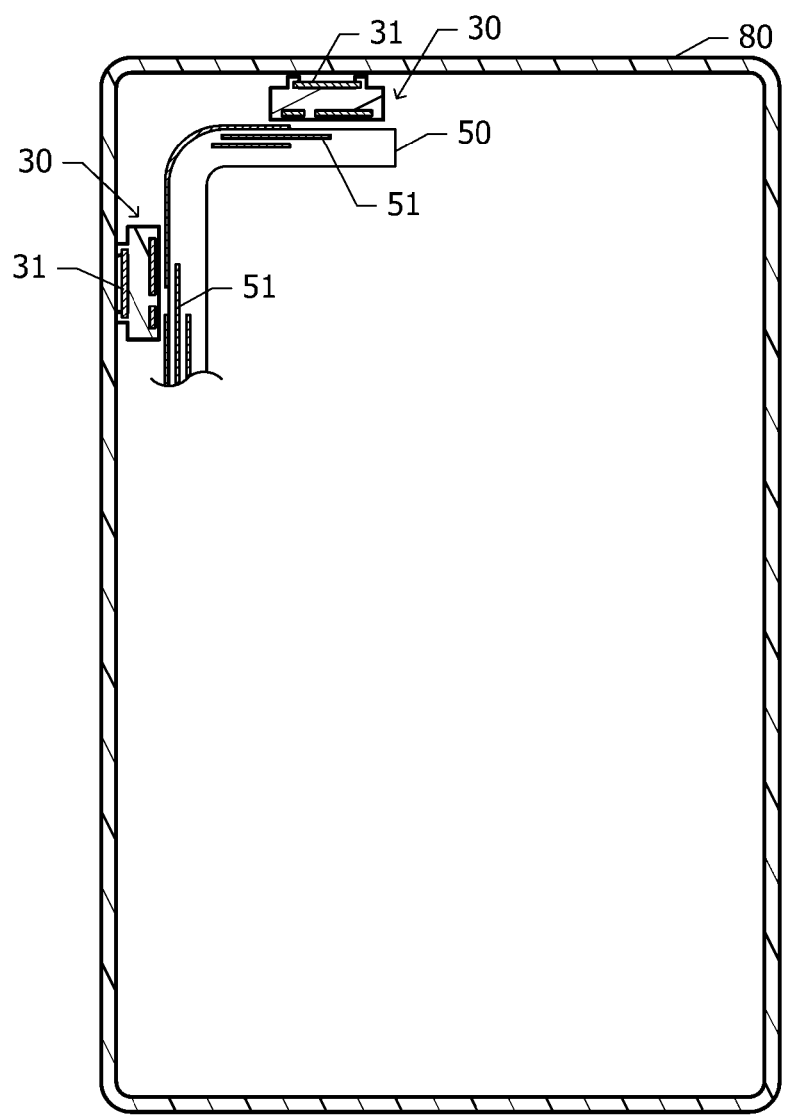

ANTENNA DEVICE, ANTENNA MODULE, AND COMMUNICATION APPARATUS

This application claims priority from Japanese Patent Application No. 2019-044895 filed on Mar. 12, 2019 and Japanese Patent Application No. 2019-229208 filed on Dec. 19, 2019. The content of these applications are incorporated herein by reference in its entirety.

BACKGROUND OF THE DISCLOSURE

1. Field of the Disclosure

The present disclosure relates to an antenna device, an antenna module, and a communication apparatus.

2. Description of the Related Art

A known antenna module includes a radio-frequency integrated circuit element mounted on a multilayer wiring board (mounting substrate) provided with a radiation conductor and including a ground conductor of an antenna (see, for example, Japanese Unexamined Patent Application Publication No. 2013-46291). The ground conductor is disposed in the mounting substrate as an inner layer thereof, and the radiation conductor is disposed on the mounting substrate with a dielectric layer therebetween. The radio-frequency integrated circuit element and the radiation conductor mounted on the mounting substrate are connected to each other via a feeder included in the mounting substrate.

The antenna characteristics of the antenna including the radiation conductor and the ground conductor vary depending on the positional relationship (e.g., the spacing) between the radiation conductor and the ground conductor. The antenna characteristics also vary depending on the dielectric constant in the region around the radiation conductor and the ground conductor. When the ground conductor is disposed in the mounting substrate as an inner layer thereof and the radiation conductor is disposed on the mounting substrate as a surface layer thereof, the dimensions (e.g., the thickness) of the mounting substrate constitute a constraint on allowable spacing between the ground conductor and the radiation conductor, and the dimensions of an antenna device having this configuration are limited accordingly. The dielectric constant in the region around the radiation conductor and the ground conductor varies depending on the dielectric constant of the mounting substrate.

BRIEF SUMMARY OF THE DISCLOSURE

It is an object of the present disclosure to provide an antenna device having a configuration that offers a high degree of flexibility in design concerning the dimensions and the dielectric constant of the antenna device by eliminating or reducing constraints arising from the dimensions and the dielectric constant of the mounting substrate.

According to an aspect of the present disclosure, an antenna device includes a radiation conductor, a dielectric member, and a housing. The radiation conductor is constructed of a metal plate having a pair of main surfaces pointing in opposite directions. Each main surface of the pair of main surfaces includes a first surface region that includes at least part of a peripheral edge portion of the main surface. At least one main surface of the pair of main surfaces includes a second surface region that is a region other than the first surface region. The dielectric member holds the radiation conductor in such a manner that the first surface region of each main surface of the pair of main surfaces is sandwiched between portions of the dielectric member in a thickness direction of the radiation conductor. The housing supports and accommodates the dielectric member. The second surface region of the at least one main surface is exposed.

In this configuration, the second surface region of the radiation conductor is not sandwiched between portions of the dielectric member and is exposed. The dielectric constant in the region around the radiation conductor may be lower in this configuration than in a comparative configuration in which the second surface region is covered with the dielectric member. The wavelength shortening effect may be reduced when the dielectric constant in the region around the radiation conductor is lower. At a given resonant frequency, the radiation conductor may have dimensions greater than the dimensions of the radiation conductor having the comparative configuration. Owing to the radiation conductor having greater dimensions, a higher antenna gain is achievable. A resonator including the radiation conductor having greater dimensions has a low Q, and a wider operating frequency band is thus achievable.

According to another aspect of the present disclosure, an antenna module includes the antenna device and a radio-frequency integrated circuit element. The radio-frequency integrated circuit element is accommodated in the housing to supply radio-frequency signals to the radiation conductor or to receive radio-frequency signals from the radiation conductor.

According to still another aspect of the present disclosure, a communication apparatus includes the antenna module and a baseband integrated circuit element. The baseband integrated circuit element is accommodated in the housing to supply intermediate-frequency signals or baseband signals to the radio-frequency integrated circuit element.

Other features, elements, characteristics, and advantages of the present disclosure will become more apparent from the following detailed description of preferred embodiments of the present disclosure with reference to the attached drawings.

BRIEF DESCRIPTION OF THE SEVERAL VIEWS OF THE DRAWINGS

FIG. 8A is a sectional view of an antenna device in Modification 1 of Example 6;

FIG. 8B is a bottom view of the antenna device in Modification 1 of Example 6;

FIG. 8C is a sectional view of an antenna device in Modification 2 of Example 6;

FIG. 8D is a bottom view of the antenna device in Modification 2 of Example 6;

FIG. 16A is a schematic plan view of an antenna device in a modification of Example 11;

FIG. 16B is a schematic plan view of an antenna device in another modification of Example 11;

FIG. 27A is a sectional view of an antenna module, illustrating the state in which an antenna device in a modification of Example 17 is fitted on a frame of a housing of a communication apparatus;

FIG. 27B is a sectional view of an antenna module, illustrating the state in which an antenna device in another modification of Example 17 is fitted on a frame of a housing of a communication apparatus;

FIG. 29 is a schematic sectional view, illustrating the state in which an antenna device in another modification of Example 18 is fitted on a frame of a housing of a communication apparatus;

DETAILED DESCRIPTION OF THE DISCLOSURE

Example 1

The following describes an antenna device and an antenna module in Example 1 with reference to FIGS. 1 to 3B.

Figure 1:
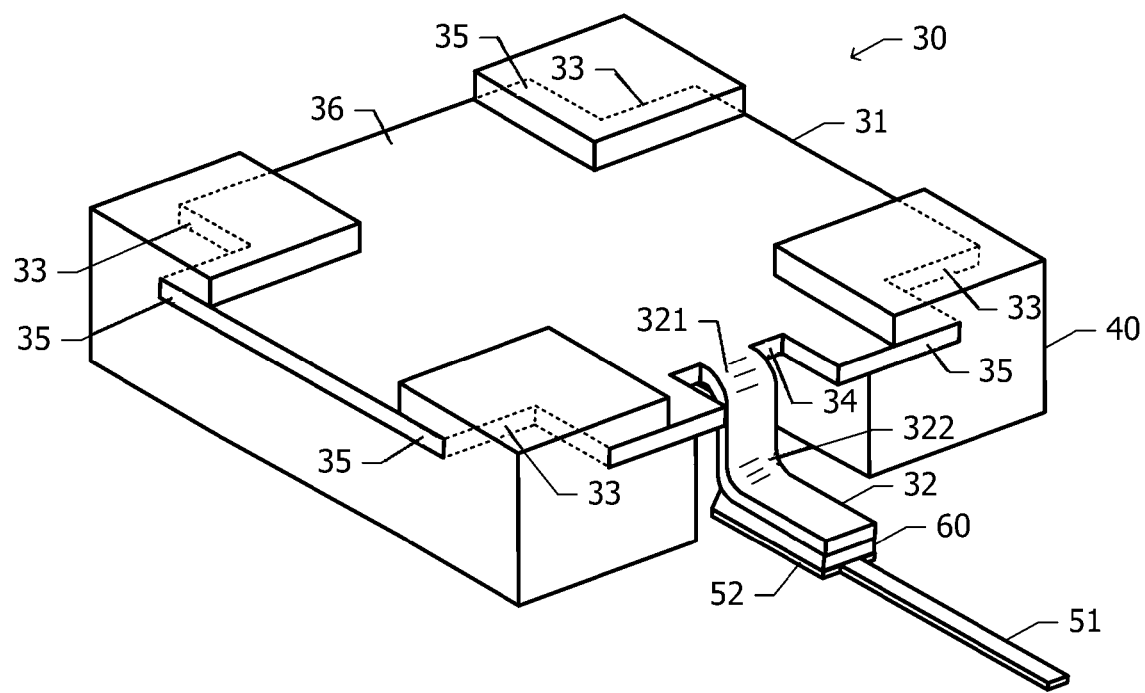
FIG. 1 is a perspective view of an antenna device in Example 1.
Figure 2A:
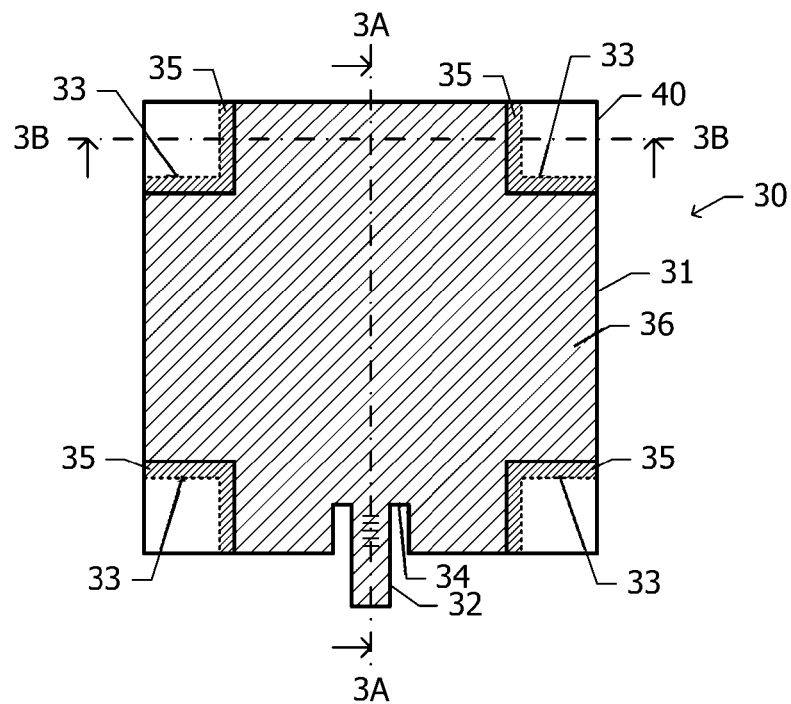
FIG. 2A is a plan view of the antenna device in Example 1.
Figure 2B:
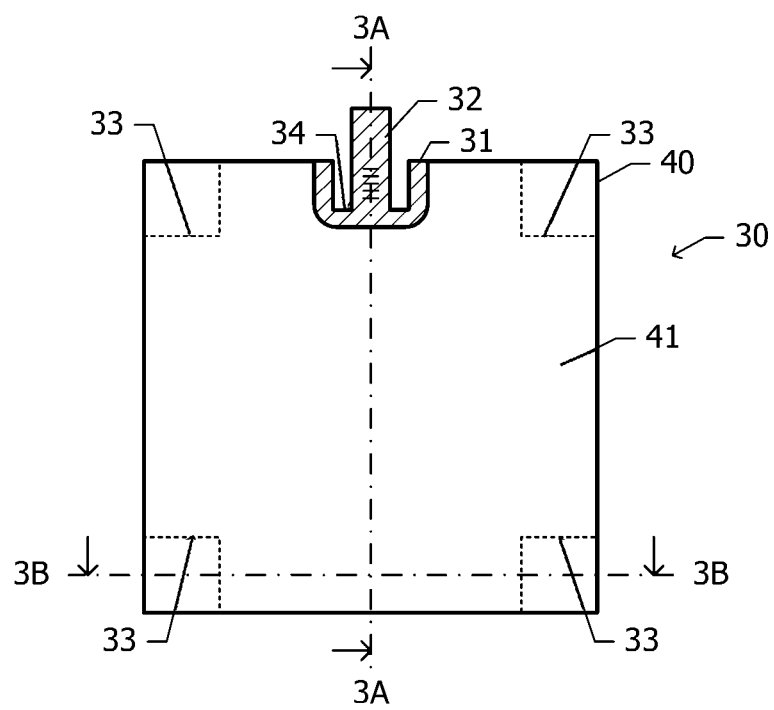
FIG. 2B is a bottom view of the antenna device in Example 1.
Figure 3A:
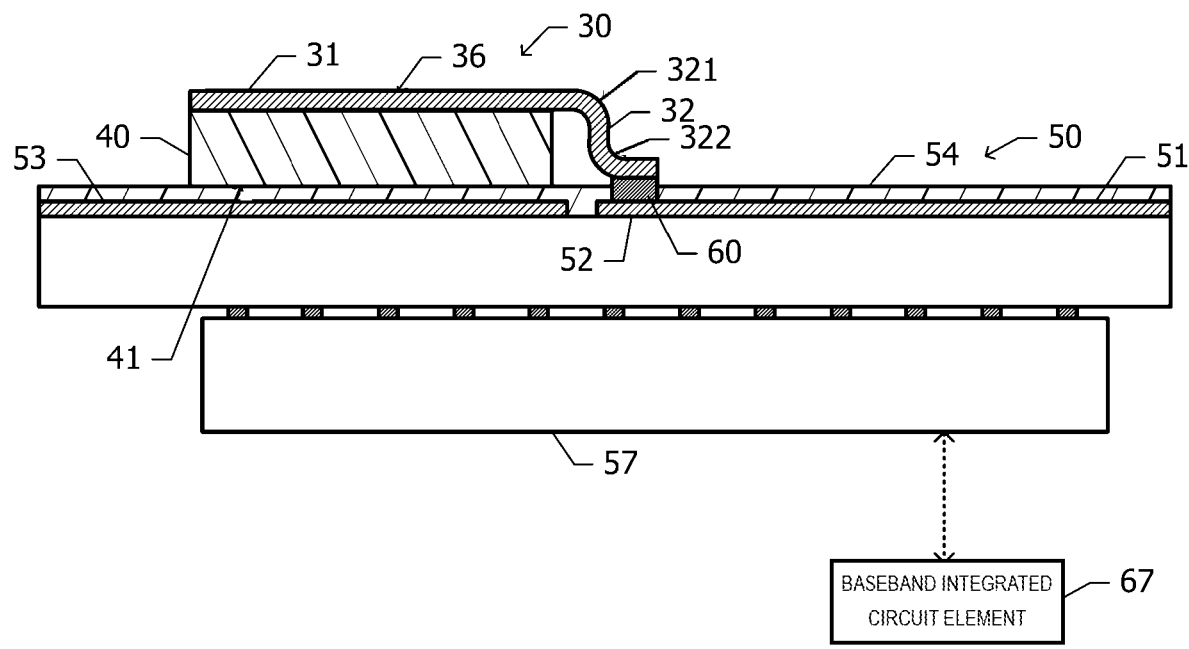
FIG. 3A is a sectional view of the antenna device taken along dash-dot line 3A-3A in FIGS. 2A and 2B.
Figure 3B:
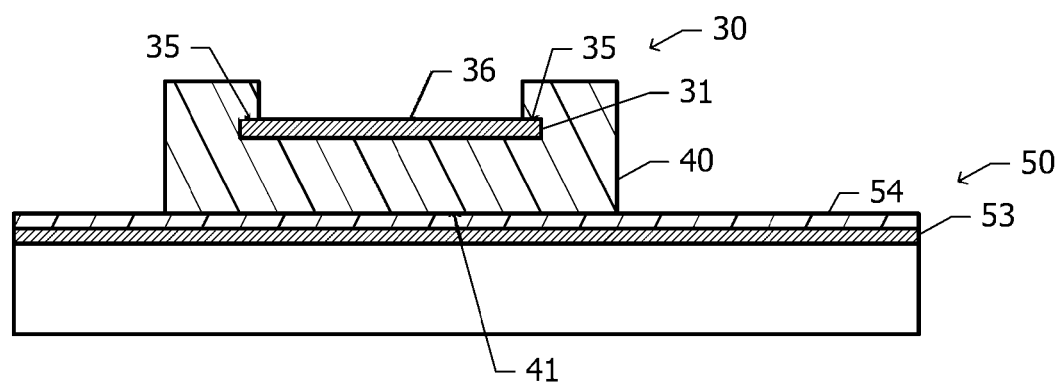
FIG. 3B is a sectional view of the antenna device taken along dash-dot line 3B-3B in FIGS. 2A and 2B.

FIG. 1 is a perspective view of an antenna device 30 in Example 1. FIG. 2A and FIG. 2B are a plan view and a bottom view, respectively, of the antenna device 30 in Example 1. FIG. 3A is a sectional view of the antenna device 30 taken along dash-dot line 3A-3A in FIGS. 2A and 2B. FIG. 3B is a sectional view of the antenna device 30 taken along dash-dot line 3B-3B in FIGS. 2A and 2B.

The antenna device 30 in Example 1 includes: a radiation conductor 31, which is constructed of a metal plate; and a dielectric member 40, which supports the radiation conductor 31. The radiation conductor 31 has: a pair of main surfaces pointing in opposite directions; and end faces extending from an edge of one main surface of the pair of main surfaces to an edge of the other main surface. The outline of the radiation conductor 31 viewed in plan is substantially identical to the outline of a figure composed of two oblongs crossing each other at right angles in such a manner that the center of one oblong coincides with the center of the other oblong. In other words, the radiation conductor 31 is a substantially rectangular metal plate with four corners cut out in small substantially rectangular shapes when viewed in plan. The term "rectangular" herein means being a quadrangle having four right-angled corners, or more specifically, an oblong or a square. The shape of the metal plate whose four corners are yet to be cut out is hereinafter referred to as a basic shape of the radiation conductor 31.

The radiation conductor 31 has a cut 34, which extends inward from the central part of one side of the basic shape of the radiation conductor 31. In the cut 34, a lead-out portion 32 extends from the innermost of the cut 34 toward the outside of the basic shape. The radiation conductor 31 and the lead-out portion 32 are constructed of one metal plate. The lead-out portion 32 is bent at a first bend 321 in the thickness direction of the radiation conductor 31 and is also bent at a second bend 322 in the reverse direction. The second bend 322 is closer than the first bend 321 to a tip of the lead-out portion 32. The section of the lead-out portion 32 closer than the second bend 322 to the tip is substantially parallel to the radiation conductor 31. When viewed in plan, the section extends in a direction perpendicular to the side of the basic shape having the cut 34.

Portions of the dielectric member 40 sandwich, in the thickness direction, substantially L-shaped portions extending along end faces of cutouts 33 provided at the four corners of the radiation conductor 31 and having substantially rectangular shapes. Portions being part of the radiation conductor 31 and sandwiched between portions of the dielectric member 40 are hereinafter referred to as sandwiched portions 35. One main surface of the radiation conductor 31 is referred to as an upper face, and the other main surface is referred to as a lower face. The upper face and the lower face are connected to each other via end faces of the radiation conductor 31. The dielectric member 40 covers regions corresponding to the respective sandwiched portions 35 and extending from the one main surface (the upper face) across the end faces to the other main surface (the lower face) on the opposite side. The expression "the dielectric member 40 covers" may mean that the dielectric member 40 is in close contact with each end face or that the dielectric member 40 faces each end face with a gap therebetween. The lead-out portion 32 is bent at the first bend 321 in such a manner that a face of the lead-out portion 32 extending from the upper face of the radiation conductor 31 faces outward. The lead-out portion 32 is also bent at the second bend 322 in such a manner that the face extending from the upper face of the radiation conductor 31 faces inward.

The radiation conductor 31 and the dielectric member 40 are formed as one member, for example, by insert molding. Alternatively, the radiation conductor 31 may be press-fitted to the dielectric member 40, which is a resin molded product, and the radiation conductor 31 and the dielectric member 40 may be fastened to each other by staking or via an adhesive.

The upper face of the radiation conductor 31 except for the sandwiched portions 35 is not covered with the dielectric member 40. The region that is not covered with the dielectric member 40 is hereinafter referred to as an exposed region 36. Referring to FIG. 2A, the exposed region 36 is less densely hatched and the sandwiched portions 35 are more densely hatched. The exposed region 36 of the radiation conductor 31 may be exposed to air.

The end faces of the radiation conductor 31 except for the cutouts 33 are not covered with the dielectric member 40 and are basically exposed. In some cases, a coating made of the same material as the dielectric member 40 may be formed on part of the end faces due to the intrusion of the dielectric member 40 in the manufacturing process.

On the upper face of the radiation conductor 31, the dielectric member 40 is separated into four sections corresponding to the cutouts 33. The four sections are connected to each other on the lower face of the radiation conductor 31. The dielectric member 40 (see FIG. 2B) covers the lower face of radiation conductor 31 except for the region around the cut 34. The lower face of the radiation conductor 31 includes a substantially U-shaped region exposed around the cut 34. Referring to FIG. 2B, the exposed region of the radiation conductor 31 is hatched. Both faces of lead-out portion 32 are exposed.

The antenna device 30 is mounted on a mounting substrate 50 in such a manner that the lower face (the face illustrated in FIG. 2B) of the dielectric member 40 faces the mounting substrate 50 (see FIGS. 3A and 3B). The mounting substrate 50 is a supporting member that supports the antenna device 30. The face of the dielectric member 40 facing the mounting substrate 50 is hereinafter referred to as a facing surface 41 (see FIGS. 2B, 3A, and 3B). With the antenna device 30 being mounted on the mounting substrate 50, the radiation conductor 31 is parallel to the mounting substrate 50. The lead-out portion 32 is bent at the first bend 321 in such a manner that the tip of the lead-out portion 32 is closer to the mounting substrate 50 than a point at which the lead-out portion 32 leads out of the radiation conductor 31 is.

The mounting substrate 50 (see FIG. 3A) includes a feed line 51 (see FIGS. 1 and 3A) and a land 52 (see FIGS. 1 and 3A) extending from an end of the feed line 51. In the antenna device 30, the section of the lead-out portion 32 closer than the second bend 322 to the tip of the lead-out portion 32 is mechanically fastened to the land 52 with solder 60 (conductive material) and is electrically connected to the land 52 via the solder 60. Since the lead-out portion 32 is electrically connected to the land 52 via the solder 60, the lead-out portion 32 is electromagnetically connected to the land 52. The lead-out portion 32 doubles as a feeder. With the lead-out portion 32 being fixed to the mounting substrate 50, the antenna device 30 is mounted on the surface of the mounting substrate 50 accordingly.

A surface (the surface on which the antenna device 30 is mounted) of the mounting substrate 50 (see FIGS. 3A and 3B) has a ground conductor 53 laid thereon. The radiation conductor 31 and the ground conductor 53 constitute a patch antenna. That is, the radiation conductor 31 and the ground conductor 53 operate as a patch antenna to radiate radio waves. The feed line 51 and the ground conductor 53 are covered with a solder resist film 54. The solder resist film 54 has an opening through which the land 52 is exposed. The solder 60 is applied to the opening.

A radio-frequency integrated circuit element (RFIC) 57 is mounted on the other surface of the mounting substrate 50 opposite to the surface on which the antenna device 30 is mounted. Alternatively, the antenna device 30 and the radio-frequency integrated circuit element 57 may be mounted on the same surface. The radio-frequency integrated circuit element 57 is connected to a baseband integrated circuit element 67. The baseband integrated circuit element 67 supplies intermediate-frequency signals or baseband signals to the radio-frequency integrated circuit element 57.

The radio-frequency integrated circuit element 57 supplies radio-frequency signals to the radiation conductor 31 through the feed line 51. The radio-frequency signals received by the radiation conductor 31 are input to the radio-frequency integrated circuit element 57 through the feed line 51. The antenna device 30, the mounting substrate 50, and the radio-frequency integrated circuit element 57 mounted on the mounting substrate 50 constitute an antenna module. A device including the antenna device 30, the mounting substrate 50, and the radio-frequency integrated circuit element 57 is herein referred to as an antenna module. The antenna device 30 including the radiation conductor 31 and the dielectric member 40 and the mounting substrate 50, on which the antenna device 30 is mounted, may be herein collectively referred to as an antenna device. To be distinguishable from the antenna device including the mounting substrate 50, the antenna device 30 including the radiation conductor 31 and the dielectric member 40 may be herein referred to as an antenna cell. An apparatus including the antenna cell, the mounting substrate 50, the radio-frequency integrated circuit element 57 mounted on the mounting substrate 50, and the baseband integrated circuit element 67 may be herein referred to as a communication apparatus.

The following describes advantageous effects of Example 1.

For a high-gain, wide-band antenna device, a greater spacing is preferably provided between a radiation conductor and a ground conductor, and a dielectric material located between the radiation conductor and the ground conductor preferably has a lower relative dielectric constant; that is, a structure being thicker in profile and enabling a lower dielectric constant is preferred.

The radiation conductor and the ground conductor are typically disposed in a mounting substrate having a multi-layer wiring structure. With the given thickness of the mounting substrate, the spacing between the radiation conductor and the ground conductor is limited. This makes it difficult to provide a mounting substrate thicker in profile.

For example, the spacing between the radiation conductor and the ground conductor is preferably more than or equal to about 50 µm. When a mounting substrate such as a common printed circuit board includes a radiation conductor and a ground conductor, the thickness of an insulating layer between multilayer wiring layers adds constrains to the spacing between the radiation conductor and the ground conductor. It is thus difficult to provide a spacing of about 50 µm or more between the radiation conductor and the ground conductor. As a workaround, the configuration described in Example 1 may be adopted to easily obtain an antenna device (antenna cell) with a spacing of about 50 µm or more being provided between the radiation conductor and the ground conductor. When the antenna device is to operate as a patch antenna, the spacing between the radiation conductor and the ground conductor is preferably less than or equal to about ½ times the center wavelength (in vacuum) of the operating frequency band of the antenna device.

In light of the fact that the use of a dielectric material suited to the mounting substrate is required, there is also a limit on the extent to which the dielectric constant can be reduced. The relative dielectric constant of the dielectric material located between the radiation conductor and the ground conductor is preferably more than or equal to about 1 and less than or equal to about 5 and is more preferably more than or equal to about 1 and less than or equal to about 3.

The mounting substrate may be thicker in profile when including a greater number of dielectric layers located between the ground conductor and the radiation conductor. However, such a structure requires more man-hours and causes increase in production cost. When the mounting substrate is thicker in profile and has a lower dielectric constant, the ground conductor in the mounting substrate and the dielectric layer being a surface layer of the mounting substrate promote the transmission of surface acoustic waves. Due to such an adverse effect, part of the electric power supposed to be radiated from the antenna to the outside is transformed into surface acoustic waves. As a result, the antenna may operate with a relatively low degree of radiation efficiency, and the antenna-to-antenna isolation may degrade accordingly. In some cases, the dielectric layers included in the mounting substrate and located between the ground conductor and the radiation conductor are made of a material having a dielectric constant lower than the dielectric constant of the material of the other dielectric layers. Due to, for example, a difference in thermal expansion coefficient, the substrate may be more prone to being warped.

In Example 1, meanwhile, the antenna device 30 and the mounting substrate 50 are separately prepared. This means that the dimensions and the material of the antenna device 30 may be determined irrespective of the dimensions and the material of the mounting substrate 50. Thus, a greater spacing may be easily provided between the ground conductor 53 on the mounting substrate 50 and the radiation conductor 31 of the antenna device 30; that is, an increase in profile may be easily achieved. The dielectric member 40 may be made of a low dielectric constant material different from the dielectric material of the mounting substrate 50; that is, a lower dielectric constant may be achieved. A high-gain, wide-band antenna device may be provided accordingly. When operating in a millimeter-wave band in particular, the antenna device in Example 1 demonstrates outstanding performance as a high-gain, wide-band antenna. The antenna device in Example 1 is thus suited for use as an antenna for a millimeter-wave band.

With most of the upper face of the radiation conductor 31 in Example 1 being not covered with the dielectric member 40, the effective dielectric constant in the region around the radiation conductor 31 is low. Compared with the case in which the effective dielectric constant in the region around the radiation conductor 31 is high, the radiation conductor 31 in Example 1 may have greater dimensions as long as the prescribed requirements concerning the resonant frequency are satisfied. A high-gain antenna with high directivity is provided accordingly.

As a way to fix the radiation conductor 31 to the dielectric member 40, the radiation conductor 31 may be brought into close contact with the dielectric member 40. When being in poor contact with the dielectric member 40, the radiation conductor 31 may fall away from the dielectric member 40. As a workaround, each sandwiched portion 35 of the radiation conductor 31 in Example 1 is sandwiched between portions of the dielectric member 40. The radiation conductor 31 is securely fastened to the dielectric member 40 accordingly. This holds true for the case in which the radiation conductor 31 is in poor contact with dielectric member 40.

Each of the sandwiched portions 35 of the radiation conductor 31 in Example 1 has at least two end faces, each of which points in a direction opposite to the direction in which a corresponding face of another sandwiched portion 35 points. When the antenna device 30 is viewed in plan with the edge having the cut being on the lower side (see FIG. 2A), the sandwiched portion 35 at the upper right has an end face facing rightward, and the sandwiched portion 35 at the upper left has an end face facing leftward. The two end faces point in opposite directions. When the dielectric member 40 is in contact with the two end faces, the radiation conductor 31 is held in place in the right-and-left directions with respect to the dielectric member 40. Referring to FIG. 2A, the sandwiched portion 35 at the upper right has an end face facing upward, and the sandwiched portion 35 at the lower right has an end face facing downward. The two end faces point in opposite directions. When the dielectric member 40 is in contact with the two end faces, the radiation conductor 31 is held in place in the up-and-down directions with respect to the dielectric member 40.

The radiation conductor 31 may be held in place with respect to the dielectric member 40 in the following manner. Regions being part of the end faces of the radiation conductor 31 and covered with the dielectric member 40 are positioned in such a manner that the radiation conductor 31 is restrained from moving with respect to the dielectric member 40 in a given direction orthogonal to the thickness direction of the radiation conductor 31. The expression "restrained from moving" herein means being unable to move freely. This may mean being anchored with no free play or being movable within only a certain stroke. When the radiation conductor 31 is movable with respect to the dielectric member 40 within only a certain stroke in a given direction, the radiation conductor 31 will not fall away from dielectric member 40. The expression "a given direction" herein means all directions orthogonal to the thickness direction of the radiation conductor 31.

In Example 1, the section of the lead-out portion 32 closer than the second bend 322 to the tip of the lead-out portion 32 is parallel to the radiation conductor 31. Thus, this section is also parallel to the land 52. Compared with the case in which the lead-out portion 32 is bent in only one place so that the tip face of the lead-out portion 32 extending in the height direction faces the land 52, this structure increases the proportion of the region over which the lead-out portion 32 faces the land 52. The mechanical adhesive force acting between the antenna device 30 and the mounting substrate 50 is increased accordingly.

In Example 1, the antenna device 30 is fastened to the mounting substrate 50 in such a manner that the facing surface 41 of the dielectric member 40 is in contact with the surface of the mounting substrate 50. This reduces the amount of the deviation from a design value of the spacing between the radiation conductor 31 and the ground conductor 53 on the mounting substrate 50. The patch antenna including the radiation conductor 31 and the ground conductor 53 thus exhibits characteristics that substantially match any given design value.

The following describes a modification of Example 1.

In Example 1, the radiation conductor 31 is substantially rectangular metal plate with four corners cut out in small substantially rectangular shapes when viewed in plan. Alternatively, the radiation conductor 31 may have other shapes. For example, the radiation conductor 31 may be shaped into a square or an oblong. In this case, the sandwiched portions 35 are four corners of the square or the oblong. Achieving a lower dielectric constant enables to a high-gain, wide-band antenna. This effect may be sufficiently ensured when the sandwiched portions 35 are regions extending inward from part of the end faces of the radiation conductor 31. The proportion of the area of the sandwiched portions 35 in the area of the upper and lower faces of the radiation conductor 31 viewed in plan is preferably more than or equal to about 1% and less than or equal to about 25%.

In Example 1, the substantially L-shaped portions extending along the end faces of the cutouts 33 (see FIG. 1) provided at the four corners of the radiation conductor 31 and having substantially rectangular shapes are sandwiched between the corresponding portions of the dielectric member 40. Alternatively, other regions may be sandwiched between portions of the dielectric member 40. For example, each main surface of the pair of main surfaces of the radiation conductor 31 includes a first surface region that includes at least part of a peripheral edge portion of the main surface, and at least one main surface of the pair of main surfaces includes a second surface region that is a region other than the first surface region. The dielectric member 40 may hold the radiation conductor 31 in such a manner that the first surface region of each main surface of the pair of main surfaces is sandwiched between portions of the dielectric member 40. The second surface region of the at least one main surface is exposed. The peripheral edge portion herein refers to a substantially annular region whose outer periphery is an edge of a main surface. The expression "at least part of a peripheral edge portion" herein implies that the first surface region may extend along the entirety of the outer periphery of each main surface in the circumferential direction or may extend along only part of the outer periphery of each main surface in the circumferential direction. The upper and lower faces of the sandwiched portions 35 in Example 1 (see FIG. 1) correspond to the first surface region. The dimensions of the first surface region in the directions orthogonal to the circumferential direction are to be determined in such a manner as to ensure that the radiation conductor 31 sandwiched between portions of the dielectric member 40 is supported with sufficient mechanical strength.

The expression "a second surface region is exposed" herein means that the second surface region is exposed outside the dielectric member 40. That is, the second surface region of at least one of the main surfaces is not overlaid with the dielectric member 40, in which the radiation conductor 31 is fitted. The second surface region may be exposed in such a manner that the second surface region of the radiation conductor 31 is exposed to air or gases or is covered with an insulating coating made of an insulating material different from the material of the dielectric member 40. When the radiation conductor 31 includes a base metal plate and a layer of plating applied to the surface of the base metal plate, the surface of the layer of plating is regarded as a main surface.

Referring to FIG. 1, for example, the radiation conductor 31 and the dielectric member 40 in Example 1 are sharpened to have acute apexes and sharp edges. Alternatively, the radiation conductor 31 and the dielectric member 40 may have chamfered or round chamfered corners and edges as necessary. The feed line 51 in Example 1 (see FIG. 3A) is provided as the uppermost (surface) layer of the mounting substrate 50. Alternatively, the feed line 51 may be provided as an inner layer of the mounting substrate 50.

Example 2

Figure 4A:
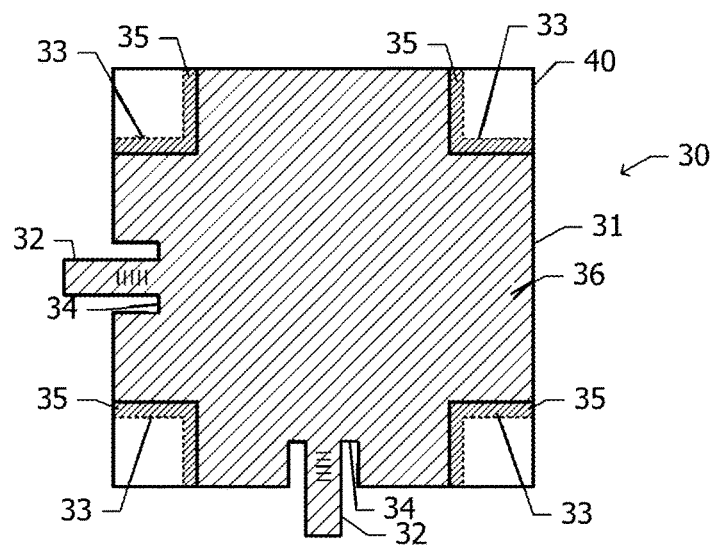
FIG. 4A is a plan view of an antenna device in Example 2.

The following describes an antenna device in Example 2 with reference to FIG. 4A. Configurations common to the antenna device in Example 1 (see FIGS. 1, 2A, and 2B) and the antenna device in Example 2 will not be further elaborated here.

FIG. 4A is a plan view of the antenna device 30 in Example 2. In Example 1, the radiation conductor 31 has the cut 34 and the lead-out portion 32, which are provided on one side of the basic shape of the radiation conductor 31. In Example 2, meanwhile, the radiation conductor 31 has two cuts 34 and two lead-out portions 32. Each cut 34 and each lead-out portion 32 are provided on the central part of the corresponding one of two adjacent sides of the basic shape of the radiation conductor 31. The two lead-out portions 32 are feeders. Points at which the two lead-out portions 32 are connected to the radiation conductor 31 are feeding points. A straight line extending from the center of the radiation conductor 31 to one feeding point and a straight line extending from the center of the radiation conductor 31 to the other feeding point are orthogonal to each other when the radiation conductor 31 is viewed in plan.

The following describes advantageous effects of Example 2.

The antenna device in Example 2 is capable of radiating two polarized waves that are orthogonal to each other. With a phase difference being provided between the two polarized waves, the antenna device is also capable of radiating, for example, a circularly polarized wave.

Example 3

Figure 4B:
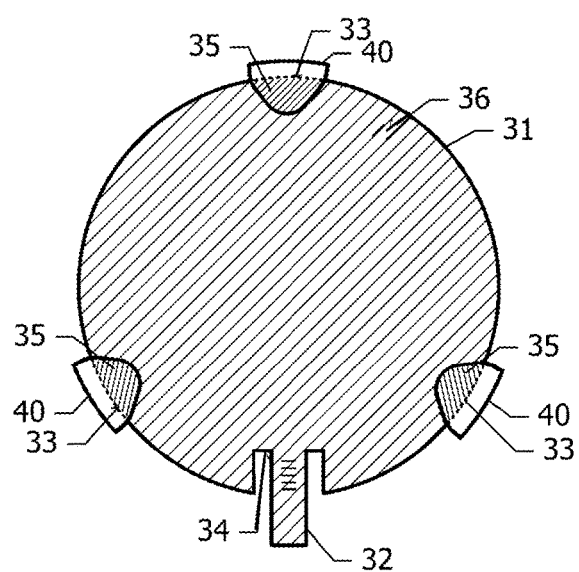
FIG. 4B is a plan view of an antenna device in Example 3.

The following describes an antenna device in Example 3 with reference to FIG. 4B. Configurations common to the antenna device in Example 1 (see FIGS. 1, 2A, and 2B) and the antenna device in Example 3 will not be further elaborated here.

FIG. 4B is a plan view of the antenna device 30 in Example 3. In Example 3, the radiation conductor 31 yet to have the cut 34 has a circular shape when viewed in plan. The cut 34 is provided in one place on the circumference of the circle, and the lead-out portion 32 extends from the innermost of the cut 34. Three sandwiched portions 35 are defined on the edge of the radiation conductor 31. The three sandwiched portions 35 are evenly spaced in the circumferential direction of the radiation conductor 31 having a substantially circular shape. The sandwiched portions 35 are sandwiched between the corresponding portions of the dielectric member 40 in the thickness direction of the radiation conductor 31, and the radiation conductor 31 is supported by the dielectric member 40 accordingly.

The following describes advantageous effects of Example 3.

With the sandwiched portions 35 being equally spaced in the circumferential direction, the radiation conductor 31 is restrained from moving in a given direction (all directions) orthogonal to the thickness direction of the radiation conductor 31 with respect to the dielectric member 40. Alternatively, more than three sandwiched portions 35 may be provided. In this case, the sandwiched portions 35 are to be provided in such a manner that the center of the radiation conductor 31 is located within a polygon whose apexes correspond to the positions of the sandwiched portions 35.

Figure 4C:
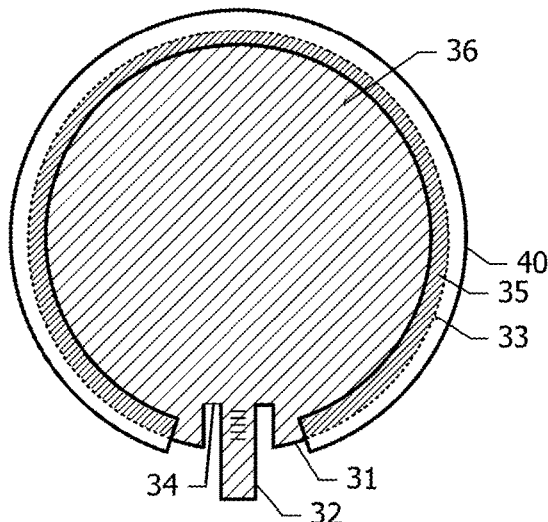
FIG. 4C is a plan view of an antenna device in a modification of Example 3.

The following describes a modification of Example 3 with reference to FIG. 4C.

FIG. 4C is a plan view of the antenna device 30 in a modification of Example 3. The radiation conductor 31 in this modification and the radiation conductor 31 in Example 3 illustrated in FIG. 4B have the same shape. In the modification illustrated in FIG. 4C, one sandwiched portion 35 extends substantially over the entire circumference of the radiation conductor 31 except for the region around the cut 34. The radiation conductor 31 in this modification is also restrained from moving in a given direction orthogonal to the thickness direction of the radiation conductor 31 with respect to the dielectric member 40. To attain this effect, the sandwiched portion 35 is preferably disposed in such a manner that the circular arc formed by the end face of the sandwiched portion 35 subtends a central angle of about 180° or more.

Example 4

Figure 5:
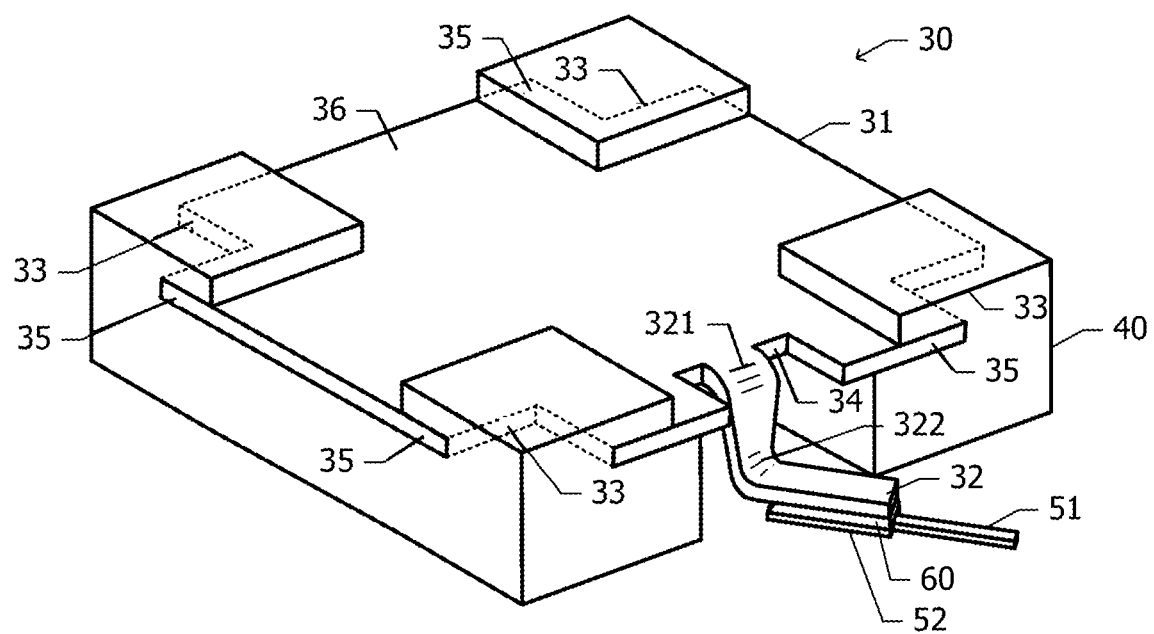
FIG. 5 is a perspective view of an antenna device in Example 4.

The following describes an antenna device in Example 4 with reference to FIG. 5. Configurations common to the antenna device in Example 1 (see FIGS. 1, 2A, and 2B) and the antenna device in Example 4 will not be further elaborated here.

FIG. 5 is a perspective view of the antenna device 30 in Example 4. In Example 1, the section of the lead-out portion 32 (see FIG. 1) closer than the second bend 322 to the tip of the lead-out portion 32 extends in a direction perpendicular to the edge having the cut 34 of the radiation conductor 31 when the radiation conductor 31 is viewed in plan. In Example 4, meanwhile, the section of the lead-out portion 32 closer than the second bend 322 to the tip of the lead-out portion 32 extends obliquely to the edge having the cut 34 of the radiation conductor 31 when the radiation conductor 31 is viewed in plan.

The following describes advantageous effects of Example 4.

Example 4 offers a higher degree of flexibility in the relationship between the direction in which the feed line 51 on the mounting substrate 50 (see FIG. 3A) extends and the attitude of the antenna device 30 viewed in plan. When viewed in plan, the antenna device 30 may be mounted in such a manner that the edge of the radiation conductor 31 lies obliquely to the direction in which the feed line 51 extends. This offers a higher degree of flexibility in the wiring layout for the mounting substrate 50 and, in turn, provides ease in designing the layout.

Example 5

Figure 6A:
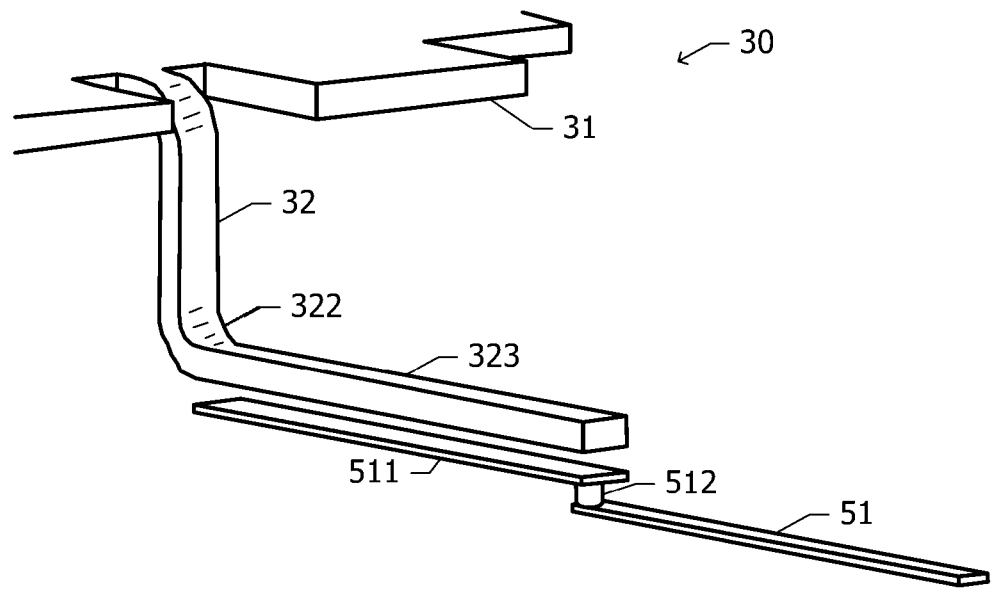
FIG. 6A is a perspective view of an antenna device in Example 5, illustrating a lead-out portion and components adjacent thereto.

The following describes an antenna device in Example 5 with reference to FIG. 6A. Configurations common to the antenna device in Example 1 (see FIGS. 1, 2A, and 2B) and the antenna device in Example 5 will not be further elaborated here.

FIG. 6A is a perspective view of the antenna device 30 in Example 5, illustrating the lead-out portion 32 and components adjacent thereto. In Example 1 (see FIG. 1), a direct electrical connection is formed between the lead-out portion 32 and the feed line 51 via the solder 60; that is, the lead-out portion 32 is short-circuited to the feed line 51. In Example 5, meanwhile, a coupled section 323, which is part of the lead-out portion 32 and closer than the second bend 322 to the tip of the lead-out portion 32, and a coupled section 511 of the mounting substrate are in close proximity to each other and are inductively coupled to each other accordingly. That is, the lead-out portion 32 and the feed line 51 are electrically connected to each other though the inductive coupling. When viewed in plan, the coupled sections 323 and 511 overlap each other and extend in the same direction. A solder resist film (not illustrated) that covers the surface of the mounting substrate may be disposed between the coupled sections 323 and 511. The coupled section 511 is connected via a via conductor 512 to the feed line 51, which is provided as an inner layer.

The coupled section 323 on the antenna device side and the coupled section 511 on the mounting substrate side preferably have the following shapes and dimensions so that a sufficient degree of inductive coupling is formed between the coupled sections 323 and 511. Each of the coupled sections 323 and 511 has a shape of a rod or a plate that is longer in one direction than in the other direction. The positional relationship between the coupled sections 323 and 511 is as follows: they are in parallel in the longitudinal direction and the spacing between them is substantially constant in the longitudinal direction. The spacing between the coupled sections 323 and 511 is preferably more than or equal to about ¼ times the center wavelength (in vacuum) of the operating frequency band of the antenna device 30 and less than or equal to about ½ times the center wavelength concerned. The thickness of the coupled section 323 and the spacing between the coupled sections 323 and 511 are preferably less than the dimension in the longitudinal direction of the region where the coupled sections 323 and 511 are disposed in parallel with a prescribed spacing therebetween.

The following describes advantageous effects of Example 5.

In Example 1 (see FIG. 1), the antenna device 30 is fasten to the mounting substrate 50 (see FIG. 3A) in such a manner that the lead-out portion 32 and the land 52 are electrically connected to each other via the solder 60. In Example 5, meanwhile, the dielectric member 40 (see FIG. 1) of the antenna device 30 is fixed to the mounting substrate 50 with, for example, an adhesive. In this case, the feed line 51 and the radiation conductor 31 are coupled to each other without solder therebetween.

The following describes a modification of Example 5.

In Example 5, the coupled section 511 is provided as a surface layer, and the feed line 51 is provided as an inner layer. Alternatively, both the coupled section 511 and the feed line 51 may be provided as surface layers.

Figure 6B:
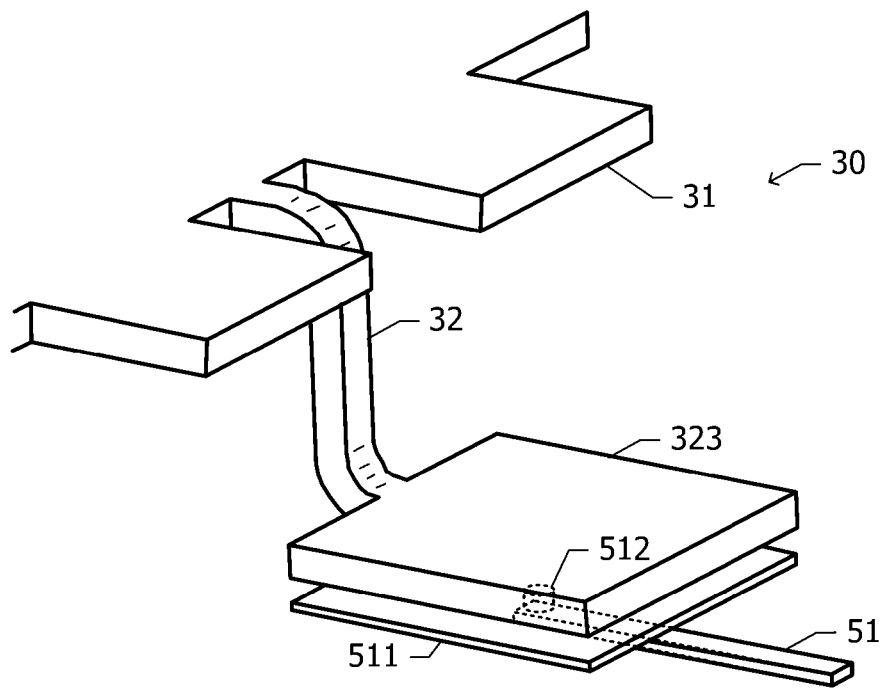
FIG. 6B is a perspective view of an antenna device in a modification of Example 5, illustrating a lead-out portion and components adjacent thereto.

The following describes another modification of Example 5 with reference to FIG. 6B.

FIG. 6B is a perspective view of the antenna device 30 in the modification of Example 5, illustrating the lead-out portion 32 and components adjacent thereto. In Example 5 (see FIG. 6A), the coupled section 323 of the lead-out portion 32 and the coupled section 511 provided on the mounting substrate side and connected to the feed line 51 are inductively coupled to each other. In the modification of Example 5, the coupled section 323 of the lead-out portion 32 and the coupled section 511 provided on the mounting substrate side and connected to the feed line 51 are capacitively coupled to each other and are electrically connected to each other accordingly. The capacitive coupling is provided in such a manner that the coupled sections 323 and 511 extend on the respective planes to form a capacitor. The mounting substrate may include a solder resist film (not illustrated) disposed between the coupled sections 323 and 511.

The coupled section 323 on the antenna device side and the coupled section 511 on the mounting substrate side preferably have the following shapes and dimensions so that a sufficient degree of capacitive coupling is formed between the coupled sections 323 and 511. Each of the coupled sections 323 and 511 has a shape of a flat plate. The coupled sections 323 and 511 are disposed with a prescribed spacing therebetween. The region where the coupled sections 323 and 511 are disposed in parallel with a prescribed spacing therebetween (the region where the coupled sections 323 and 511 viewed in plan overlap each other) may be a square or an oblong. In this case, a side of the square or the oblong is preferably longer than the dimension in the thickness direction of the coupled section 323. The spacing between the coupled sections 323 and 511 is preferably shorter than a side of the region where the coupled sections 323 and 511 viewed in plan overlap each other.

In this modification, the feed line 51 and the radiation conductor 31 are coupled to each other without solder therebetween as in Example 5. Another advantage of the coupled sections 323 and 511 extending on the respective planes is that the allowable threshold for misalignment that may be produced during the mounting of the antenna device 30 may be higher.

Example 6

Figure 7A:
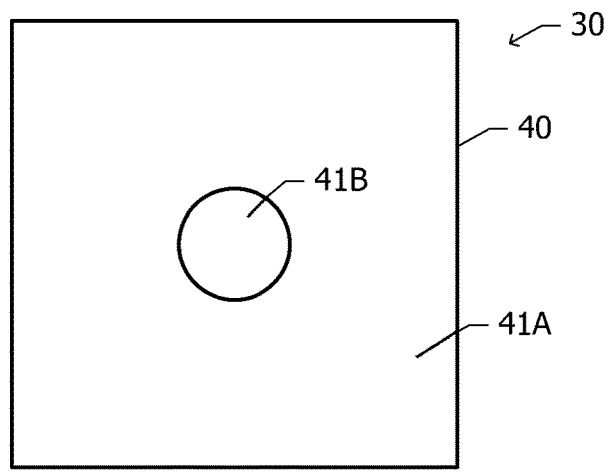
FIG. 7A is a bottom view of an antenna device in Example 6.
Figure 7B:
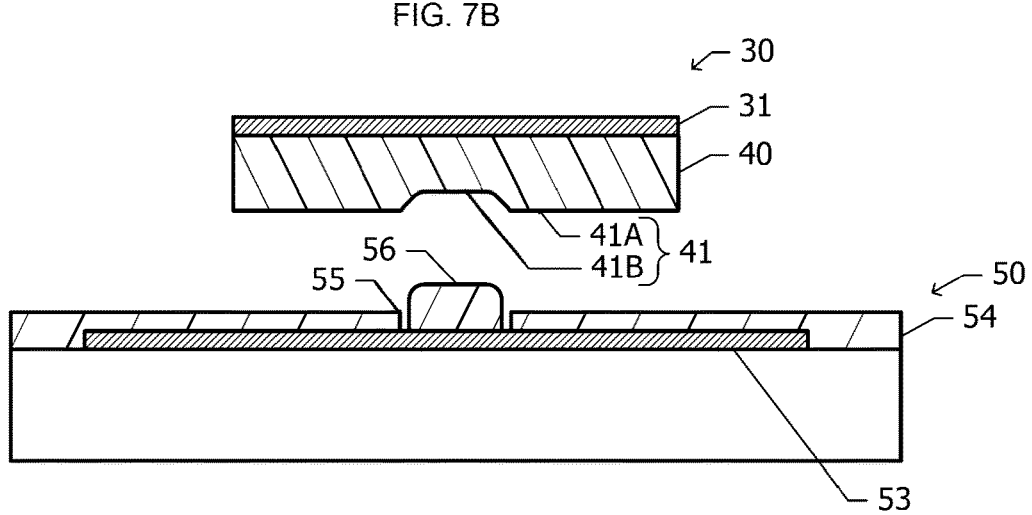
FIG. 7B is a sectional view of the antenna device and a mounting substrate in Example 6, illustrating the state in which the antenna device is yet to be mounted on the mounting substrate.
Figure 7C:
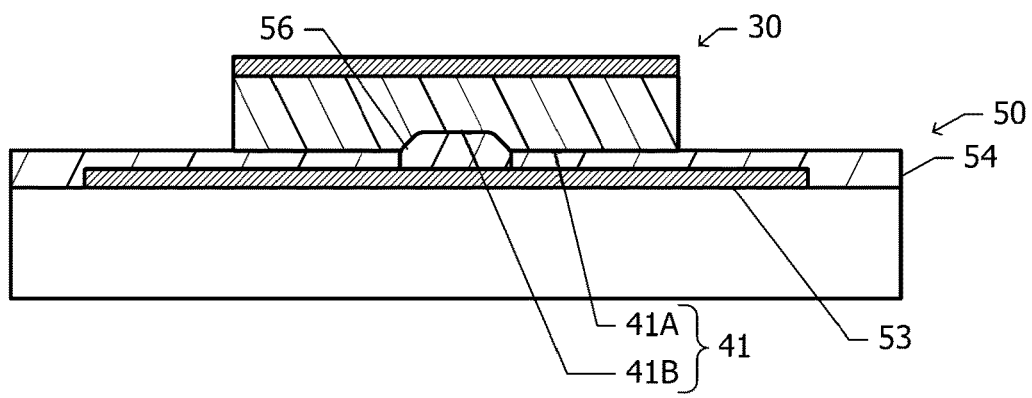
FIG. 7C is a sectional view of the antenna device and the mounting substrate in Example 6, illustrating the state in which the antenna device is mounted on the mounting substrate.

The following describes an antenna device and an antenna module in Example 6 with reference to FIGS. 7A, 7B, and 7C. Configurations common to the antenna device 30 in Example 1 (see FIGS. 1 to 3B) and the antenna device in Example 6 will not be further elaborated here.

FIG. 7A is a bottom view of the antenna device 30 in Example 6. FIG. 7B is a sectional view of the antenna device 30 and the mounting substrate 50 in Example 6, illustrating the state in which the antenna device 30 is yet to be mounted on the mounting substrate 50. FIG. 7C is a sectional view of the antenna device 30 and the mounting substrate 50 in Example 6, illustrating the state in which the antenna device 30 is mounted on the mounting substrate 50. In Example 1, the facing surface 41 (see FIGS. 3A and 3B) of the antenna device 30 is substantially flat. In Example 6, meanwhile, the facing surface 41 includes a first region 41A and a second region 41B. The first region 41A is parallel to the radiation conductor 31. The second region 41B is closer than the first region 41A to the radiation conductor 31. The second region 41B is defined by a bottom face of a recess located in the first region 41A and having a substantially circular shape.

The solder resist film 54 has an opening 55. The ground conductor 53 is exposed through the opening 55. The opening 55 faces the second region 41B of the facing surface 41 of the antenna device 30.

The ground conductor 53 exposed through the opening 55 is coated with an adhesive 56 before the antenna device 30 is mounted. The antenna device 30 is fixed to the mounting substrate 50 with the adhesive 56. When the antenna device 30 is mounted, the adhesive 56 (see FIG. 7C) becomes embedded in the recess defining the second region 41B of the facing surface 41 of the antenna device 30.

The following describes advantageous effects of Example 6. In Example 6, the lead-out portion 32 (see FIGS. 1 and 3A) of the antenna device 30 is fixed to the mounting substrate 50 with the solder 60, and the dielectric member 40 is fixed to the mounting substrate 50 with the adhesive 56. The antenna device 30 is more securely fastened to the mounting substrate 50 accordingly.

The adhesive 56 is to be applied in the right amount so that the adhesive 56 becomes embedded in the recess defining the second region 41B and does not spread out into the first region 41A. With the adhesive 56 being applied in the amount, the first region 41A of the facing surface 41 is in contact with the mounting substrate 50. As in Example 1, the amount of the deviation from the design value of the spacing between the radiation conductor 31 and the ground conductor 53 may be reduced accordingly.

In a case where the adhesive 56 is applied to the solder resist film 54, both the solder resist film 54 and the antenna device 30 bonded thereto with the adhesive 56 may come off from the mounting substrate 50. In Example 6, the adhesive 56 is applied to the ground conductor 53 through the opening 55 of the solder resist film 54. This eliminates or reduces the possibility that both the solder resist film 54 and the antenna device 30 will come off from the mounting substrate 50.

The following describes the modifications of Example 6 with reference to FIGS. 8A to 8D.

FIGS. 8A and 8B are a sectional view and a bottom view, respectively, of the antenna device 30 in Modification 1 of Example 6. In Modification 1, the second region 41B has a substantially rounded-corner square shape when viewed in plan. That is, the second region 41B may have a shape other than a circular shape when viewed in plan. For example, the second region 41B may have a substantially polygonal shape or a substantially rounded-corner polygonal shape when viewed in plan.

FIGS. 8C and 8D are a sectional view and a bottom view, respectively, of the antenna device 30 in Modification 2 of Example 6. In Modification 2, the second region 41B is defined by a bottom face and a side face of a groove that is, when viewed in plan, substantially annular-ring shaped. When the second region 41B is formed into a substantially annular-ring shaped groove, the area of the face lying obliquely or perpendicularly to the facing surface 41 (the area of the side face of the groove) is greater than the area of the corresponding face of the second region 41B in Example 6. This configuration has an advantage in that the adhesive in contact with the face lying obliquely or perpendicularly to the facing surface 41 increases the shear strength in any direction parallel to the mounting substrate. Instead of having the substantially annular ring shape, the groove defining the second region 41B may have an annular shape such as a substantially polygonal shape or an irregular annular shape when viewed in plan.

Example 7

Figure 9A:
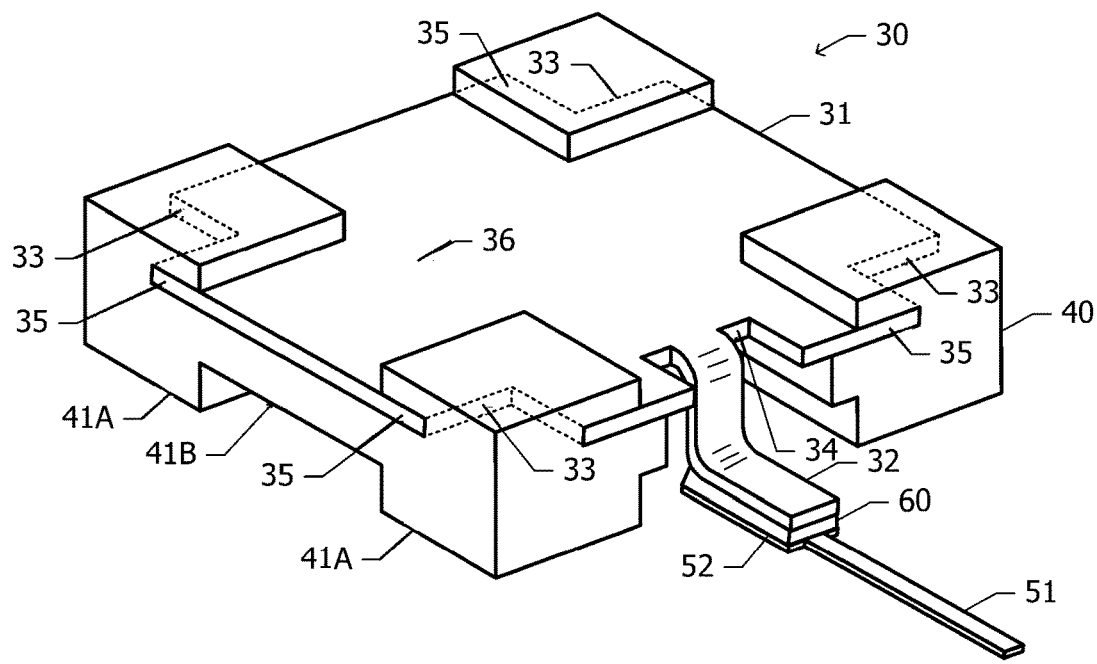
FIG. 9A is a perspective view of an antenna device in Example 7.
Figure 9B:
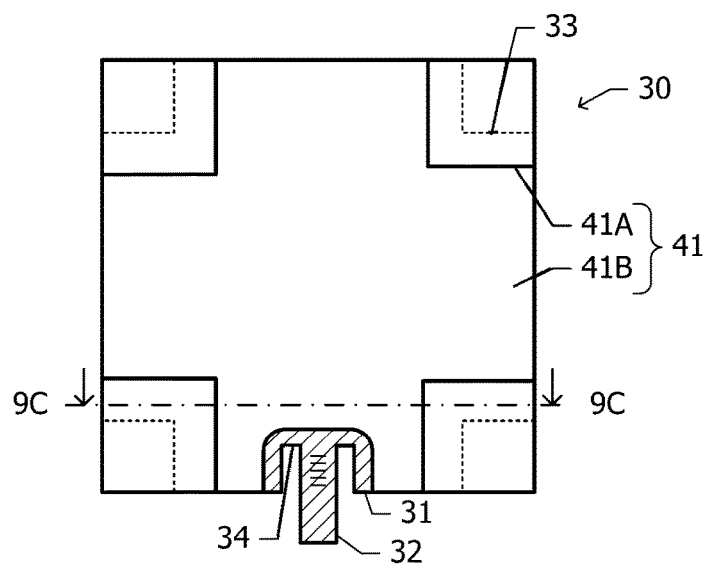
FIG. 9B is a bottom view of the antenna device in Example 7.
Figure 9C:
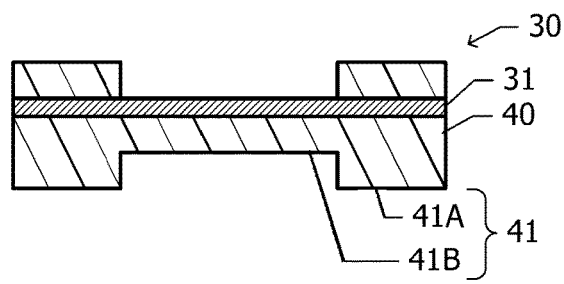
FIG. 9C is a sectional view of the antenna device taken along dash-dot line 9C-9C in FIG. 9B.

The following describes an antenna device in Example 7 with reference to FIGS. 9A to 9C. Configurations common to the antenna device 30 in Example 6 (see FIGS. 7A, 7B, and 7C) and the antenna device in Example 7 will not be further elaborated here.

FIGS. 9A and 9B are a perspective view and a bottom view, respectively, of the antenna device 30 in Example 7.

FIG. 9C is a sectional view of the antenna device 30 taken along dash-dot line 9C-9C in FIG. 9B. In Example 6, the second region 41B (see FIGS. 7A, 7B, and 7C), which is a relatively low region of the facing surface 41, is defined by the recess located in the first region 41A. In Example 7, meanwhile, first regions 41A are provided at and around the four corners of the facing surface 41 having a substantially rectangular shape. The rest of the facing surface 41 is the second region 41B, which is a relatively low region of the facing surface 41. That is, four first region 41A are discretely located away from one another. When viewed in plan, the second region 41B is substantially cross-shaped. The center of the facing surface 41 is included in the second region 41B, which extends to the edges of the facing surface 41.

The following describes advantageous effects which may be produced by the antenna device in Example 7.

In Example 7, an adhesive may be provided in the second region 41B as in Example 6. With the antenna device 30 being mounted on the mounting substrate 50, the first regions 41A are in contact with the mounting substrate 50 accordingly. The first regions 41A are provided in the four corners of the facing surface 41. When the first regions 41A placed in this layout are in contact with the mounting substrate 50, the antenna device 30 may be held stably in an inclined attitude.

The proportion of the area of the second region 41B in the total area of the facing surface 41 is greater in Example 7 than in Example 6. Thus, a greater amount of adhesive may be applied to fix the antenna device 30 more securely to the mounting substrate 50 (see FIGS. 7B and 7C).

Figure 10A:
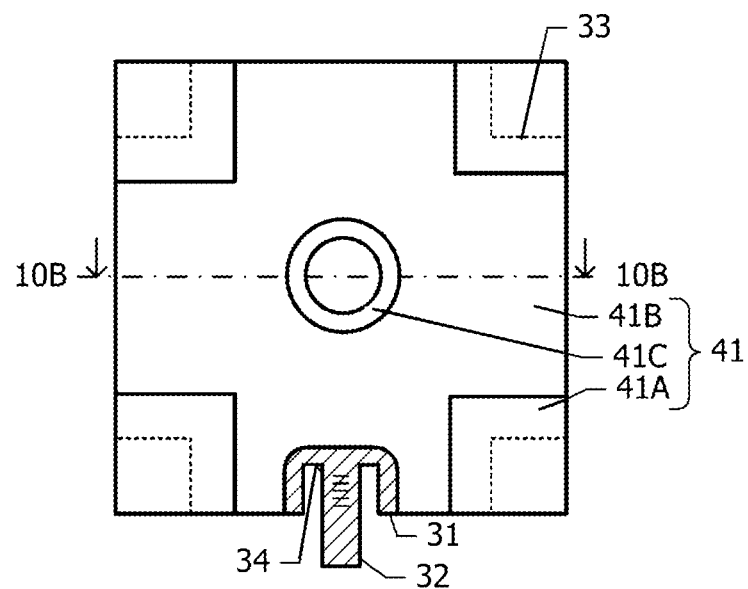
FIG. 10A is a bottom view of an antenna device in a modification of Example 7.
Figure 10B:
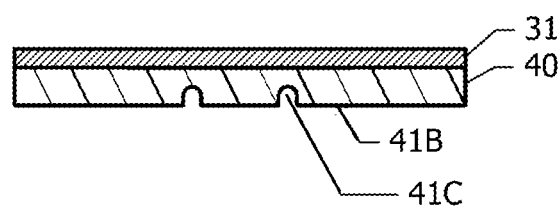
FIG. 10B is a sectional view of the antenna device taken along dash-dot line 10B-10B in FIG. 10A.

The following describes an antenna device in a modification of Example 7 with reference to FIGS. 10A and 10B.

FIG. 10A is a bottom view of the antenna device 30 in the modification of Example 7. FIG. 10B is a sectional view of the antenna device 30 taken along dash-dot line 10B-10B in FIG. 10A. In this modification, a recess 41C is provided substantially at the center of the second region 41B and has a substantially annular ring shape when viewed in plan. The adhesive 56 (see FIG. 7C) becomes embedded in the recess 41C when the antenna device 30 is mounted on the mounting substrate 50 (see FIG. 7C). This modification, in which the second region 41B has the recess 41C, further increases the shear strength and the fixation force acting between the antenna device 30 and the mounting substrate 50.

Example 8

Figure 11A:
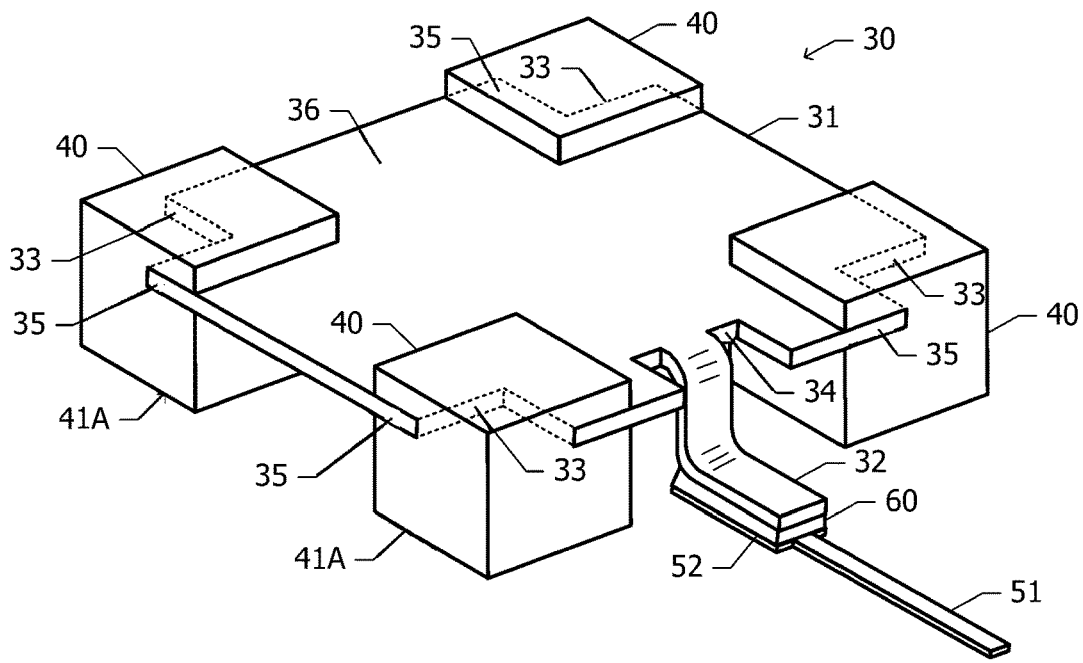
FIG. 11A is a perspective view of an antenna device in Example 8.
Figure 11B:
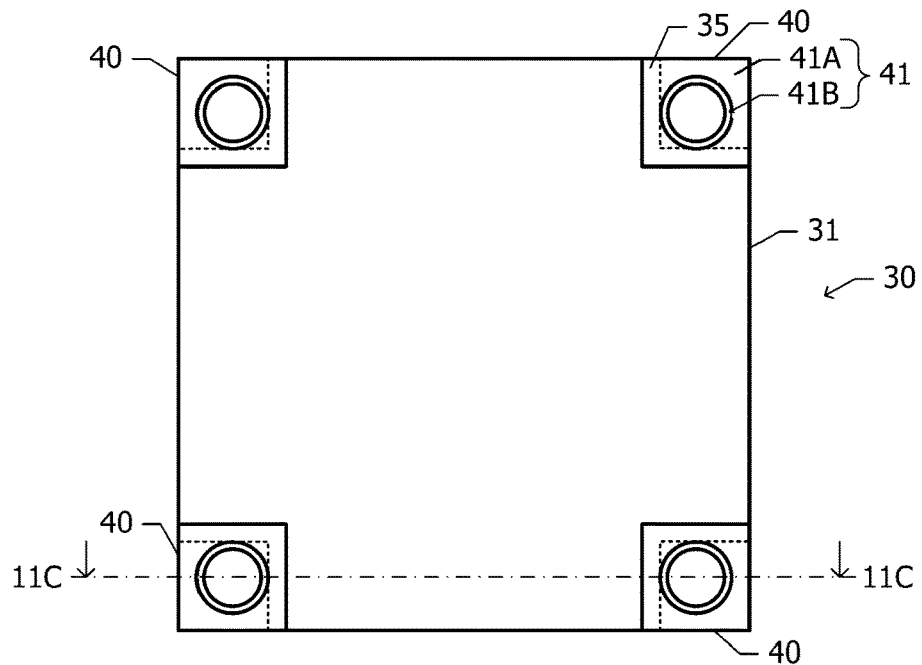
FIG. 11B is a bottom view of the antenna device in Example 8.
Figure 11C:
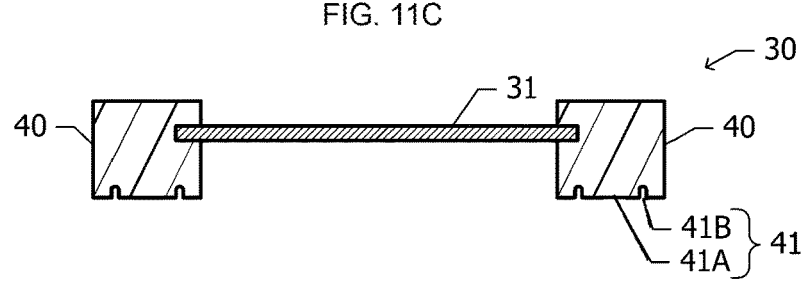
FIG. 11C is a sectional view of the antenna device taken along dash-dot line 11C-11C in FIG. 11B.

The following describes an antenna device in Example 8 with reference to FIGS. 11A, 11B, and 11C. Configurations common to the antenna device in Example 7 (see FIGS. 9A, 9B, and 9C) and the antenna device in Example 8 will not be further elaborated here.

FIGS. 11A and 11B are a perspective view and a bottom view, respectively, of the antenna device 30 in Example 8. FIG. 11C is a sectional view of the antenna device 30 taken along dash-dot line 11C-11C in FIG. 11B. In Example 7, the lower face of the radiation conductor 31 (see FIGS. 9A, 9B, and 9C) is entirely covered with the dielectric member 40. In Example 8, meanwhile, each sandwiched portion 35 of the radiation conductor 31 is sandwiched between the corresponding portions of the dielectric member 40. The upper and lower faces of the radiation conductor 31 except for the sandwiched portions 35 are not covered with the dielectric member 40. The region that is part of the radiation conductor 31 and is not covered with the dielectric member 40 is exposed to, for example, air. The dielectric member 40 is separated into four blocks, each of which is disposed on the corresponding one of the four corners of the radiation conductor 31.

The facing surface 41 of each of the four blocks into which the dielectric member 40 is separated includes the first region 41A and the second region 41B defined by a side face and a bottom face of a recess that has, when viewed in plan, a substantially annular ring shape. The recess defining the second region 41B of the facing surface 41 of each of the four blocks into which the dielectric member 40 is separated is filled with an adhesive, and the antenna device 30 is then mounted on the mounting substrate 50 (see FIGS. 7B and 7C).

The following describes advantageous effects of Example 8.

In Example 8, four recesses having substantially annular ring shapes are provided in the corresponding facing surfaces 41 of the dielectric member 40. This offers an advantage in that the shear strength and the fixation force acting between the antenna device 30 and the mounting substrate are greater in this configuration than in the configuration of the antenna device 30 having one recess (see FIGS. 8C and 8D). In Example 8, the upper and lower faces of the radiation conductor 31 except for the sandwiched portions 35 are not covered with the dielectric member 40. This configuration reduces the dielectric constant in the region around the radiation conductor 31 to a greater extent than would be possible with the configuration in which only one face of the radiation conductor 31 is not covered with the dielectric member 40. This may result in improved antenna characteristics. For example, a high-gain, wide-band antenna is achievable.

The following describes a modification of Example 8.

When viewed in plan, the second region 41B of each facing surface 41 has a substantially annular ring shape as in Example 8 or may be of other annular forms. The second region 41B may be defined by a recess that has, when viewed in plan, a substantially circular shape or a substantially rounded-corner polygonal shape.

In Example 8, the lower face of the radiation conductor 31 except for the sandwiched portions 35 is exposed, and the dielectric member 40 is separated into four blocks. Alternatively, the four blocks may be linked to each other by rod-like or strip-shaped dielectric members. For example, the dielectric member 40 may be disposed in such a manner as to cover an outer edge portion or a peripheral edge portion of the lower face of the radiation conductor 31, with the rest of the lower surface being exposed outside the dielectric member 40. The radiation conductor 31 may be supported more stably by the dielectric member 40 provided as a combination of the four blocks that are located in the four corners of the radiation conductor 31 and linked to each other. The dielectric member 40 can thus reinforce the radiation conductor 31, which may be thin or may have insufficient mechanical strength.

Example 9

Figure 12A:
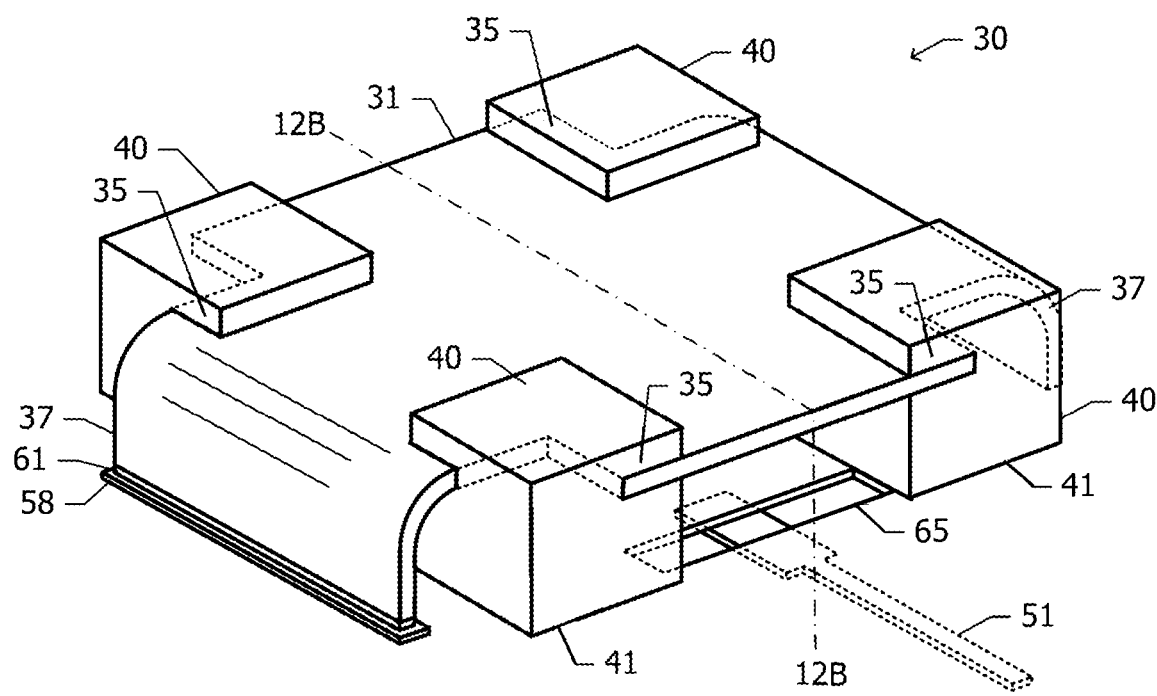
FIG. 12A is a perspective view of an antenna device in Example 9.
Figure 12B:
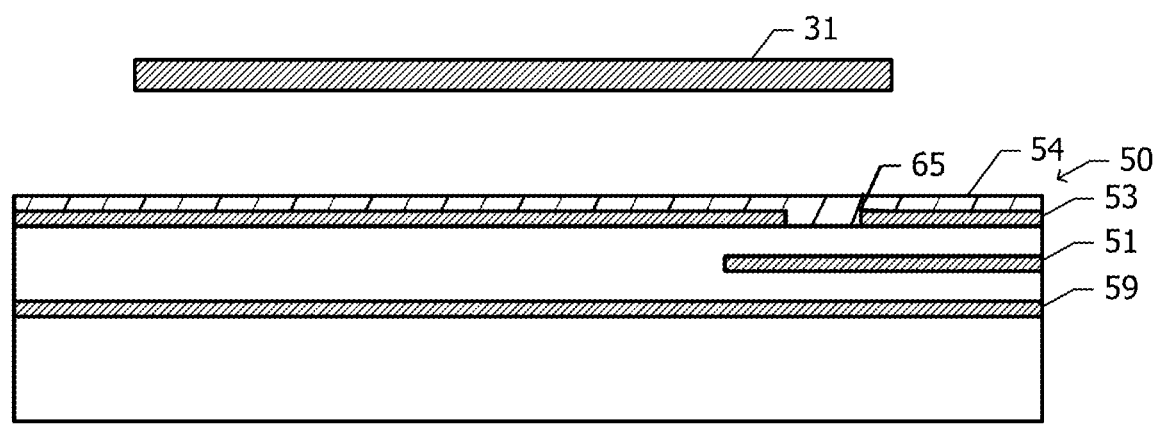
FIG. 12B is a sectional view of the antenna device in Example 9, corresponding to a plane denoted by dash-dot line 12B-12B in FIG. 12A.

The following describes an antenna device in Example 9 with reference to FIGS. 12A and 12B. Configurations common to the antenna device 30 in Example 1 (see FIGS. 1, 3A, and 3B) and the antenna device in Example 9 will not be further elaborated here.

FIG. 12A is a perspective view of the antenna device 30 in Example 9. FIG. 12B is a sectional view of the antenna device 30 in Example 9 and the mounting substrate 50 with the antenna device 30 mounted thereon. FIG. 12B corresponds to a plane denoted by dash-dot line 12B-12B in FIG. 12A.

In Example 1 (see FIGS. 1, 3A, and 3B), the lead-out portion 32 extending from the innermost of the cut 34 of the radiation conductor 31 is fixed to the mounting substrate with the solder 60, and the antenna device 30 is fastened to the mounting substrate 50 accordingly. In Example 9, meanwhile, two fixation portions 37 extend in opposite directions. Each fixation portion 37 extends from the corresponding one of the opposite end faces of the radiation conductor 31. The width of each fixation portion 37 is equal to the length of the corresponding end face of the radiation conductor 31. Each fixation portion 37 is curved downward and is connected at the tip face thereof to a fixation land 58 of the mounting substrate 50 via solder 61. The fixation portions 37 are connected at their respective tip faces to the corresponding fixation lands 58 of the mounting substrate 50, and the antenna device 30 is fastened to the mounting substrate 50 accordingly. Unlike the radiation conductor 31 in Example 1 (see FIGS. 1, 2A, and 2B), the radiation conductor 31 in Example 9 does not have the cut 34 and the lead-out portion 32.

In Example 1, the lower face of the radiation conductor 31 is substantially covered with the dielectric member 40 (see FIGS. 1 and 2B). In Example 9, the dielectric member 40 is separated into four individual blocks, and each of the sandwiched portions 35 in the four corners of the radiation conductor 31 is sandwiched between portions of the corresponding one of the four blocks. The upper and lower surfaces of the radiation conductor 31 except for the sandwiched portions 35 are exposed. With the antenna device 30 being mounted on the mounting substrate 50, the facing surfaces 41 of the four blocks into which the dielectric member 40 is separated are in contact with the solder resist film 54 on the mounting substrate 50.

The ground conductor 53 is provided as a surface layer of the mounting substrate 50, and a ground conductor 59 is provided as an inner layer of the mounting substrate 50. The feed line 51 is disposed between the ground conductors 53 and 59. The ground conductor 53 provided as a surface layer has a coupling slot 65, which is a slot for providing coupling. The coupling slot 65 partially overlaps the radiation conductor 31 when viewed in plan. The feed line 51 intersects the coupling slot 65 and is preferably orthogonal to the coupling slot 65 when viewed in plan. The radiation conductor 31 is coupled to the feed line 51 through the coupling slot 65. This configuration provides slot-coupled feed in which power is transferred from the feed line 51 to the radiation conductor 31.

The fixation land 58 (see FIG. 12A) is electrically isolated from the ground conductor 53 on the mounting substrate 50 and from the ground conductor 59 in the mounting substrate 50 and is thus in a floating state. Unlike the lead-out portion 32 in Example 1 (see FIG. 1), the fixation portions 37 thus do not serve as feeders.

The following describes advantageous effects of Example 9.

When the radiation conductor 31 in Example 9 is viewed in plan, each fixation portion 37 is located on the corresponding one of the opposite sides of the radiation conductor 31. The fixation portion 37 is used to mount the antenna device 30 on the mounting substrate 50. That is, the fixation portions 37 have the function of fastening the antenna device 30 to the mounting substrate 50. The antenna device 30 is more securely fixed to the mounting substrate 50 in Example 9 than in Example 1, in which one lead-out portion 32 (see FIG. 1) is used to mount the antenna device 30 to the mounting substrate 50.

In Example 9, the fixation portions 37 do not double as feeders. The dimensions and the shapes of the fixation portions 37 may thus be determined with a focus on mechanical fixation alone, irrespective of how the radiation conductor is supplied with power.

The following describes a modification of Example 9.

In Example 9, the fixation lands 58 connected with the fixation portion 37 are isolated from the ground conductors 53 and 59 and are in a floating state. Alternatively, the fixation land 58 may be grounded. In this case, tip faces of the fixation portions 37 are to be connected to the ground conductor 53, which is provided as a surface layer, through the openings of the solder resist film 54.

Figure 13:
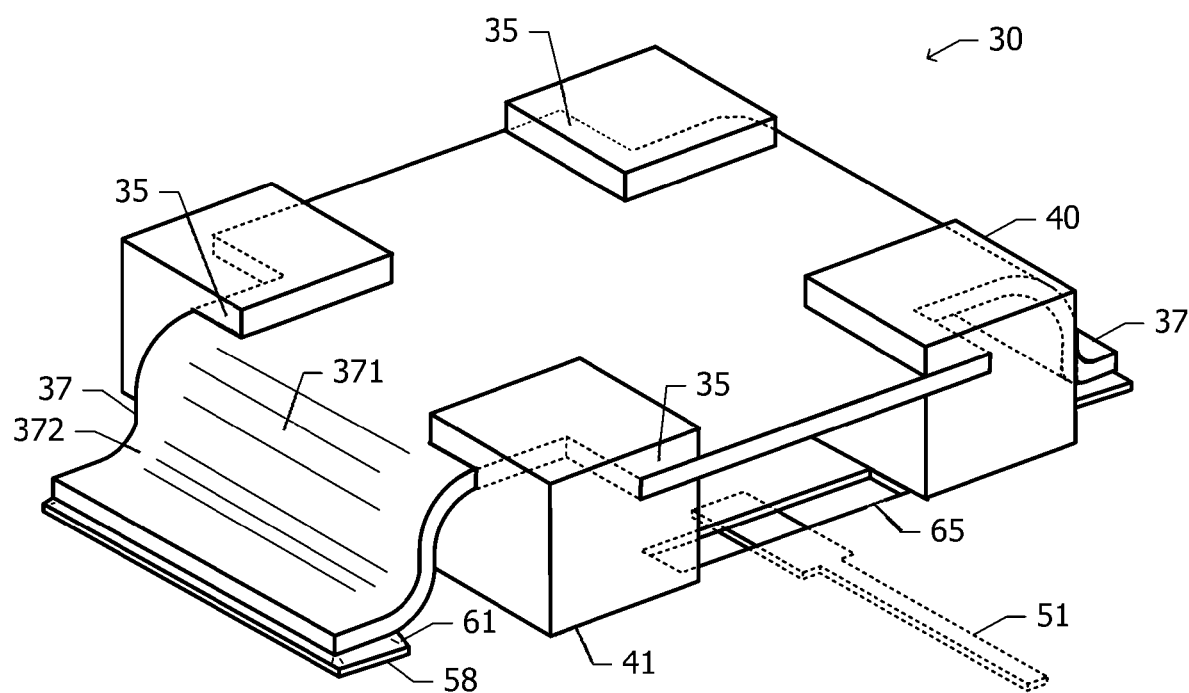
FIG. 13 is a perspective view of an antenna device in a modification of Example 9.

The following describes an antenna device in another modification of Example 9 with reference to FIG. 13. In this modification, each fixation portion 37 is bent downward at a first bend 371 and is also bent the other way around at a second bend 372 closer than the first bend 371 to the tip of the fixation portion 37. The section of the fixation portion 37 closer than the second bend 372 to the tip of the fixation portion 37 is substantially parallel to the radiation conductor 31. This configuration increases the proportion of the area of the section that is part of the fixation portion 37 and is fixed to the fixation land 58 of the mounting substrate 50 (see FIG. 12B) with the solder 61. The fixation force acting between the antenna device 30 and the mounting substrate 50 may be increased accordingly.

The following describes still another modification of Example 9.

Example 9 illustrated in FIGS. 12A and 12B provides slot-coupled feed in which power is transferred from the feed line 51 to the radiation conductor 31. As an alternative to the slot-coupled feed, the lead-out portion 32 leading out of the radiation conductor 31 may be provided as in Example 1 (see FIG. 1). The lead-out portion 32 may be connected directly to the feed line 51. Alternatively, the lead-out portion 32 may be inductively coupled to the feed line 51 as in Example 5 (see FIG. 6A). Still alternatively, the lead-out portion 32 may be capacitively coupled to the feed line 51 as in the modification of Example 5 (see FIG. 6B). In Example 1 (see FIG. 1), the lead-out portion 32 forms an electrical connection between the radiation conductor 31 and the feed line 51 and also doubles as a fixation portion that is used to fasten the antenna device 30 to the mounting substrate 50.

In Example 9 (see FIG. 12A) and the modification (FIG. 13) thereof, the width of each fixation portion 37 is equal to the length of the corresponding end face of the radiation conductor 31. Alternatively, the width of each fixation portion 37 may be shorter than the length of the corresponding end face of the radiation conductor 31. For example, each fixation portion 37 may be as thin as the lead-out portion 32 in Example 1 (see FIG. 1).

Example 10

Figure 14:
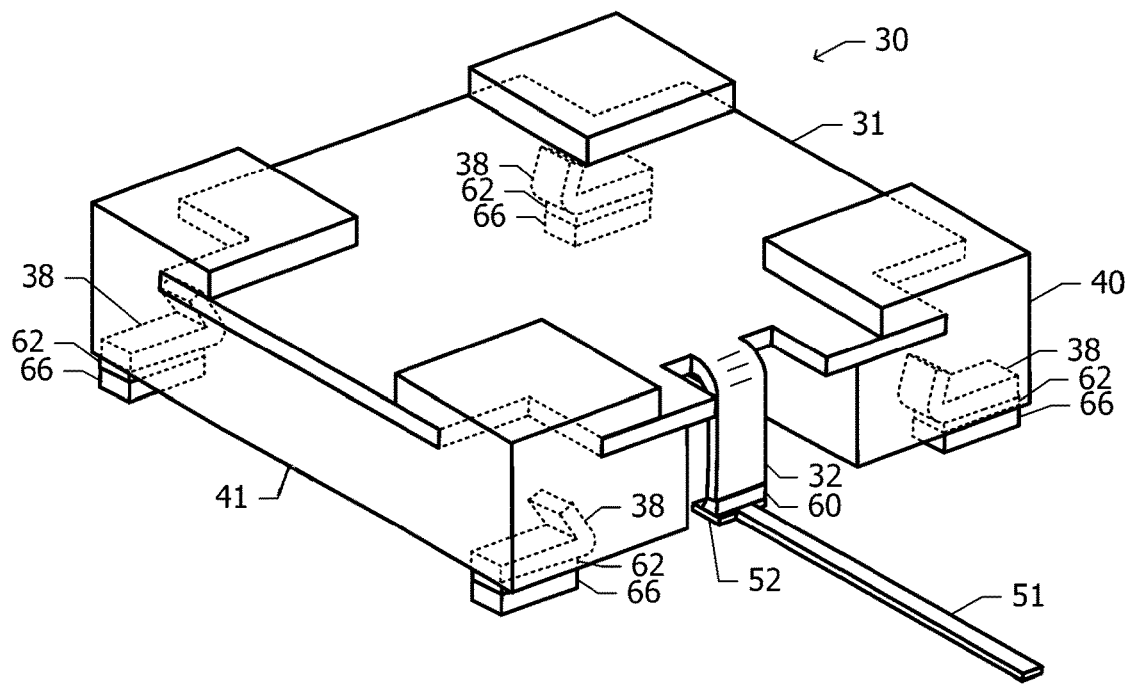
FIG. 14 is a perspective view of an antenna device in Example 10.

The following describes an antenna device in Example 10 with reference to FIG. 14. Configurations common to the antenna device 30 in Example 1 (see FIGS. 1, 3A, and 3B) and the antenna device in Example 10 will not be further elaborated here.

FIG. 14 is a perspective view of the antenna device 30 in Example 10. A plurality of fixation portions 38, which are made of meal, are embedded in the dielectric member 40.

The fixation portions 38 are not in contact with (separated from) the radiation conductor 31 and are not electrically connected to the radiation conductor 31. When the antenna device 30 is viewed in plan, four fixation portions 38 are embedded in four corresponding corners of the dielectric member 40. The surface of each fixation portion 38 is partially exposed at the facing surface 41 of the dielectric member 40. Exposed faces of the fixation portions 38 and the facing surface 41 of the dielectric member 40 are in about the same vertical position when viewed from the radiation conductor 31.

The fixation portions 38 are shaped in such a manner as to be less prone to come off from the dielectric member 40. For example, each fixation portion 38 includes a section parallel to the facing surface 41 and a section that forms an acute angle with the section parallel to the facing surface 41. The fixation portions 38 are fixed to the corresponding fixation lands 66 of the mounting substrate with solder 62. Each fixation portion 38 serves as a base for the solder 62 or another adhesive material that may be used to mount the antenna device 30 on the mounting substrate 50 (see FIGS. 3A and 3B). As in Example 1, the lead-out portion 32, which doubles as a feeder, is also fixed to the land 52 of the mounting substrate 50 with the solder 60.

In Example 1, the lead-out portion 32 (see FIG. 1) leading out of the radiation conductor 31 is disposed in such a manner that the section of the lead-out portion 32 closer than the second bend to the tip of the lead-out portion 32 is parallel to the radiation conductor 31. The proportion of the area of the section in contact with the mounting substrate 50 (see FIG. 3A) is increased accordingly. In Example 10, meanwhile, the lead-out portion 32 leading out of the radiation conductor 31 is bent in the thickness direction of the radiation conductor 31 such that the tip face of the lead-out portion 32 faces the land 52 of the mounting substrate. The lead-out portion 32 is fixed at the tip face thereof to the land 52 with the solder 60.

The following describes advantageous effects of Example 10.

In Example 10, the antenna device 30 is fixed to mounting substrate not only through the lead-out portion 32, which doubles as a feeder, but also through the fixation portions 38. As compared with the antenna device 30 in Example 1, the antenna device 30 having multiple fixation sites may be more securely fastened to the mounting substrate.

Example 11

Figure 15:
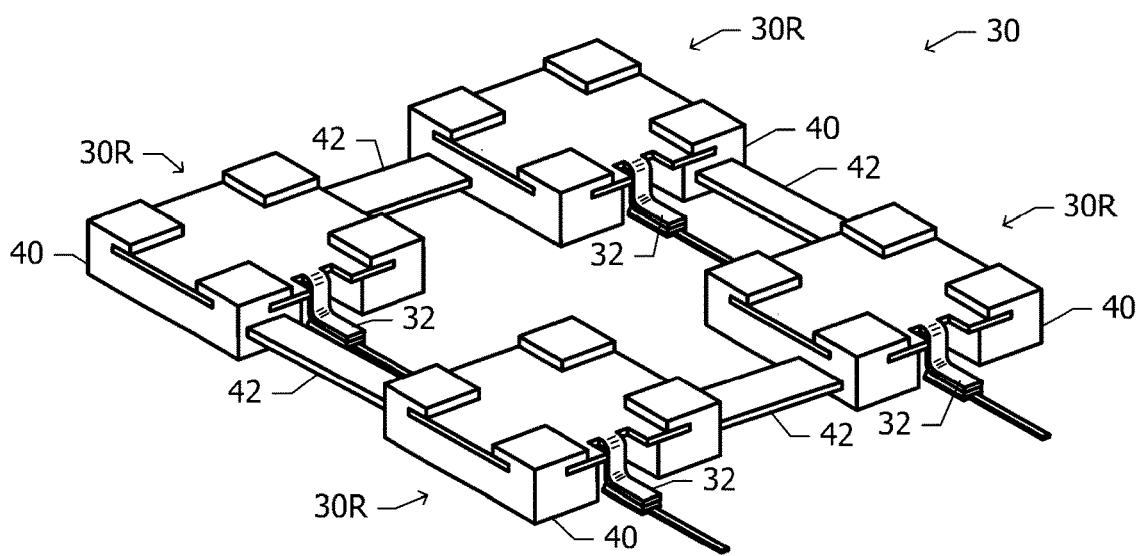
FIG. 15 is a perspective view of an antenna device in Example 11.

The following describes an antenna device in Example 11 with reference to FIG. 15. Configurations common to the antenna device 30 in Example 1 (see FIGS. 1, 3A, and 3B) and the antenna device in Example 11 will not be further elaborated here.

FIG. 15 is a perspective view of the antenna device 30 in Example 11. The antenna device 30 in Example 11 includes a plurality of (e.g., four) antenna devices 30R, which are discretely located from each other. Each of the discrete antenna devices 30R has the same structure as the antenna device 30 in Example 1. The discrete antenna devices 30R includes the respective dielectric members 40, which are connected to each other via the corresponding connection portions 42. When viewed in plan, the four discrete antenna devices 30R are arranged in a two-by-two matrix, and each connection portion 42 forms a connection between the dielectric members 40 of two discrete antenna devices 30R that are adjacent to each other in the column or row direction. The dielectric members 40 and the connection portions 42 are integrally molded.

The following describes advantageous effects of Example 11.

An antenna including multiple radiation conductors 31 in Example 11 may achieve higher gain. Unlike the case in which more than one antenna devices 30 in Example 1 are mounted on the mounting substrate 50 (see FIGS. 3A and 3B), the discrete antenna devices 30R may be arranged in the intended relative positions with ease and greater accuracy. The discrete antenna devices 30R includes the respective lead-out portions 32, which are used to fix the antenna device 30 to the mounting substrate 50. The antenna device 30 may thus be more securely fastened to the mounting substrate 50. The discrete antenna devices 30R constituting the antenna device 30 are formed as one unit by insert molding such that a reduction in production cost may be achieved.

The following describes a modification of Example 11.

In Example 11, the four discrete antenna devices 30R are formed as one unit. Alternatively, two discrete antenna devices 30R or three or more discrete antenna devices 30R may be formed as one unit. In Example 11, each connection portion 42 is disposed between the dielectric members 40 of two discrete antenna devices 30R that are adjacent to each other in the column or row direction. In an alternative connection configuration, the dielectric members 40 of the discrete antenna devices 30R may be formed into an indiscrete dielectric member that encompasses, when viewed in plan, the four discrete antenna devices 30R and has a shape of a flat plate.

The following describes antenna devices in other modifications of Example 11 with reference to FIGS. 16A and 16B.

Each of FIGS. 16A and 16B is a schematic plan view of the antenna device 30 in a corresponding modification of Example 11. In the modification illustrated FIG. 16A, the discrete antenna devices 30R are one-dimensionally arranged, for example, in a straight line. Referring to FIG. 16A, the discrete antenna devices 30R are hatched. Each connection portion 42 forms a connection between the dielectric members 40 of two discrete antenna devices 30R that are adjacent to each other. The discrete antenna devices 30R are disposed at irregular spacings. The spacing between two adjacent antenna devices 30R closer to an end portion of an array antenna including the discrete antenna devices 30R is greater than the spacing between two adjacent antenna devices 30R closer to the midsection of the antenna array.

In the modification illustrated in FIG. 16B, the discrete antenna devices 30R are two-dimensionally arranged in a matrix. The discrete antenna devices 30R are spaced uniformly in the column direction and are spaced at irregular intervals in the row direction. In each antenna device 30 into which a plurality of discrete antenna devices 30R are combined, the spacing between two adjacent antenna devices 30R closer to one end portion in the column direction is greater than the spacing between two adjacent antenna devices 30R closer to the other end portion in the column direction.

Two antenna devices 30 in the modification illustrated in FIG. 16B are arranged in the column direction in such a manner that the discrete antenna devices 30R constituting one antenna devices 30 and the discrete antenna devices 30R constituting the other antenna device 30 are mirror images of each other. A plurality of blocks each of which is composed of two antenna devices 30 arranged as described above are arranged in the column direction. The spacing between two discrete antenna devices 30R that are adjacent to each other in the column direction and farther away from the axis of symmetry is greater than the spacing between two discrete antenna devices 30R that are adjacent to each other in the column direction and closer to the axis of symmetry.

The modifications illustrated respectively in FIGS. 16A and 16B, in which the discrete antenna devices 30R are spaced at irregular intervals, enable the suppression of side lobes. In the modification illustrated in FIG. 16B, the discrete antenna devices 30R are spaced at irregular intervals in the column direction and are spaced uniformly in the row direction. Alternatively, the discrete antenna devices 30R may be spaced at irregular intervals in the column direction and in the row direction.

Example 12

Figure 17:
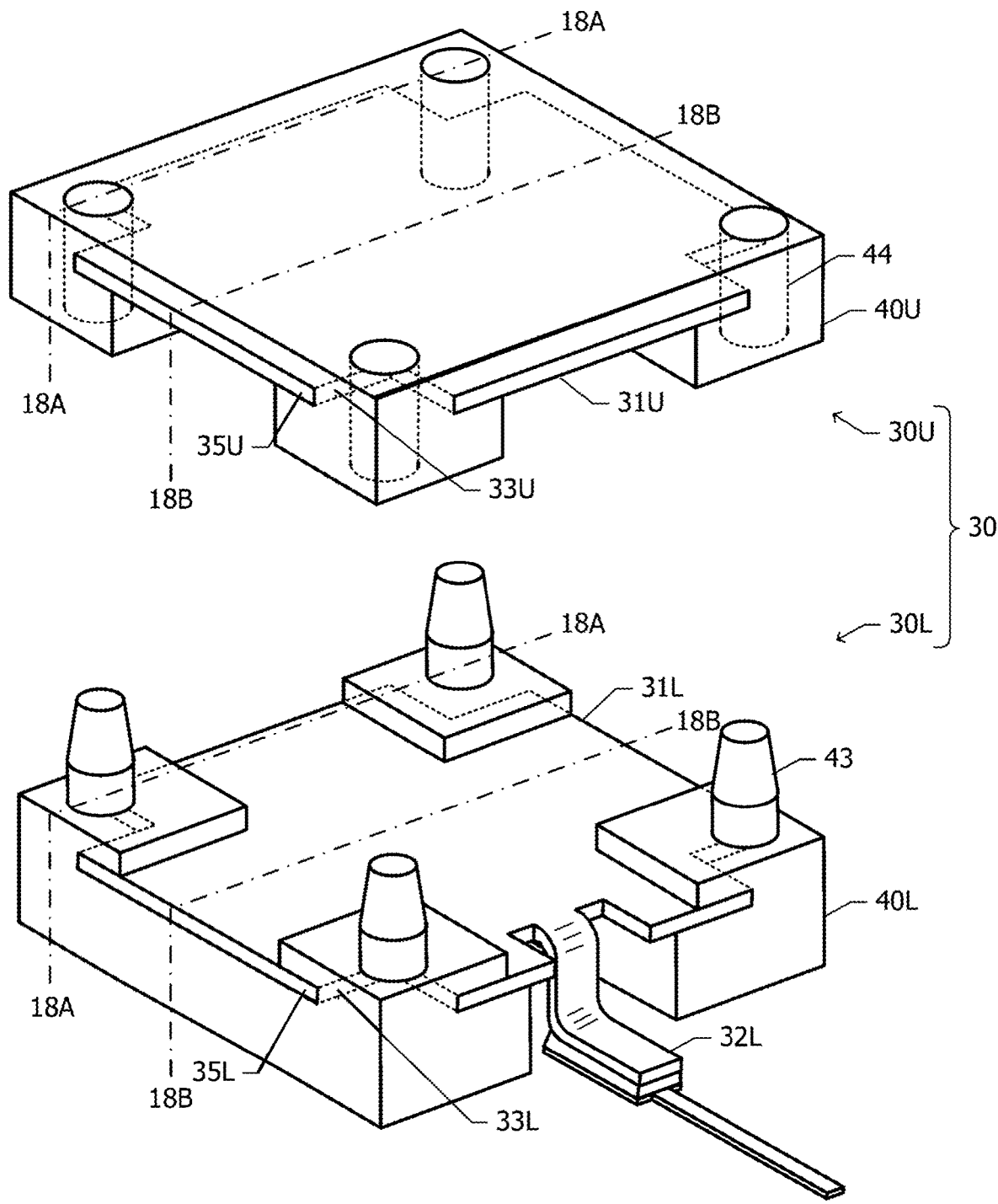
FIG. 17 is an exploded perspective view of an antenna device in Example 12.
Figure 18A:
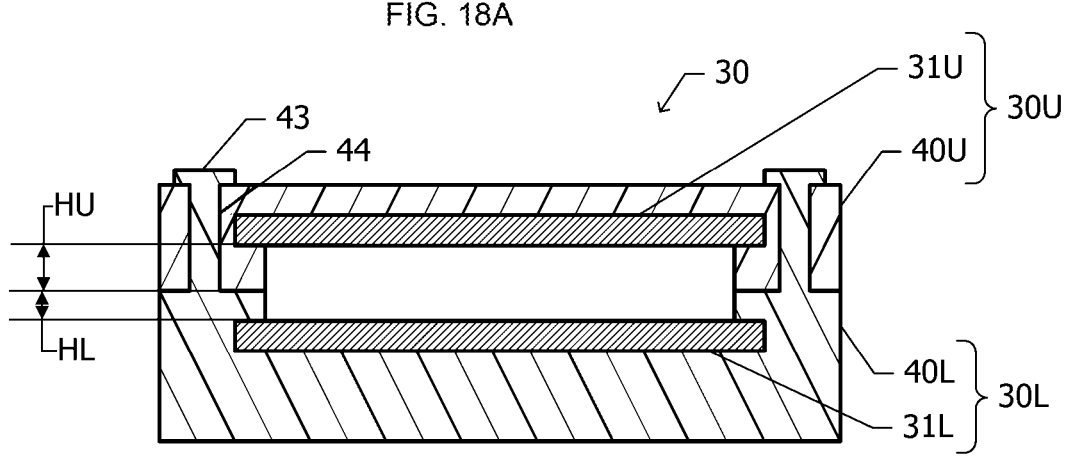
FIG. 18A is a sectional view of the antenna device in the state of being an assembled unit, corresponding to a plane denoted by dash-dot line 18A-18A in FIG. 17.
Figure 18B:
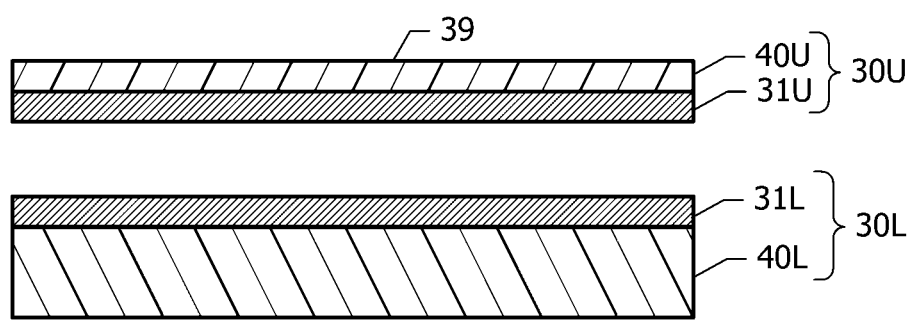
FIG. 18B is a sectional view of the antenna device in the state of being an assembled unit, corresponding to a plane denoted by dash-dot line 18B-18B in FIG. 17.

The following describes an antenna device in Example 12 with reference to FIGS. 17, 18A, and 18B. Configurations common to the antenna device 30 in Example 1 (see FIGS. 1, 3A, and 3B) and the antenna device in Example 12 will not be further elaborated here. The same holds true for the antenna module in Example 1 and an antenna module in Example 12.

FIG. 17 is an exploded perspective view of the antenna device 30 in Example 12. The antenna device 30 in Example 12 is composed of a lower part 30L and an upper part 30U.

The lower part 30L includes a radiation conductor 31L, a lead-out portion 32L, and a dielectric member 40L. Configurations of the radiation conductor 31L, the lead-out portion 32L, and the dielectric member 40L are substantially identical to the configurations of the radiation conductor 31, the lead-out portion 32, and the dielectric member 40, respectively, of the antenna device 30 in Example 1. The lower part 30L includes projection 43, each of which is provided on the corresponding one of upper faces in four corners of the dielectric member 40L on the upper face side of the radiation conductor 31L.

The upper part 30U includes a radiation conductor 31U (a second radiation conductor) and a dielectric member 40U. When viewed in plan, the radiation conductor 31U has a shape substantially identical to the shape of the radiation conductor 31L in the lower part 30L. More specifically, the radiation conductor 31U is substantially in the shape of a cross obtained by cutting away four corners of a rectangle. The radiation conductor 31U includes sandwiched portions 35U, each of which extends along end faces of a cutout 33U in the corresponding one of four corners of the radiation conductor 31U and is supported in such a manner as to be sandwiched between portions of the dielectric member 40U. It is not required that the dimensions of the rectangular shape of the radiation conductor 31L whose four corners are yet to be cut away be identical to the dimensions of the rectangular shape of the radiation conductor 31U whose four corners are yet to be cut away. Similarly, it is not required that the dimensions of the cutouts 33U of the radiation conductor 31U be identical to the dimensions of cutouts 33L of the radiation conductor 31L.

The upper face of the radiation conductor 31U in the upper part 30U is entirely covered with the dielectric member 40U. The lower face of the radiation conductor 31U except for the sandwiched portions 35U is exposed. When viewed in plan, the dielectric member 40U has a shape substantially identical to the shape of the rectangular shape of the radiation conductor 31U whose four corners are yet to be cut away. The dielectric member 40U has through-holes 44, which are located in regions corresponding to the cutouts 33U and extend from the upper face to the lower face of the dielectric member 40U. The four projections 43 included in the lower part 30L are inserted into the four corresponding through-hole 44 of the upper part 30U, which is aligned over the lower part 30L accordingly.

FIG. 18A is a sectional view of the antenna device 30 in the state of being an assembled unit, corresponding to a plane denoted by dash-dot line 18A-18A in FIG. 17. The projections 43 are fitted in the respective through-holes 44. The projections 43 are protruded above the upper face of the upper part 30U. The projections 43 are subjected to staking, and the upper part 30U is fastened to the lower part 30L accordingly. The projections 43 may be subjected to heat staking. A gap is defined between the radiation conductor 31L in the lower part 30L and the radiation conductor 31U in the upper part 30U and is filled with air.

HL denotes the height corresponding to the distance between the upper face of the radiation conductor 31L in the lower part 30L and the uppermost face of the dielectric member 40L except for the projections 43. HU denotes the height corresponding to the distance between the lower face of radiation conductor 31U in the upper part 30U and the lower face of the dielectric member 40U. The spacing between the radiation conductors 31L and 31U is equal to the sum of HL and HU.

FIG. 18B is a sectional view of the antenna device 30 in the state of being an assembled unit, corresponding to a plane denoted by dash-dot line 18B-18B in FIG. 17. A gap is defined between the radiation conductor 31L in the lower part 30L and the radiation conductor 31U in the upper part 30U and is filled with air. The proximity of the radiation conductors 31L and 31U is close enough to provide magnetic field coupling between them. The radiation conductors 31L and 31U are arranged in parallel. The spacing between the radiation conductors 31L and 31U is smaller than the dimensions of the radiation conductors 31L and 31U in the resonance direction. This configuration eliminates or reduces the possibility that higher-mode resonance occurs in the thickness direction of the radiation conductors 31L and 31U. This enables the antenna to operate at a high degree of radiation efficiency.

The following describes advantageous effects of Example 12.

In Example 12, the radiation conductor 31U in the upper part 30U functions as a parasitic element, and a stacked patch antenna is provided accordingly. This configuration enables the coverage of a broader frequency range. The gap defined between the radiation conductors 31L and 31U offers an advantage in that the effective dielectric constant in the region around the radiation conductors 31L and 31U may be lower than the dielectric constant in the region around the radiation conductors having a dielectric material disposed therebetween; that is, a lower dielectric constant may be achieved.

The spacing between the radiation conductors 31L and 31U (i.e., the sum of HL and HU) may vary depending on how accurate the dimensions of the dielectric members 40L and 40U are in the manufacturing process. Greater accuracy of the dimensions of the dielectric members 40L and 40U may ensure greater accuracy of the spacing between the radiation conductors 31L and 31U (i.e., the sum of HL and HU).

The following describes a modification of Example 12.

In Example 12, the dielectric member 40U in the upper part 30U and the dielectric member 40L in the lower part 30L are separately molded dielectric members. Alternatively, the dielectric members 40U and 40L may be provided as an integrally molded member. The dielectric members 40U and 40L may be herein collectively referred to as a dielectric member.

In Example 12, the upper face of the radiation conductor 31U in the upper part 30U is entirely covered with the dielectric member 40U. Alternatively, the upper face of the radiation conductor 31U may be partially exposed. That is, part of the upper face of the radiation conductor 31 may not be overlaid with the dielectric member 40U. Owing to the exposure of part of the upper face of the radiation conductor 31U, the dielectric constant in the region around the radiation conductor 31U may be much lower.

Example 13

Figure 19:
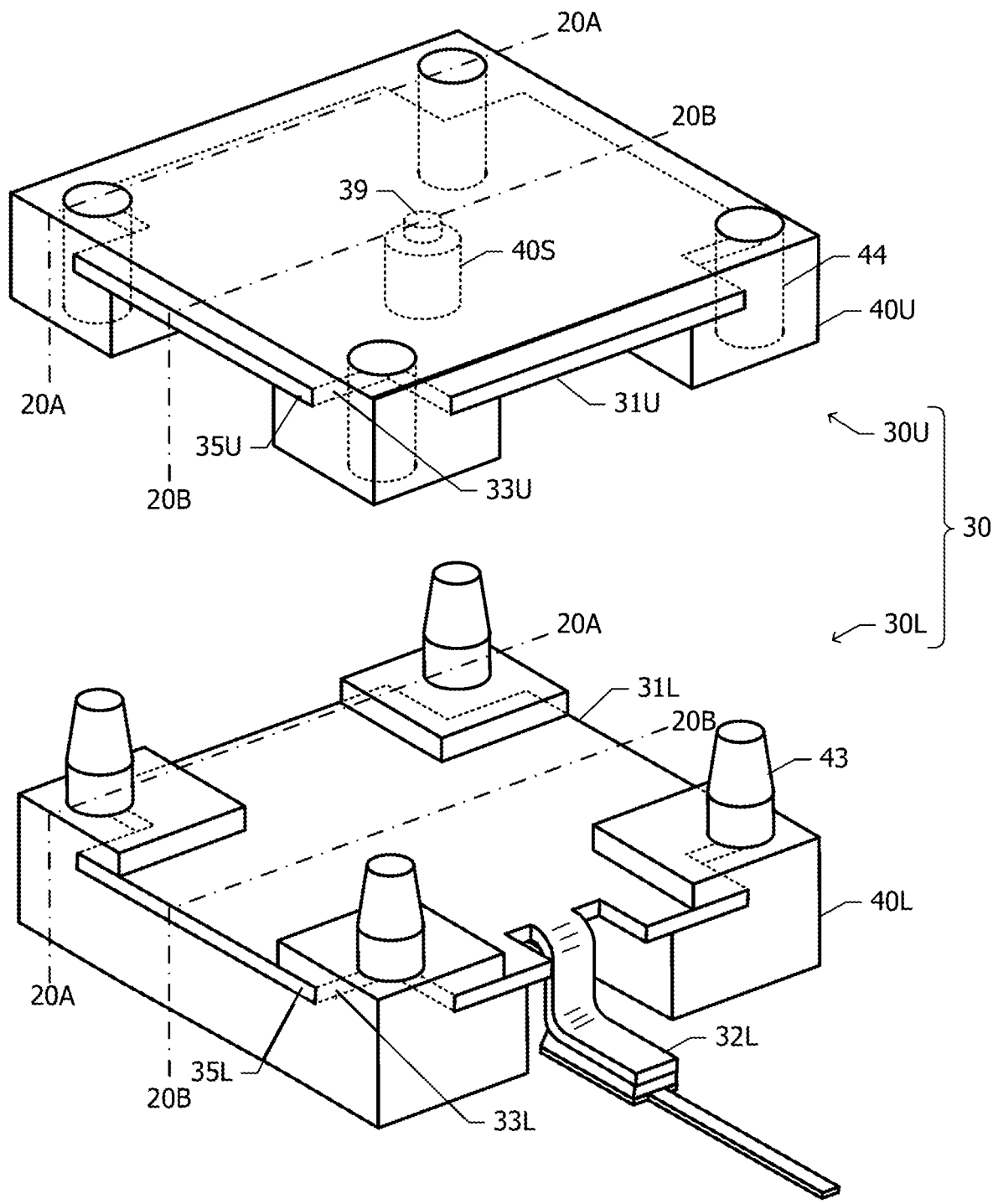
FIG. 19 is an exploded perspective view of an antenna device in Example 13.
Figure 20A:
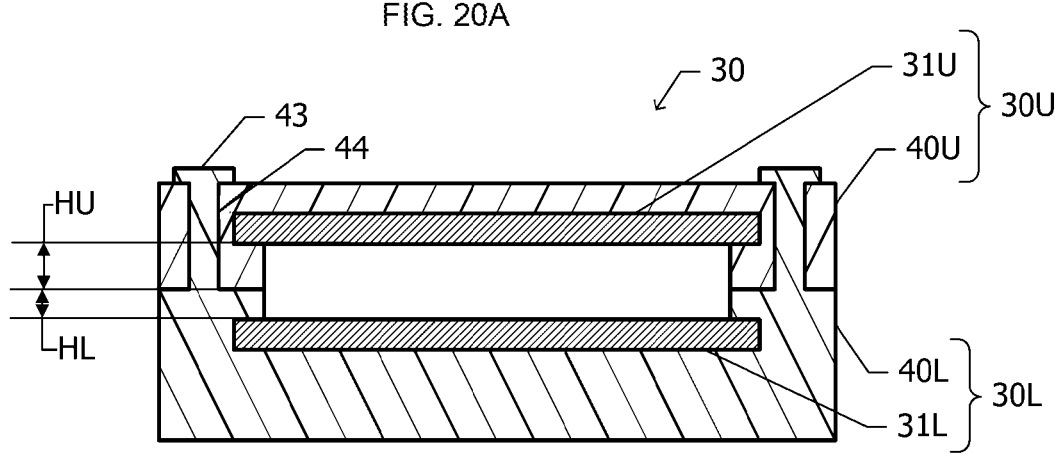
FIG. 20A is a sectional view of the antenna device in the state of being an assembled unit, corresponding to a plane denoted by dash-dot line 20A-20A in FIG. 19.
Figure 20B:
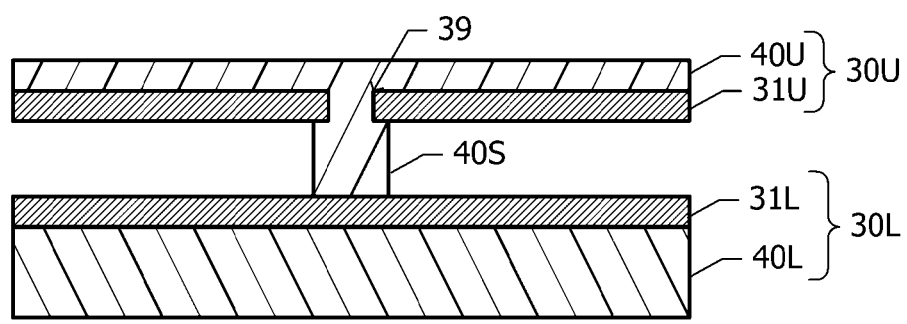
FIG. 20B is a sectional view of the antenna device in the state of being an assembled unit, corresponding to a plane denoted by dash-dot line 20B-20B in FIG. 19.

The following describes an antenna device in Example 13 with reference to FIGS. 19, 20A, and 20B. Configurations common to the antenna device 30 in Example 12 (see FIGS. 17, 18A, and 18B) and the antenna device in Example 13 will not be further elaborated here.

FIG. 19 is an exploded perspective view of the antenna device 30 in Example 13. FIGS. 20A and 20B are sectional views of the antenna device 30 in the state of being an assembled unit, corresponding respectively to a plane denoted by dash-dot line 20A-20A in FIG. 19 and a plane denoted by dash-dot line 20B-20B in FIG. 19.

In Example 13, the radiation conductor 31U in the upper part 30U has an opening 39 (see FIGS. 19 and 20B) at the center thereof. A spacer 40S is disposed between the radiation conductor 31L in the lower part 30L and the radiation conductor 31U in the upper part 30U. The spacer 40S is in contact with the dielectric member 40U, which covers the upper face of the radiation conductor 31U, through the opening 39 of the radiation conductor 31U. The height of the spacer 40S is equal to the sum of HL and HU.

The following describes advantageous effects of Example 13.

A disadvantage of the integral molding of the radiation conductor 31L and dielectric member 40L, which are included in the lower part 30L, is that the radiation conductor 31L can be warped convexly upward due to the difference in thermal expansion coefficient between metal and resin. Similarly, the radiation conductor 31U in the upper part 30U can be warped convexly downward. Once the radiation conductors 31L and 31U become warped, the spacing between them may be no longer at the design value, and as a result, the antenna device may fail to perform as specified by any given design value.

In Example 13, the spacer 40S suppresses warpage of the radiation conductors 31L and 31U. The spacing between the radiation conductors 31L and 31U is thus kept substantially at the design value, and the desired performance may be achieved accordingly. The spacer 40S and the dielectric member 40U are integrally molded, which in turn ensures a sufficient degree of positioning accuracy of the spacer 40S with respect to the radiation conductors 31L and 31U. This approach addresses the unevenness of antenna characteristics that would be otherwise increased due to the presence of the spacer 40S.

The opening 39 of the radiation conductor 31U is preferably small enough not to interrupt radio-frequency current induced by the radiation conductor 31U. Furthermore, the opening 39 is preferably large enough not to block the entry of liquid resin charged for integral molding of the dielectric member 40U and the spacer 40S. The size of the opening 39 is to meet the following conditions: the opening 39 does not interrupt radio-frequency current; and the opening 39 does not block the entry of liquid resin.

The following describes a modification of Example 13.

In Example 13, the radiation conductor 31U in the upper part 30U has the opening 39, which enables integral molding of the spacer 40S and the dielectric member 40U, which is included in the upper part 30U. Alternatively, the radiation conductor 31L in the lower part 30L may have an opening that enables integral molding of the spacer 40S and the dielectric member 40L, which is included in the lower part 30L.

In Example 13, the spacer 40S is located substantially at the center of the radiation conductor 31U viewed in plan. Alternatively, the spacer 40S may be off-center, or more specifically, may be placed in any position where the spacer 40S can suppress warpage of the radiation conductors 31L and 31U.

Example 14

Figure 21A:
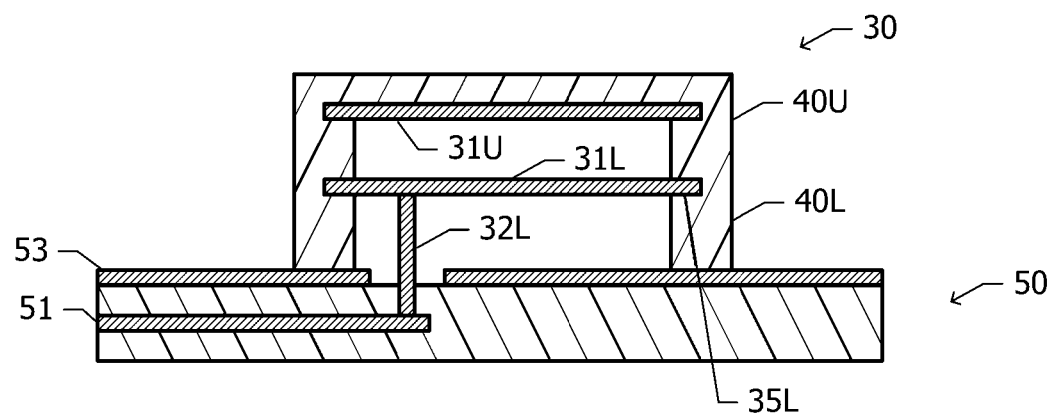
FIG. 21A is a schematic sectional view of an antenna module in Example 14.
Figure 21B:
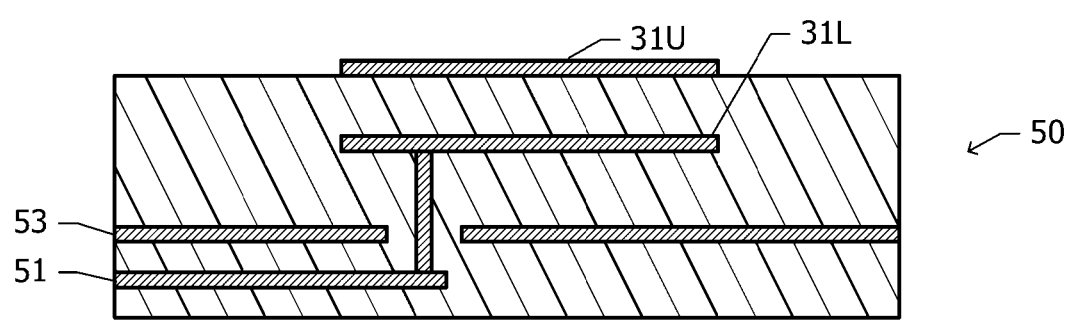
FIG. 21B is a schematic sectional view of an antenna module in Comparative Example.

The following describes an antenna device in Example 14 with reference to FIGS. 21A and 21B. Configurations common to the antenna device in Example 12 (see FIGS. 17, 18A, and 18B) and the antenna device in Example 14 will not be further elaborated here.

FIG. 21A is a schematic sectional view of the antenna device in Example 14. In Example 14, the lower face of the radiation conductor 31L on the lower side except for a sandwiched portion 35L is exposed to air. As in Example 12, a gap is defined between the radiation conductor 31L on the lower side and the radiation conductor 31U on the upper side. The radiation conductor 31L is supplied with radio-frequency signals through the feed line 51 disposed in the mounting substrate 50 and through the lead-out portion 32L extending from the radiation conductor 31L.

FIG. 21B is a schematic sectional view of an antenna device in Comparative Example. In Comparative Example, both the radiation conductor 31L on the lower side and the radiation conductor 31U on the upper side are built in the mounting substrate 50. The dielectric material of the mounting substrate 50 is laid between the ground conductor 53 provided as an inner layer of the mounting substrate 50 and the radiation conductor 31L and between the radiation conductor 31L on the lower side and the radiation conductor 31U on the upper side.

The following describes advantageous effects of Example 14 illustrated in FIG. 21A in comparison with Comparative Example illustrated in FIG. 21B.

In Example 14, a gap is defined between the ground conductor 53 on the mounting substrate 50 and the radiation conductor 31L on the lower side of the antenna device 30 mounted on the mounting substrate 50. Another gap is defined between the radiation conductor 31L on the lower side and the radiation conductor 31U on the upper side as in Example 12 (see FIGS. 17, 18A, and 18B). This configuration produces an advantageous effect that the effective dielectric constant in the region around the radiation conductors 31L and 31U is lower than that in Comparative Example illustrated in FIG. 21B.

In Comparative Example illustrated in FIG. 21B, the region extending from the ground conductor 53 to the radiation conductor 31U on the upper side has a given height, which is determined in accordance with the desired antenna characteristics. This involves a considerable overall thickness of the mounting substrate 50. In Example 14 illustrated in FIG. 21A, meanwhile, the antenna device 30 is mounted on the surface of the mounting substrate 50, which may thus be thinner than the mounting substrate 50 in Comparative Example. The use of a flexible substrate as the mounting substrate 50 facilitates bending of the mounting substrate 50.

Example 15

Figure 22A:
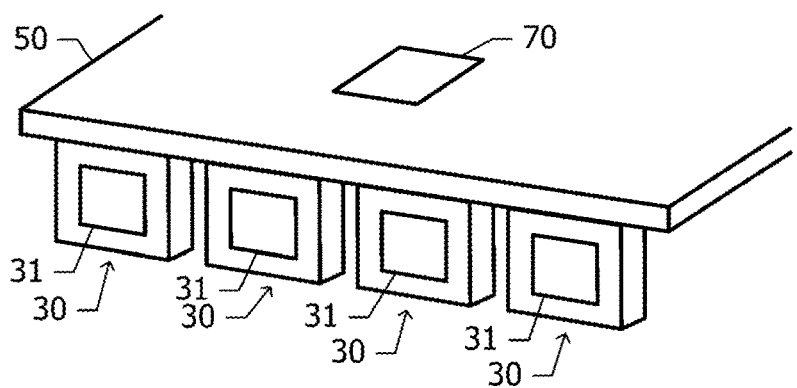
FIG. 22A is a perspective view of an antenna module in Example 15.
Figure 22B:
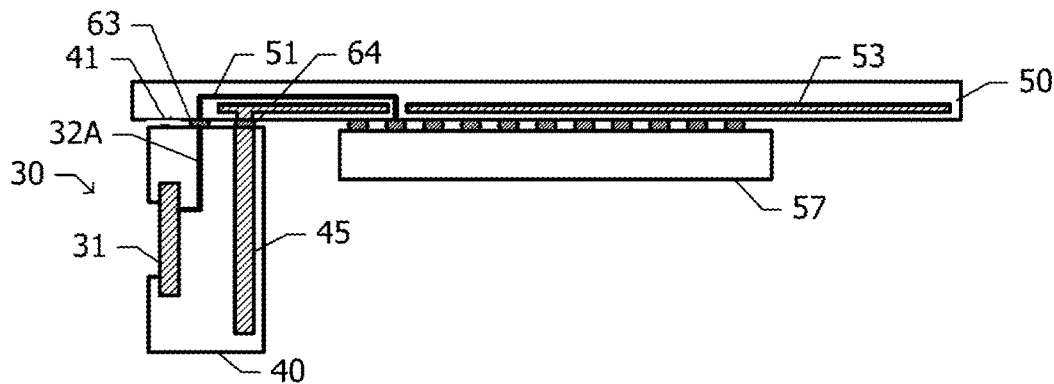
FIG. 22B is a sectional view of the antenna module in Example 15.
Figure 22C:
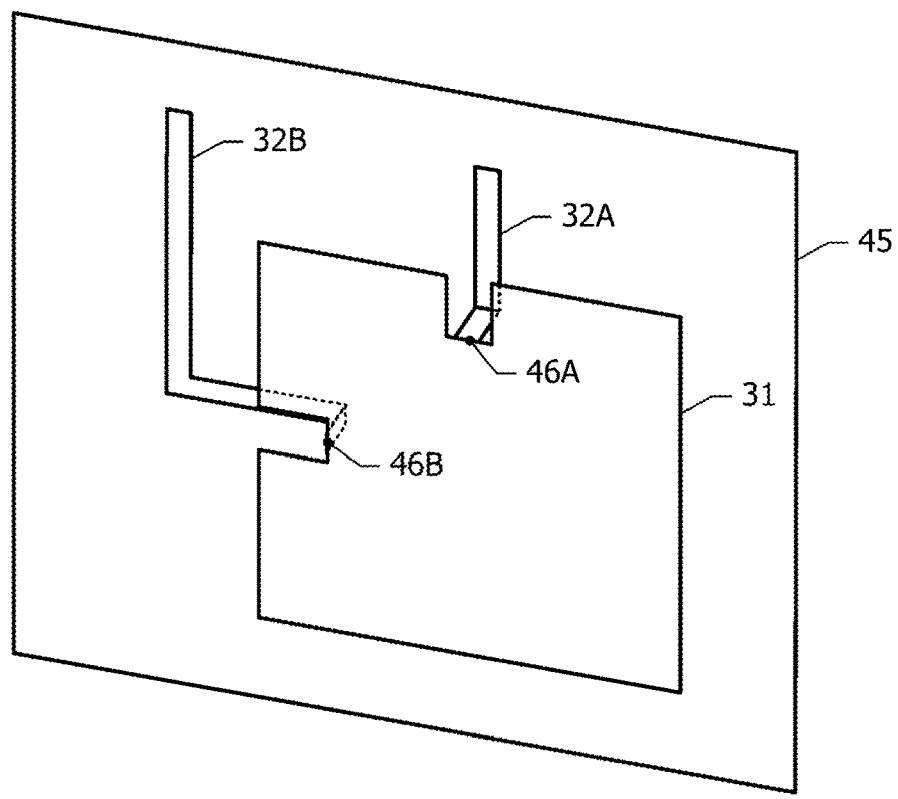
FIG. 22C is a perspective view of a radiation conductor and a ground conductor included in an antenna device in Example 15.

The following describes an antenna device and an antenna module in Example 15 with reference to FIGS. 22A, 22B, and 22C. Configurations common to the antenna device 30 in Example 1 (see FIGS. 1, 3A, and 3B) and the antenna device in Example 15 will not be further elaborated here. The same holds true for the antenna module in Example 1 and the antenna module in Example 15.

FIGS. 22A and 22B are a perspective view and a sectional view, respectively, of the antenna module in Example 15. FIG. 22C is a perspective view of the radiation conductor 31 and a ground conductor 45 included in the antenna device 30. Referring to FIG. 22C, a metal plate provided as the radiation conductor 31 and a metal plate provided as the ground conductor 45 are illustrated as having no thickness.

A plurality of antenna devices 30 are mounted on the mounting substrate 50. In Example 1, the radiation conductor 31 is parallel to the surface of the mounting substrate 50 (see FIGS. 3A and 3B) having the antenna device 30 mounted thereon. In Example 15, meanwhile, the radiation conductors 31 included in the respective antenna devices 30 are perpendicular to the surface of the mounting substrate 50.

In Example 1, the radiation conductor 31 and the ground conductor 53 (see FIGS. 3A and 3B) on the mounting substrate 50 constitute a patch antenna. In Example 15, meanwhile, each antenna device 30 includes the ground conductor 45. The radiation conductor 31 is substantially parallel to the ground conductor 45. The radiation conductor 31 and the ground conductor 45 constitute a patch antenna. At least part of the ground conductor 45 is sandwiched between portions of the dielectric member 40, and the ground conductor 45 is supported by the dielectric member 40 accordingly.

The dielectric member 40 has a side face perpendicular to the radiation conductor 31 and to the ground conductor 45. Each antenna device 30 is mounted on the mounting substrate 50 in such a manner that the side face concerned faces the mounting substrate 50. The side face facing the mounting substrate 50 is referred to as a facing surface 41.

The radiation conductor 31 is substantially rectangular when viewed in plan. The radiation conductor 31 includes two feeding points, namely, feeding points 46A and 46B. Each of the feeding points 46A and 46B is disposed on the slightly inner side with respect to the midpoint of the corresponding one of two adjacent sides of the radiation conductor 31. Lead-out portions 32A and 32B extend respectively from the feeding points 46A and 46B of the radiation conductor 31 in the thickness direction of the radiation conductor 31. Each of the lead-out portions 32A and 32B, which extend respectively from the feeding points 46A and 46B in the thickness direction, is bent substantially at a right angle and extends in a direction parallel to the radiation conductor 31 to reach the facing surface 41 (see FIG. 22B). Tip faces of the lead-out portions 32A and 32B are exposed at the facing surface 41. The lead-out portions 32A and 32B are disposed between the radiation conductor 31 and the ground conductor 45. Part of an end face of the ground conductor 45 is exposed at the facing surface 41 (see FIG. 22B). When being viewed in plan, the ground conductor 45 is larger than the radiation conductor 31 and encompasses the radiation conductor 31.

The mounting substrate 50 includes the ground conductor 53 and a plurality of feed lines 51. The tip faces of the lead-out portions 32A and 32B are connected via solder 63 to the feed lines 51 disposed in the mounting substrate 50. The ground conductor 45 is connected via solder 64 to the ground conductor 53 disposed in the mounting substrate 50. A patch antenna 70 is provided in the mounting substrate 50 and is exposed at the surface of the mounting substrate 50. The radio-frequency integrated circuit element 57 is mounted on the mounting substrate 50.

The following describes advantageous effects of Example 15.

In Example 15, the patch antenna 70 provided in the mounting substrate 50 has high directivity in the direction normal to the mounting substrate 50. The antenna devices 30 mounted on the mounting substrate 50 has high directivity in a direction from the ground conductor 45 toward the radiation conductor 31. An antenna module with a strong directivity in the direction normal to the mounting substrate 50 and in the end fire direction is provided accordingly.

Each radiation conductor 31 including the feeding points 46A and 46B enables the transmission and reception of two types of radio waves, the polarization directions of which are orthogonal to each other.

The following describes a modification of Example 15.

In Example 15, each radiation conductor 31 includes the feeding points 46A and 46B. Alternatively, each radiation conductor 31 may include the feeding point 46A or 46B. If radiation of radio waves does not involve the selection between two planes of polarization that are perpendicular to each other, one feeding point will suffice.

In Example 15, the lead-out portions 32A and 32B leading out of the radiation conductor 31 is laid in the thickness direction before being bent. Alternatively, the lead-out portions 32A and 32B may be flush with the radiation conductor 31. Although the ground conductor 45 of the antenna device 30 is electrically connected to the ground conductor 53 disposed in the mounting substrate 50 in Example 15, it is not always required that the ground conductor 45 be electrically connected to the ground conductor 53 disposed in the mounting substrate 50.

Figure 23:
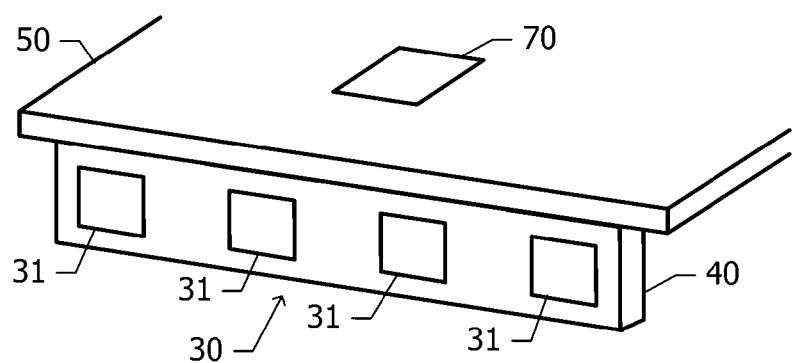
FIG. 23 is a perspective view of an antenna module in a modification of Example 15.

FIG. 23 is a perspective view of an antenna module in another modification in Example 15. In Example 15, each dielectric member 40 supports one radiation conductor 31. In the modification illustrated in FIG. 23, meanwhile, each dielectric member 40 supports more than one radiation conductors 31. The radiation conductors 31 may thus be arranged in the intended relative positions with greater accuracy.

Example 16

Figure 24A:
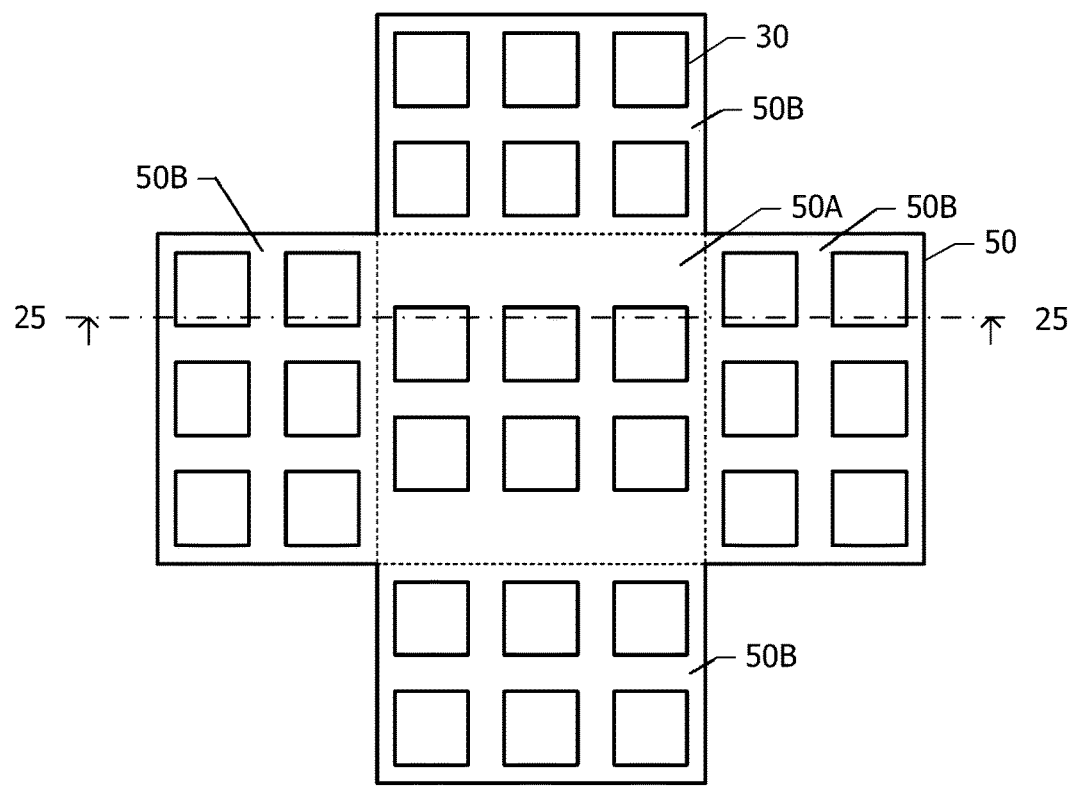
FIG. 24A is a plan view of an antenna module in Example 16.
Figure 24B:
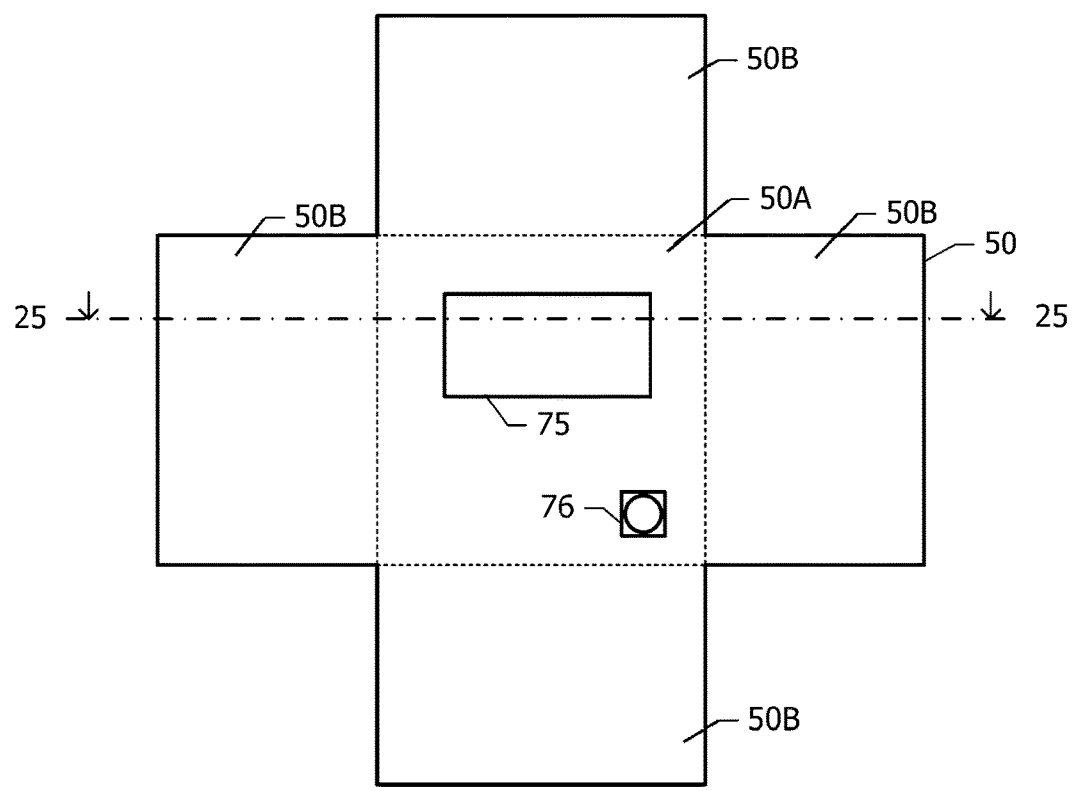
FIG. 24B is a bottom view of the antenna module in Example 16.
Figure 25:
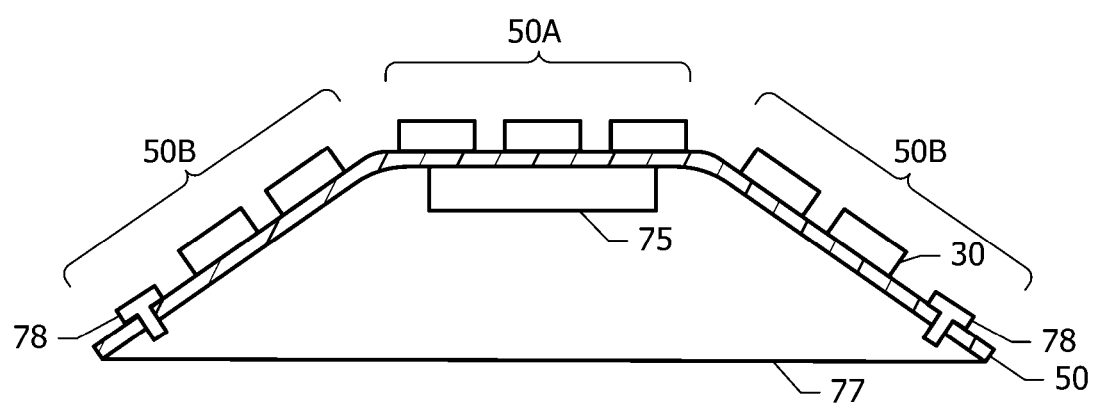
FIG. 25 is a sectional view of the antenna module taken along dash-dot line 25-25 in FIGS. 24A and 24B.

The following describes an antenna device and an antenna module in Example 16 with reference to FIGS. 24A, 24B, and 25. Configurations common to the antenna device 30 in Example 1 (see FIGS. 1, 3A, and 3B) and the antenna device in Example 16 will not be further elaborated here. The same holds true for the antenna module in Example 1 and the antenna module in Example 16.

FIGS. 24A and 24B are a plan view and a bottom view of the antenna module in Example 16. A flexible substrate is used as the mounting substrate 50. The mounting substrate 50 includes a first portion 50A, which has a rectangular shape, and four second portions 50B, each of which extends outward from the corresponding one of four sides of the first portion 50A. The first portion 50A and the second portions 50B have upper faces, each of which is provided with a plurality of antenna devices 30 mounted thereon. For example, an upper face of the first portion 50A and upper faces of the second portions 50B are provided with six antenna devices 30 each, which are arranged in a matrix with two rows and three columns or in a matrix with three rows and two columns.

A system-in-package (SiP) module 75 and a connector 76 are mounted of a lower face of first portion 50A. The SiP module 75 includes a package substrate populated with a radio-frequency integrated circuit element, a resistance element, a capacitor, an inductor, a DC-to-DC converter, and other peripheral circuit components that are necessary for the operation of the radio-frequency integrated circuit element. The connector 76 is connected to the SiP module 75 via a transmission line disposed in the mounting substrate 50. The SiP module 75 is connected to the antenna devices 30 via the feed lines disposed in the mounting substrate 50.

FIG. 25 is a sectional view of the antenna module taken along dash-dot line 25-25 in FIGS. 24A and 24B. The mounting substrate 50 is shaped to extend along an upper face and oblique faces of a heat-dissipating member 77, which is substantially in the shape of a quadrangular frustum. The heat-dissipating member 77 may be a metal block (heat sink) provided as a discrete component or may be a heat-dissipating member accommodated in a housing of a communication terminal. The first portion 50A is disposed on the upper face of the heat-dissipating member 77, and the second portions 50B are disposed on the corresponding oblique faces of the heat-dissipating member 77. FIG. 24B is a bottom view of the antenna module, illustrating the state in which the heat-dissipating member 77 is removed. The mounting substrate 50 is fastened to the heat-dissipating member 77 with a plurality of screws 78.

The following describes advantageous effects of Example 16.

In Example 16, the frontward direction (the direction normal to the radiation conductor 31 (see FIG. 1)) may vary among the antenna devices 30 due to the use of a flexible substrate as the mounting substrate 50. An antenna with wide directivity may be provided accordingly.

Instead of being disposed on the mounting substrate 50, the radiation conductors 31 are included in the respective antenna devices 30, which are mounted on the mounting substrate 50. This configuration enables a reduction in profile of the mounting substrate 50. This is similar to what has been discussed through a comparison of FIGS. 21A and 21B. The mounting substrate 50 thus gains improved flexibility, which is another advantageous effect of Example 16.

The following describes a modification of Example 16.

In Example 16, the SiP module 75 is mounted on the mounting substrate 50. Alternatively, components such as a radio-frequency integrated circuit element, a resistance element, a capacitor, an inductor, a DC-to-DC converters may be separately mounted on the mounting substrate 50.

Example 17

Figure 26A:
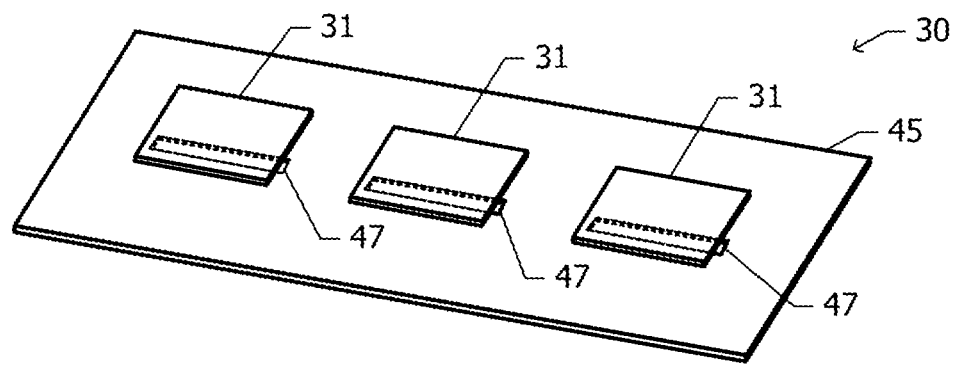
FIG. 26A is a perspective view of a radiation conductor and a ground conductor included in an antenna device in Example 17.
Figure 26B:
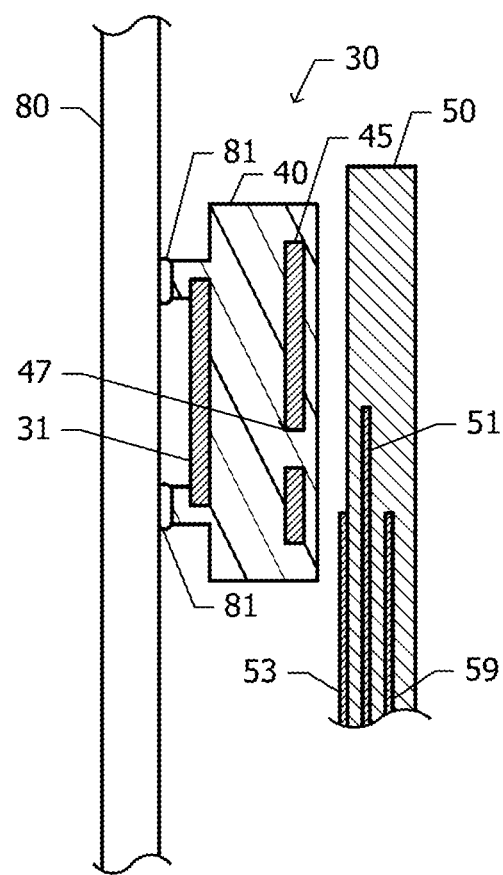
FIG. 26B is a sectional view of an antenna module, illustrating the state in which the antenna device in Example 17 is fitted on a frame of a housing of a communication apparatus.

The following describes an antenna device in Example 17 with reference to FIGS. 26A and 26B. Configurations common to the antenna device 30 in Example 1 (see FIGS. 1, 3A, and 3B) and the antenna device in Example 17 will not be further elaborated here.

FIG. 26A is a perspective view of the radiation conductors 31 and the ground conductor 45 included in the antenna device 30 in Example 17. The antenna device 30 in Example 17 includes more than one (e.g., three) radiation conductors 31 and one ground conductor 45. The radiation conductors 31 are arranged parallel to the ground conductor 45. The ground conductor 45 has coupling slots 47, which are provided for the respective radiation conductors 31. When the ground conductor 45 is viewed in plan in the direction normal thereto, the ground conductor 45 encompasses the radiation conductors 31.

FIG. 26B is a sectional view, illustrating the state in which the antenna device 30 in Example 17 is fitted on a frame 80 of a housing of a communication apparatus. The antenna device 30 is accommodated in the housing including the frame 80. The antenna device 30 including the radiation conductors 31 and the dielectric member 40 and the housing including the antenna device 30 mounted thereon may be herein collectively referred to as an antenna device. The antenna device 30 in Example 17 includes the radiation conductors 31, the ground conductor 45, and the dielectric member 40. The dielectric member 40 supports the radiation conductors 31 and the ground conductor 45 in such a manner that part of each radiation conductor 31 and at least part of the ground conductor 45 are sandwiched between portions of the dielectric member 40 in the thickness direction. A face of the dielectric member 40 pointing in the direction in which the radiation conductor 31 is viewed from the ground conductor 45 is referred to as an upper face. Another face of the dielectric member 40 pointing in the opposite direction is referred to as a lower face. The antenna device 30 is fitted onto the frame 80 of the housing with an adhesive 81 in such a manner that the upper face of the dielectric member 40 faces an inner face of the frame 80 of the housing. The housing serves as a supporting member that mechanically supports the antenna device 30.

The mounting substrate 50 is placed in the housing in such a manner as to face the lower face of the dielectric member 40. The ground conductor 45 is located between each radiation conductor 31 and the mounting substrate 50. The housing accommodates the radio-frequency integrated circuit element 57 (see FIG. 3A) and the baseband integrated circuit element 67 (see FIG. 3A). The mounting substrate 50 includes: the ground conductor 53 provided as a surface layer, the ground conductor 59 provided as an inner layer; and the feed line 51 disposed between the ground conductors 53 and 59. The radio-frequency integrated circuit element (see FIG. 3A) is mounted on the mounting substrate 50. The feed line 51 is coupled to the radiation conductors 31 through the coupling slots 47. This configuration provides slot-coupled feed in which power is transferred from the feed line 51 to the radiation conductors 31.

The ground conductor 45 included in the antenna device 30 is preferably short-circuited to the ground conductor 53 provided as a surface layer of the mounting substrate 50. The antenna device 30 preferably includes, for example, a metal leaf spring that forms an electrical connection between the ground conductor 45 in the antenna device 30 and the ground conductor 53 on the mounting substrate 50. Part of the ground conductor 45 may be geometrically modified to serve as a leaf spring.

The following describes advantageous effects of Example 17.

In Example 17, the antenna device 30 and the mounting substrate 50 are fixed in the predetermined positions on the frame 80 of the housing. This configuration provides the coupling between the feed line 51 in the mounting substrate 50 and the radiation conductors 31 of the antenna device 30. Instead of being fitted on the frame 80, the antenna device 30 may be fixed to another portion of the housing.

The following describes an antenna device in a modification of Example 17 with reference to FIGS. 27A and 27B.

FIGS. 27A and 27B are sectional views, each of which illustrates the state in which the antenna device 30 in a corresponding modification of Example 17 is fitted on the frame 80 of a housing of a communication apparatus. In the modification illustrated in FIG. 27A, the frame 80 of the housing is provided with a mechanical support 82. The mechanical support 82 includes a plurality of clamping claws protruding from the frame 80 of the housing. The antenna device 30 is supported on the frame 80 of the housing in such a manner as to be clamped with the clamping claws of the mechanical support 82. The mechanical support 82 holds the antenna device 30 in a specific attitude and in a specific position with respect to the frame 80 of the housing. In the modification illustrated in FIG. 27B, the dielectric member 40 of the antenna device 30 has a plurality of through-holes extending from the upper face to the lower face of the dielectric member 40. The antenna device 30 is fastened to the frame 80 of the housing with screws 83 through the through-holes. Instead of being provided on the frame 80, the mechanical support 82 may be provided on another portion of the housing. Instead of being screwed to the frame 80, the antenna device 30 may be screwed to another portion of the housing.

Example 18

Figure 28B:
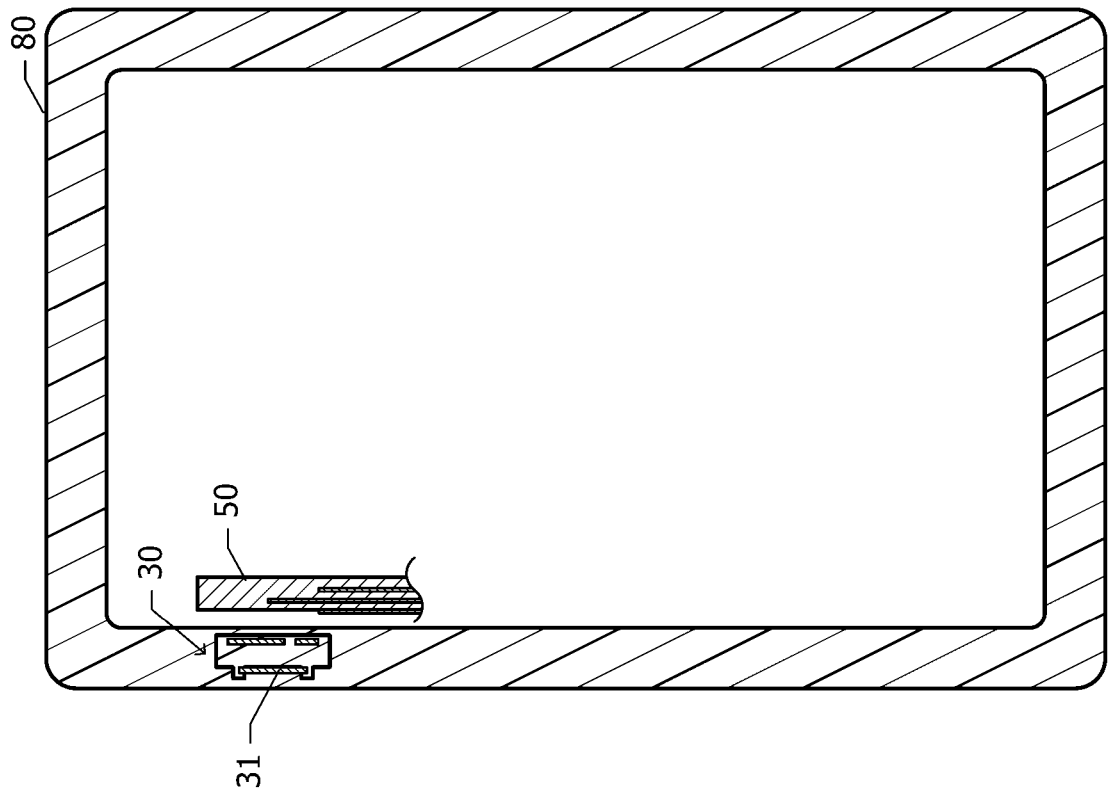
FIG. 28B is a schematic sectional view of a frame of a housing of a communication apparatus, illustrating the state in which an antenna module in a modification of Example 18 is fitted on the frame.
Figure 28A:
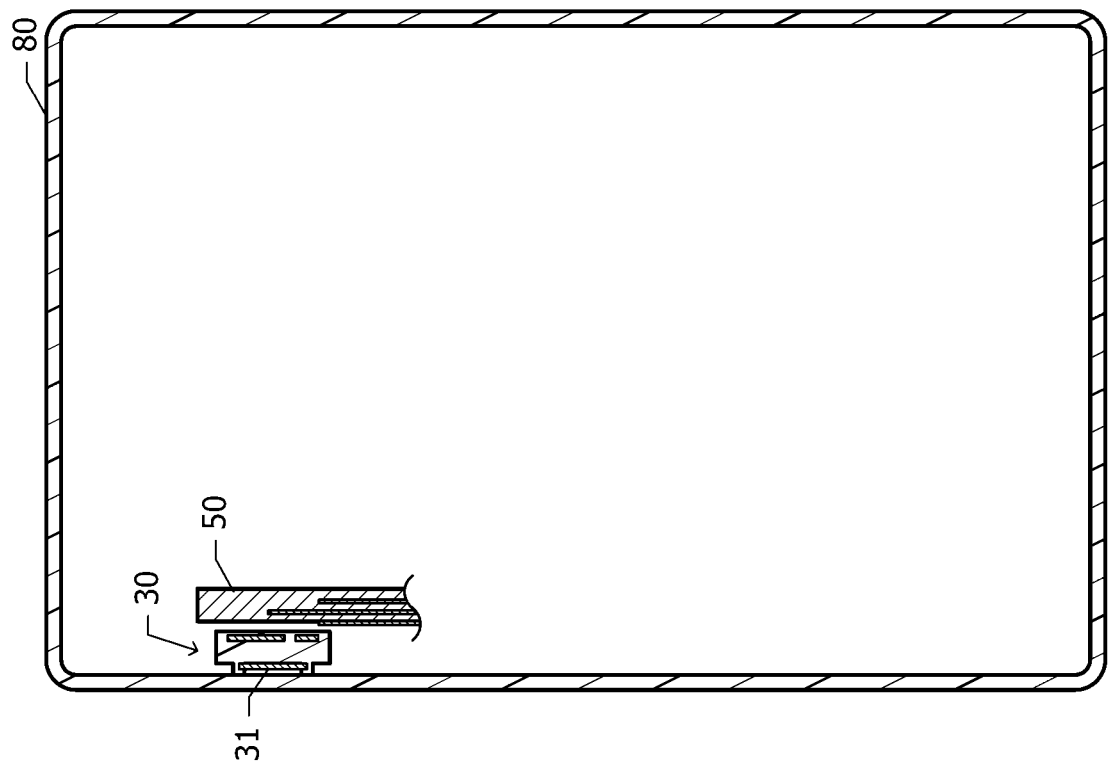
FIG. 28A is a schematic sectional view of a frame of a housing of a communication apparatus, illustrating the state in which an antenna module in Example 18 is fitted on the frame.

The following describes an antenna device in Example 18 with reference to FIG. 28A. Configurations common to the antenna device in Example 17 (see FIGS. 26A and 26B) and the antenna device in Example 18 will not be further elaborated here.

FIG. 28A is a schematic sectional view, illustrating the state in which the antenna device in Example 18 is fitted on the frame 80 of a housing of a communication apparatus. The antenna device 30 is fitted on an inner face of the frame 80 corresponding to an end face of a sheet-metal housing having a cavity defined therein. The antenna device 30 has high directivity in the direction in which the end face of the housing point.

Figure 30:
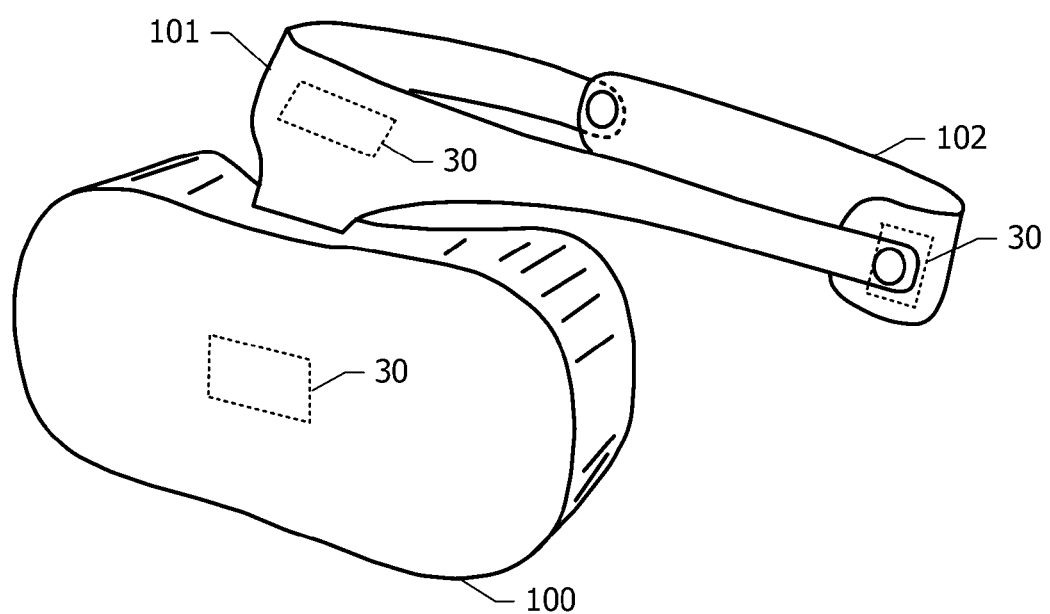
FIG. 30 is a perspective view of a head-mounted display including antenna devices in still another modification of Example 18.

The following describes the modifications of Example 18 with reference to FIGS. 28B, 29, and 30.

FIG. 28B is a schematic sectional view of an antenna device in a modification of Example 18. In Example 18, the antenna device 30 is fastened to an inner face of the frame 80 of the housing. In the modification illustrated in FIG. 28B, meanwhile, the antenna device 30 is embedded (or included) in the frame 80 of the housing. Thus, the antenna device 30 in this modification is more securely fastened to the frame 80 of the housing.

A cavity is preferably defined between the resin provided as the frame 80 and the radiation conductor 31 so that the effect of exposing part of the surface of the radiation conductor 31 will not be lessened.

FIG. 29 is a schematic sectional view of an antenna device in another modification of Example 18. In this modification, a plurality of antenna devices 30 (antenna cells) are fitted on the frame 80 of a housing. The direction normal to the radiation conductor 31 varies among the antenna devices 30. A plurality of feed lines 51 disposed in the mounting substrate 50 are slot-coupled to the corresponding radiation conductors 31 of the antenna devices 30. A flexible substrate is used as the mounting substrate 50 and is warped to conform to the directions normal to the radiation conductors 31 of the antenna devices 30.

FIG. 30 is a perspective view of a head-mounted display including antenna devices in still another modification of Example 18. The head-mounted display includes a display casing 100, a front support 101, and an attachment band 102. The display casing 100 accommodates a display. The front support 101 is attached to the display casing 100. The attachment band 102 is connected to the front support 101. At least one of the display casing 100, the front support 101, and the attachment band 102 includes the antenna device 30. The head-mounted display is to be worn on the head of a user.

The antenna device 30 included in the display casing 100 may have high directivity in the frontward direction with respect the user wearing the head-mounted display. The antenna device 30 included in the front support 101 may have high directivity in a slanting upward direction on the front side of the user wearing the head-mounted display. The antenna device 30 included in the attachment band 102 may have high directivity in a lateral direction with respect to the user wearing the head-mounted display.

When the antenna devices 30 are included in the head-mounted display in such a manner that the direction normal to the radiation conductor 31 (see, for example, FIG. 1) varies among the antenna devices 30, the head-mounted display worn on the head of the user is capable of transmitting and receiving radio waves in a stable manner irrespective of the turning of the user's head.

Example 19

Figure 31:
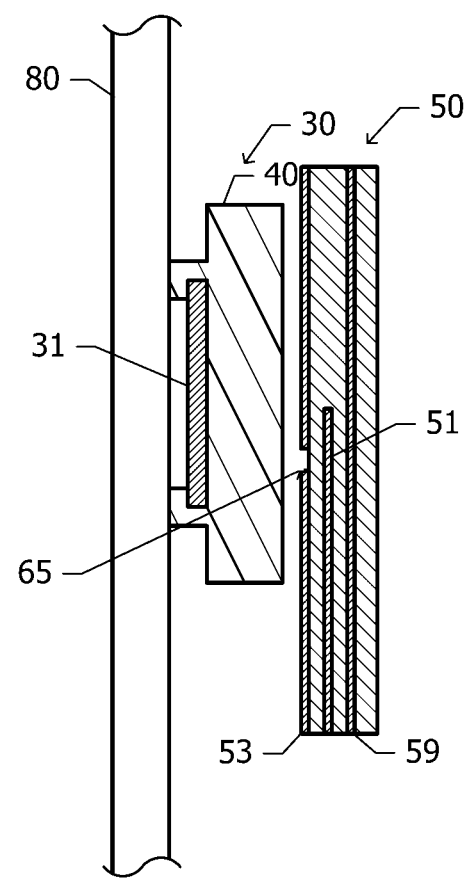
FIG. 31 is a sectional view of an antenna module, illustrating the state in which an antenna device in Example 19 is fitted on a frame of a housing of a communication apparatus.

The following describes an antenna device in Example 19 with reference to FIG. 31. Configurations common to the antenna device 30 in Example 17 (see FIGS. 26A and 26B) and the antenna device in Example 19 will not be further elaborated here.

FIG. 31 is a sectional view, illustrating the state in which the antenna device 30 in Example 19 is fitted on the frame 80 of a housing of a communication apparatus. In Example 17, the radiation conductors 31 and the ground conductor 45 (see FIG. 26B) constitute a patch antenna and are included in the antenna device 30. In Example 19, meanwhile, the radiation conductor 31 and the ground conductor 53 provided as a surface layer of the mounting substrate 50 constitute a patch antenna. The ground conductor 53 is located between the radiation conductor 31 and the feed line 51. The ground conductor 53 has the slot 65 for power supply.

The following describes advantageous effects of Example 19.

In Example 19, the feed line 51 disposed in the mounting substrate 50 is coupled to the radiation conductor 31 through the slot 65 for power supply as in Example 17. The antenna device 30 in Example 19 includes no ground conductor and is thus thinner in profile and less costly than the antenna device 30 in Example 17.

Example 20

Figure 32A:
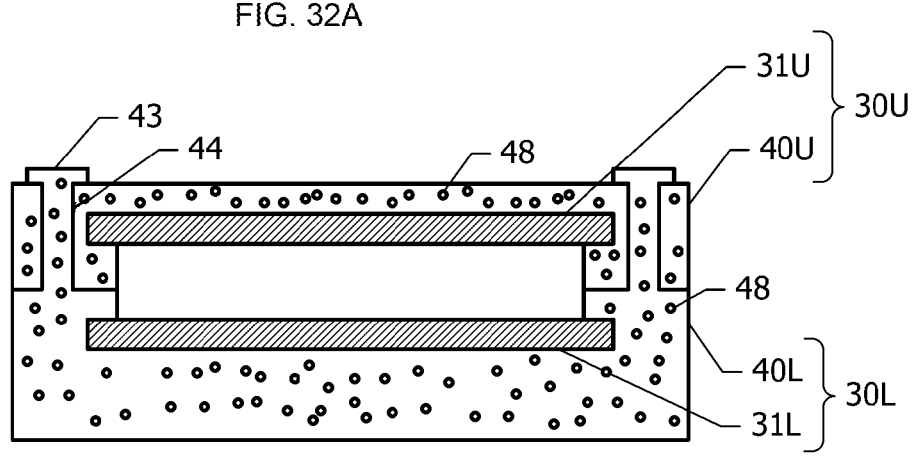
FIG. 32A is a sectional view of an antenna device in Example 20 and corresponds to FIG. 20A illustrating Example 13.
Figure 32B:
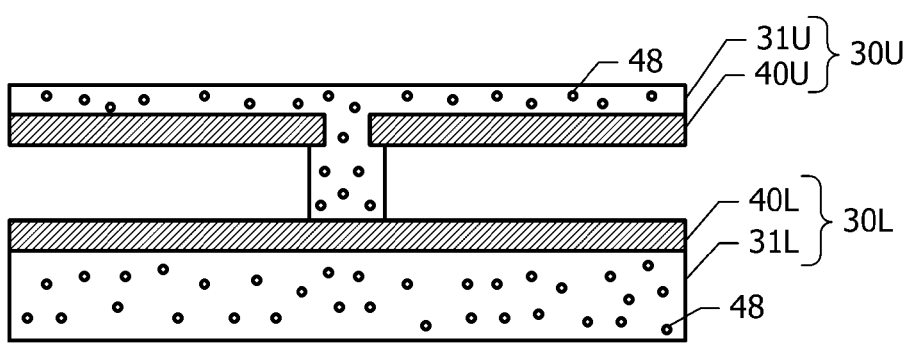
FIG. 32B is a sectional view of the antenna device in Example 20 and corresponds to FIG. 20B illustrating Example 13.

The following describes an antenna device in Example 20 with reference to FIGS. 32A and 32B. Configurations common to the antenna device 30 in Example 13 (see FIGS. 19, 20A, and 20B) and the antenna device in Example 20 will not be further elaborated here.

FIGS. 32A and 32B are sectional views of an antenna device in Example 20 and correspond respectively to FIGS. 20A and 20B illustrating Example 13. In Example 13, the material of the dielectric members 40L and 40U of the antenna device 30 (see FIGS. 19, 20A, and 20B) is not specified. In Example 20, meanwhile, a resin containing bubbles 48 is used as the dielectric members 40L and 40U. For example, the dielectric members 40L and 40U may be made of foamed styrol.

The following describes advantageous effects of Example 20.

In Example 20, the dielectric members 40L and 40U made of the resin containing the bubbles 48 have lower dielectric constants. This may result in improved antenna characteristics.

The following describes a modification of Example 20. In Example 20, the resin containing the bubbles 48 is used as the dielectric members 40L and 40U. Alternatively, a base resin mixed with fillers whose dielectric constants are lower than the dielectric constant of the base resin may be used.

Figure 33A:
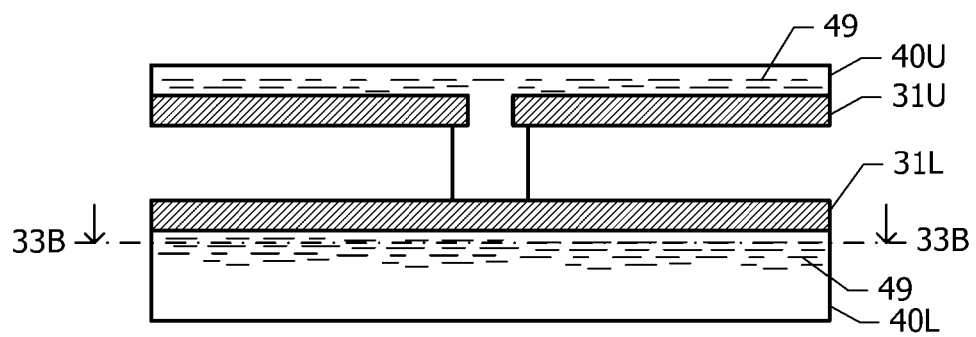
FIG. 33A is a sectional view of an antenna device in a modification of Example 20.
Figure 33B:
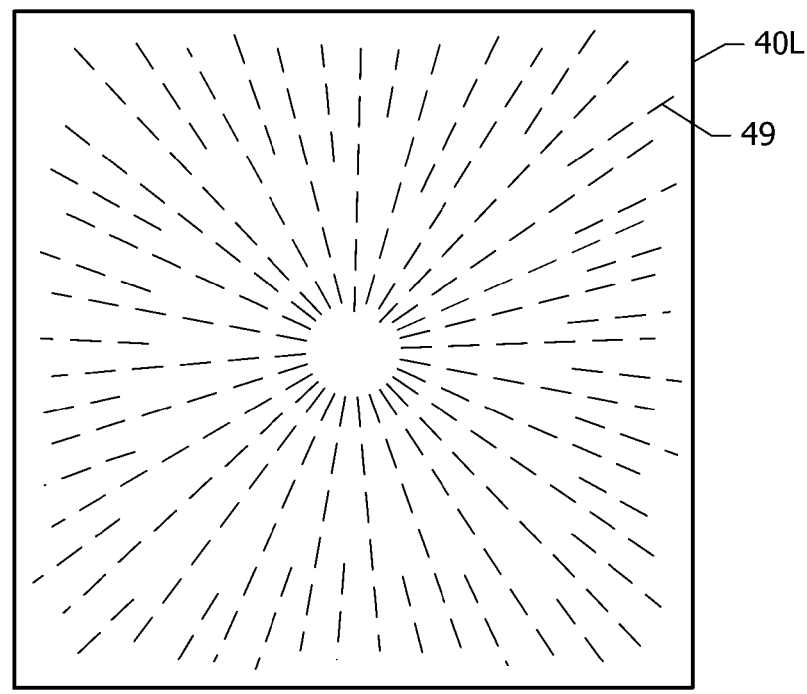
FIG. 33B is a plan sectional view of the antenna device taken along dash-dot line 33B-33B in FIG. 33A.

The following describes an antenna device in another modification of Example 20 with reference FIGS. 33A and 33B.

FIG. 33A is a sectional view of the antenna device 30 in this modification. FIG. 33B is a plan sectional view of the antenna device 30 taken along dash-dot line 33B-33B in FIG. 33A. In this modification, a liquid crystal polymer is used as the dielectric members 40L and 40U. Straight chains 49 constituting the liquid crystal polymer are oriented substantially parallel to the direction in which the liquid crystal polymer in a fluid state flows during injection molding. The straight chains 49 constituting the liquid crystal polymer in or around the surface of the radiation conductor 31L or 31U are thus oriented substantially parallel to the surface of the corresponding radiation conductor. When the liquid crystal polymer is injected through a substantially central portion of the radiation conductor 31L viewed in plan, the straight chains 49 constituting the liquid crystal polymer are oriented in all directions.

The following describes advantageous effects of the modification of Example 20.

The dielectric constants of most liquid crystal polymers are lower than the dielectric constants of common resins. The dielectric members 40L and 40U made of such a liquid crystal polymer having a low dielectric constant have low dielectric constants accordingly. This may result in improved antenna characteristics.

The dielectric constant of the liquid crystal polymer is anisotropic and is relatively low in directions orthogonal to the straight chains 49. The straight chains 49 are preferably oriented in directions orthogonal to the direction of an electric field so that the effective dielectric constants of the dielectric members 40L and 40U may be low. The electric field in or around the surface of the radiation conductor 31L or 31U is perpendicular to the surface of the corresponding radiation conductor. In this modification, the straight chains 49 constituting the liquid crystal polymer in or around the surface of the radiation conductor 31L or 31U are oriented parallel to the surface of the corresponding radiation conductor. That is, the straight chains 49 constituting the liquid crystal polymer are oriented in directions orthogonal to the electric field. Thus, the effective dielectric constant in or around the surface of the radiation conductors 31L and 31U may be low. This may result in improved antenna characteristics.

Example 21

Figure 34A:
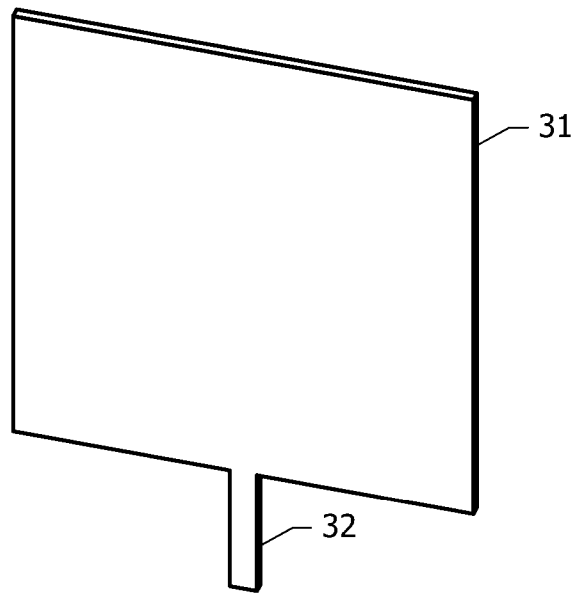
FIG. 34A is a perspective view of a radiation conductor of an antenna device in Example 21.
Figure 34B:
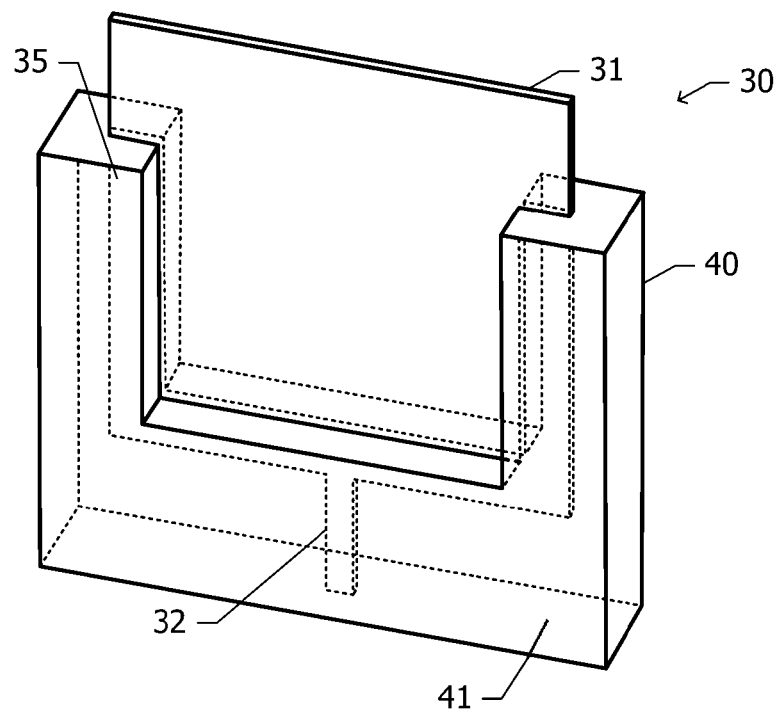
FIG. 34B is a perspective view of the radiation conductor and a dielectric member included in the antenna device in Example 21.
Figure 35A:
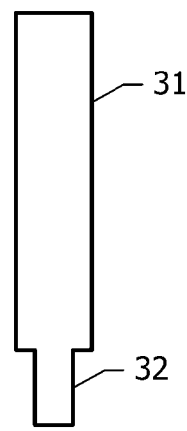
FIG. 35A is a front view of a radiation conductor of an antenna device in a modification of Example 21.
Figure 35B:
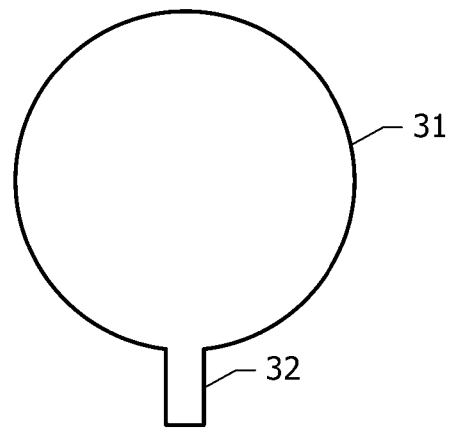
FIG. 35B is a front view of a radiation conductor of an antenna device in another modification of Example 21.
Figure 35C:
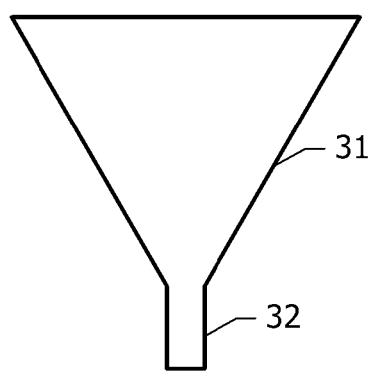
FIG. 35C is a front view of a radiation conductor of an antenna device in still another modification of Example 21.
Figure 35D:
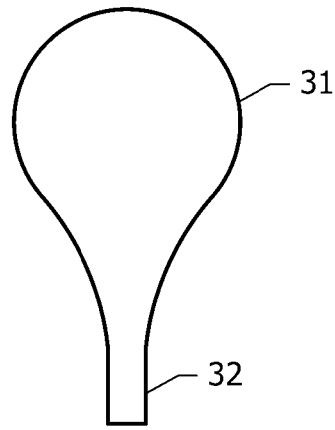
FIG. 35D is a front view of a radiation conductor of an antenna device in yet still another modification of Example 21.

The following describes an antenna device in Example 21 with reference to FIGS. 34A and 34B. Configurations common to the antenna device 30 in Example 1 (see FIGS. 1, 3A, and 3B) and the antenna device in Example 21 will not be further elaborated here.

FIG. 34A is a perspective view of the radiation conductor 31 of the antenna device 30 in Example 21. FIG. 34B is a perspective view of the radiation conductor 31 and the dielectric member 40 of the antenna device 30 in Example 21. In Example 1, the antenna device 30 and the mounting substrate 50 (see FIGS. 3A and 3B) constitute a patch antenna. In Example 21, meanwhile, the antenna device 30 and a ground conductor included in a mounting substrate (not illustrated) constitute a monopole antenna.

The radiation conductor 31 of the monopole antenna is constructed of a metal plate having a substantially rectangular shape. The lead-out portion 32, which doubles as a feeder, extends from the midsection of an end face of the radiation conductor 31 (the midpoint of one side of the rectangle shape). The lead-out portion 32 is flush with the radiation conductor 31 and is connected at the tip face thereof to a feed line included in the mounting substrate.

The radiation conductor 31 is supported by dielectric member 40 in such a manner that a peripheral edge portion of the radiation conductor 31 is sandwiched between portions of the dielectric member 40. The portion fitted in (sandwiched between portions of) the dielectric member 40 is hereinafter referred to as a sandwiched portion 35. The sandwiched portion 35 is substantially U-shaped to extend along the end face from which the lead-out portion 32 extend and to extend along two end faces linked to the end face.

Similarly, the dielectric member 40 is substantially U-shaped to conform to the shape of the sandwiched portion 35. The facing surface 41 of the dielectric member 40 is orthogonal to the radiation conductor 31. The antenna device 30 is mounted on the mounting substrate in such a manner that the facing surface 41 faces the mounting substrate. The tip face of the lead-out portion 32 is exposed at the facing surface 41. With the antenna device 30 being mounted on the mounting substrate, the radiation conductor 31 is perpendicular to the mounting substrate. A ground conductor that functions as the ground of the monopole antenna is included in the mounting substrate.

The following describes advantageous effects of Example 21.

The radiation conductor 31 is supported by the dielectric member 40 in such a manner that the sandwiched portion 35, which is part of the radiation conductor 31 constructed of a metal plate, is sandwiched between portions of the dielectric member 40. This configuration is applicable not only to a patch antenna but also to a monopole antenna.

The following describes the modifications of Example 21 with reference to FIGS. 35A to 35D.

Each of FIG. 35A to FIG. 35D is a front view of the radiation conductor 31 of an antenna device in a corresponding modification of Example 21. In the modification illustrated in FIG. 35A, the radiation conductor 31 is narrow and substantially strip-shaped. In the modification illustrated in FIG. 35B, the radiation conductor 31 is substantially circular. In the modification illustrated in FIG. 35C, the radiation conductor 31 is substantially triangular, and the lead-out portion 32 extends from an apex of the radiation conductor 31. In the modification illustrated in FIG. 35D, the radiation conductor 31 is substantially teardrop-shaped, and the lead-out portion 32 extends from a narrow, protruding portion of the radiation conductor 31. Metal plates of varying shapes may be used as the radiation conductor 31 as in the modifications illustrated respectively in FIG. 35A to FIG. 35D.

Example 22

The following describes an antenna device in Example 22 with reference to FIG. 36A to FIG. 36D. Configurations common to the antenna device 30 in Example 1 (see FIGS. 1, 3A, and 3B) and the antenna device in Example 22 will not be further elaborated here.

Figure 36A:
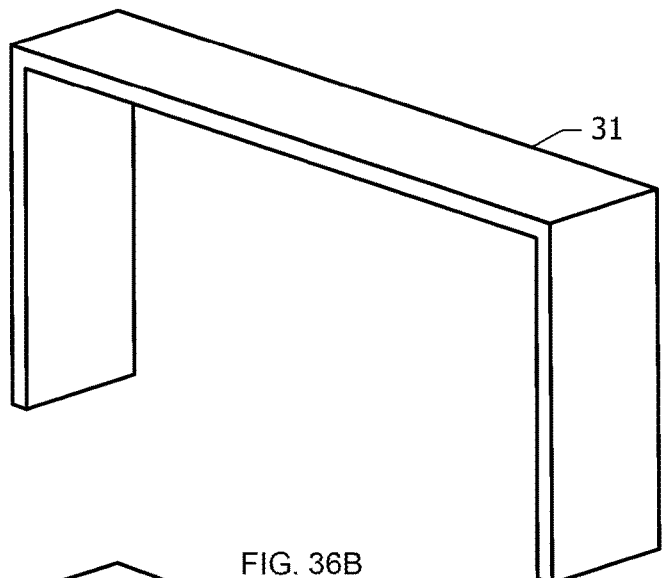
FIG. 36A is a perspective view of a radiation conductor of an antenna device in Example 22.
Figure 36B:
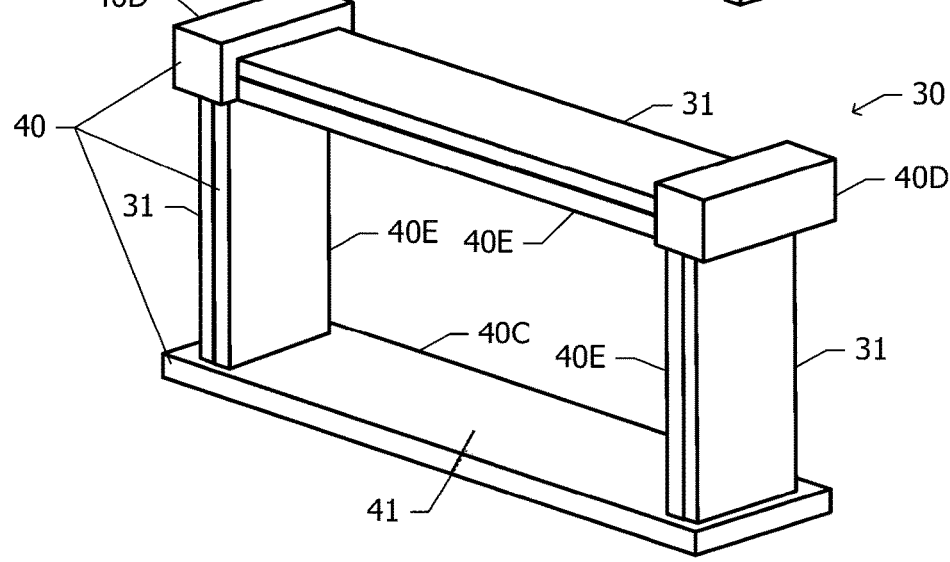
FIG. 36B is a perspective view of the radiation conductor and a dielectric member of the antenna device in Example 22.
Figure 36C:
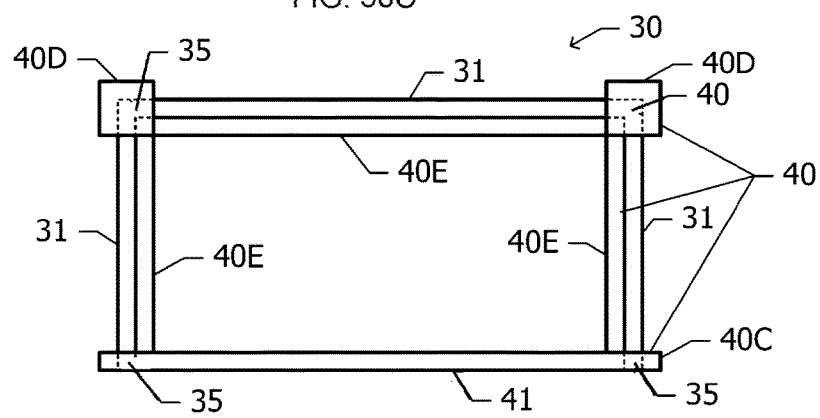
FIG. 36C is a front view of the antenna device in Example 22.
Figure 36D:
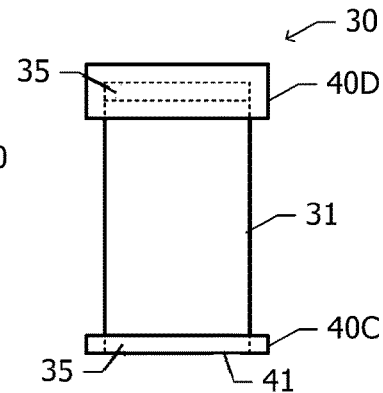
FIG. 36D is a side view of the antenna device in Example 22.

FIG. 36A is a perspective view of the radiation conductor 31 of the antenna device 30 in Example 22. FIG. 36B is a perspective view of the antenna device 30 including the radiation conductor 31 and the dielectric member 40. FIGS. 36C and 36D are a front view and a side view, respectively, of the antenna device 30 in Example 22.

The radiation conductor 31 of the antenna device 30 in Example 22 is shaped as follows. A substantially strip-shaped metal plate includes, in the longitudinal direction thereof, two sections bent substantially at a right angle. When viewed from the front, the radiation conductor 31 is substantially inverted U-shaped. Two end faces of the radiation conductor 31 that point in a downward direction are flush with each other and parallel to the upper face of the radiation conductor 31. The dielectric member 40 includes a bottom plate 40C, two corner-covering portions 40D, and an inner-face covering portion 40E.

The bottom plate 40C is laid between one lower end portion and the other lower end portion of the radiation conductor 31. Part of each lower end portion of the radiation conductor 31 is embedded in the bottom plate 40C. In other words, part of each lower end portion of the radiation conductor 31 is fitted in the dielectric material of the bottom plate 40C. The antenna device 30 is mounted on a mounting substrate in such a manner that a face of bottom plate 40C pointing in a downward direction (hereinafter referred to as a facing surface 41) faces the mounting substrate. Two lower tip faces of the radiation conductor 31 are exposed at the facing surface 41 of the bottom plate 40C.

The two corner-covering portions 40D are disposed at the corresponding bends of the radiation conductor 31 to cover outer faces, inner faces, and end faces on or around the bends. In other words, the radiation conductor 31 is partially sandwiched between portions of the corner covering portions 40D. The innerface-covering portions 40E covers the inner faces of the radiation conductor 31. Faces of the radiation conductor 31 that face outward are mostly exposed.

Two lower ends of the radiation conductor 31 are connected to a ground conductor and a feed line included in the mounting substrate. This configuration enables the radiation conductor 31 to operate as a loop antenna.

The following describes advantageous effects of Example 22.

The radiation conductor 31 is supported by the dielectric member 40 in such a manner that the sandwiched portion 35, which is part of the radiation conductor 31 constructed of a metal plate, is sandwiched between portions of the dielectric member 40. This configuration is applicable not only to a patch antenna but also to a loop antenna. The bottom plate 40C is laid between one lower end portion and the other lower end portion of the radiation conductor 31. The shape of the radiation conductor 31 may thus remain unchanged with stability.

The following describes a modification of Example 22. In Example 22, the radiation conductor 31 is substantially U-shaped and has right-angled corners. Alternatively, the radiation conductor 31 may have rounded corners. Still alternatively, the radiation conductor 31 may be substantially semi-cylindrical.

Example 23

Figure 37A:
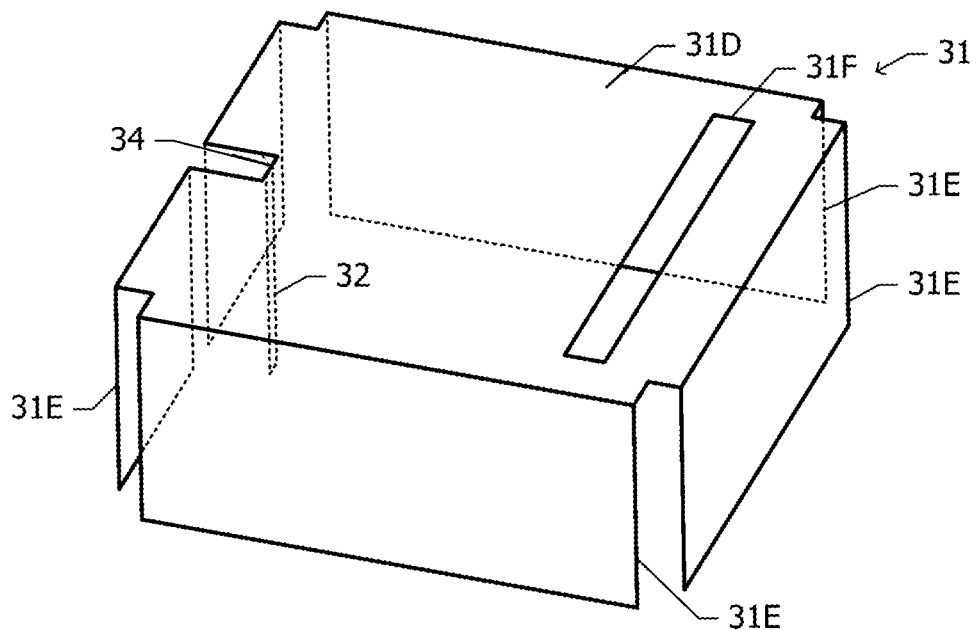
FIG. 37A is a perspective view of a radiation conductor of an antenna device in Example 23.
Figure 37B:
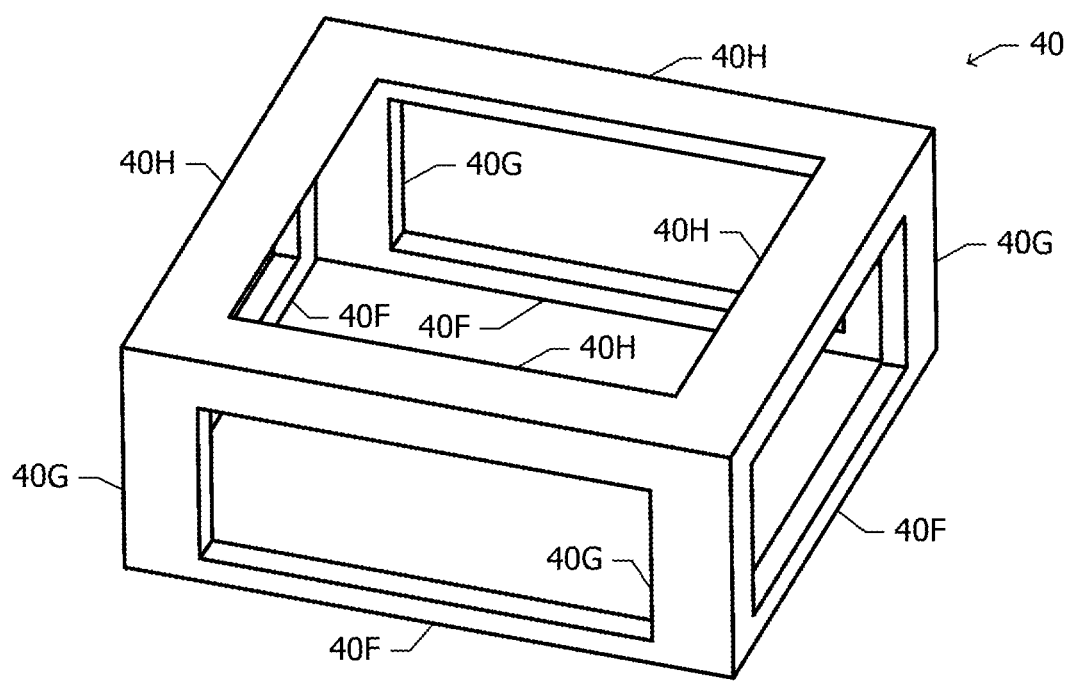
FIG. 37B is a perspective view of a dielectric member of the antenna device in Example 23.

The following describes an antenna device in Example 23 with reference to FIGS. 37A and 37B. Configurations common to the antenna device 30 in Example 1 (see FIGS. 1, 3A, and 3B) and the antenna device in Example 23 will not be further elaborated here.

FIG. 37A is a perspective view of the radiation conductor 31 of the antenna device 30 in Example 23. The radiation conductor 31 is prepared by die cutting and bending a metal plate. Referring to FIG. 37A, the metal plate is illustrated as having no thickness.

The radiation conductor 31 includes a top plate 31D and four side plates 31E. The top plate 31D has a shape of a rectangle with four corners cut out in square shapes when viewed in plan. The four side plates 31E extend downward from four corresponding edges of the top plate 31D. The top plate 31D and each side plate 31E substantially form a right angle. Lower end faces of the four side plates 31E are flush with each other and parallel to top plate 31D.

The top plate 31D has the cut 34 extending inward from the central part of one edge of the top plate 31D. The lead-out portion 32, which doubles as a feeder, extends downward from the innermost of the cut 34. The lower end of the lead-out portion 32 is flush with the lower end faces of the side plates 31E. The top plate 31D has a slot 31F.

FIG. 37B is a perspective view of the dielectric member 40 of the antenna device 30 in Example 23. The dielectric member 40 includes four lowerend-covering portions 40F, four columns 40G, and four beams 40H. The four lowerend-covering portions 40F hold, from the outer side and the inner side, the lower ends of the four side plates 31E (see FIG. 37A) of the radiation conductor 31. The lower end faces of the side plates 31E are exposed. The four columns 40G hold, from the outer side and the inner side, portions extending along lateral end faces of the side plates 31E and cover the lateral end faces. Each column 40G is provided for a corresponding pair of closely located lateral end faces of two adjacent side plates 31E. The four beams 40H hold, from the outer side and the inner side, the corresponding bends, each of which is located between the top plate 31D and the corresponding one of the side plates 31E.

The lower end faces of the side plates 31E are connected to a ground conductor located on and in a mounting substrate (not illustrated). The lower end face of the lead-out portion 32, which doubles as a feeder, is connected to a feed line included in the mounting substrate. When the radiation conductor 31 is supplied with radio-frequency signals, electromagnetic resonance occurs in a cavity defined by the radiation conductor 31. The electromagnetic field generated in the cavity is radiated to the outside through the slot 31F.

The following describes advantageous effects of Example 23.

The radiation conductor 31 is supported by the dielectric member 40 in such a manner that the sandwiched portion 35, which is part of the radiation conductor 31 constructed of a metal plate, is sandwiched between portions of the dielectric member 40. This configuration is applicable not only to a patch antenna but also to a slot antenna. The lower ends of the four side plates 31E are connected to each other in a circumferential direction via the lowerend-covering portion 40F. The shape of the radiation conductor 31 may thus remain unchanged with improved stability.

Figure 38A:
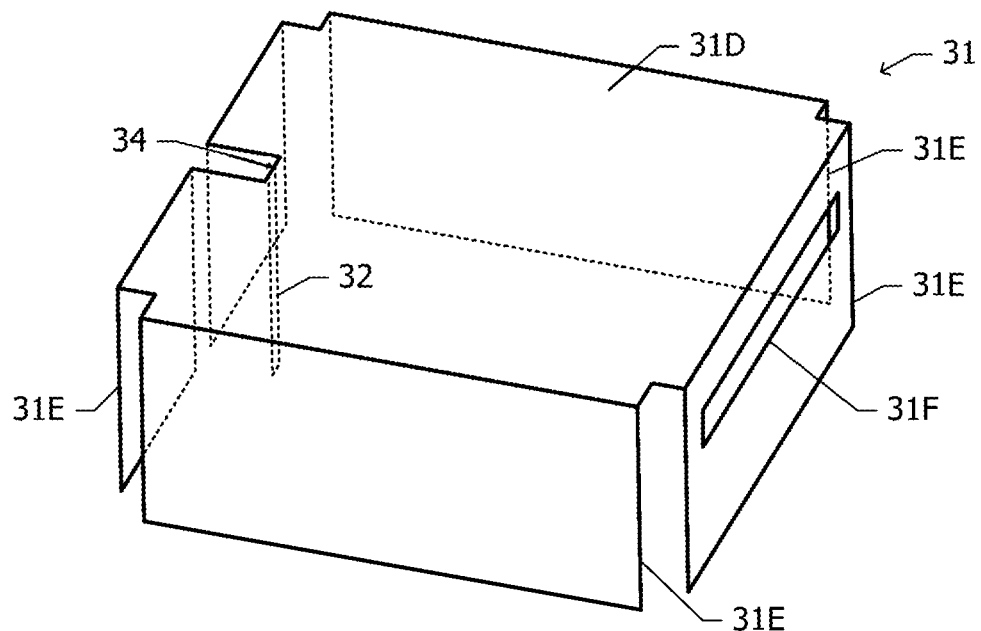
FIG. 38A is a perspective view of a radiation conductor of an antenna device in a modification of Example 23.
Figure 38B:
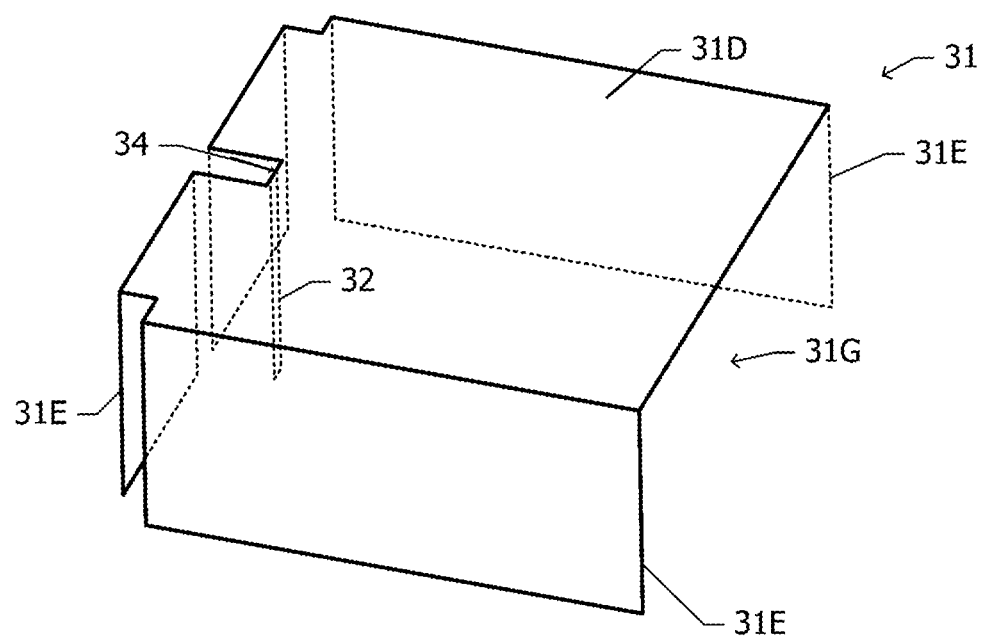
FIG. 38B is a perspective view of a radiation conductor of an antenna device in another modification of Example 23.

The following describes a modification of Example 23 with reference to FIGS. 38A and 38B.

Each of FIGS. 38A and 38B is a perspective view of the radiation conductor 31 of an antenna device in a corresponding modification of Example 23. In the modification illustrated in FIG. 38A, one of the four side plates 31E has the slot 31F. In the modification illustrated in FIG. 38B, one of the four side plates 31E of the radiation conductor 31 of the antenna device in Example 23 is replaced with an opening 31G.

In the modification illustrated in FIG. 38A, radio waves are radiated to the outside through the slot 31F of the side plate 31E. In the modification illustrated in FIG. 38B, radio waves are radiated to the outside through the opening 31G. The antenna devices in the modifications illustrated respectively in FIGS. 38A and 38B are thus capable of radiating radio waves in a lateral direction orthogonal to the thickness direction of the mounting substrate.

Example 24

The following describes a procedure for producing an antenna device in Example 24 with reference to FIGS. 39A to 43B. The stacked antenna device 30 in Example 13 (see FIGS. 19, 20A, and 20B) will be taken as an example in the following description on the production procedure in Example 24.

Figure 39A:
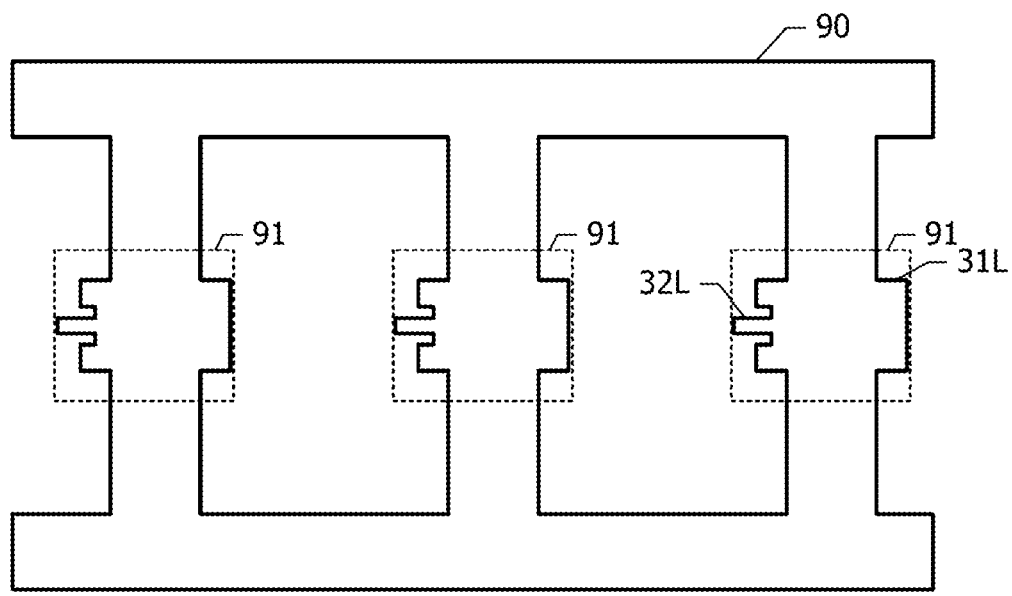
FIGS. 39A and 39B are plan views of a lower part of an antenna device that is in the process of being produced in accordance with a production procedure in Example 24.
Figure 39B:
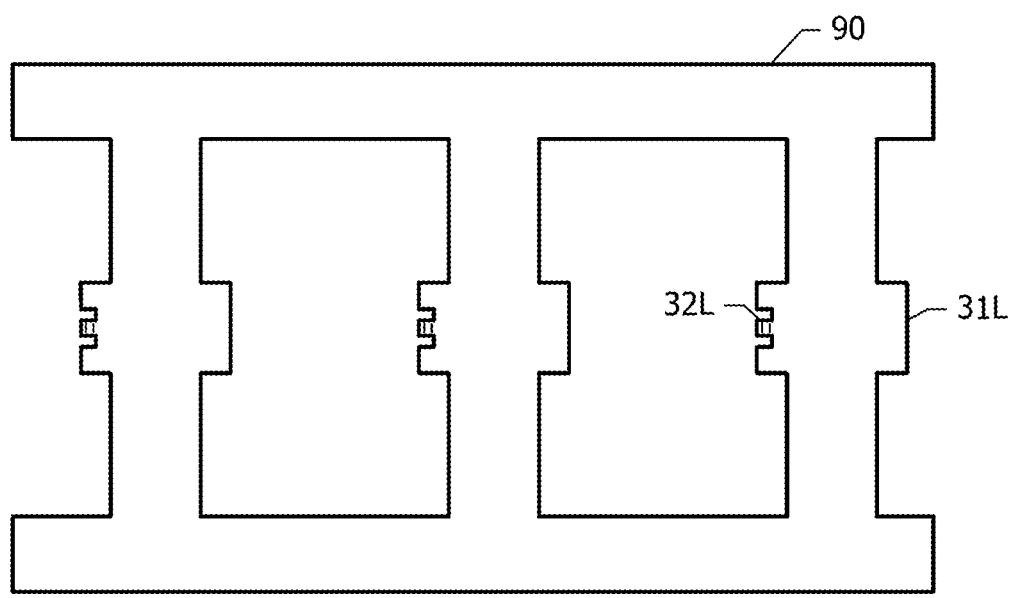
Figure 40:
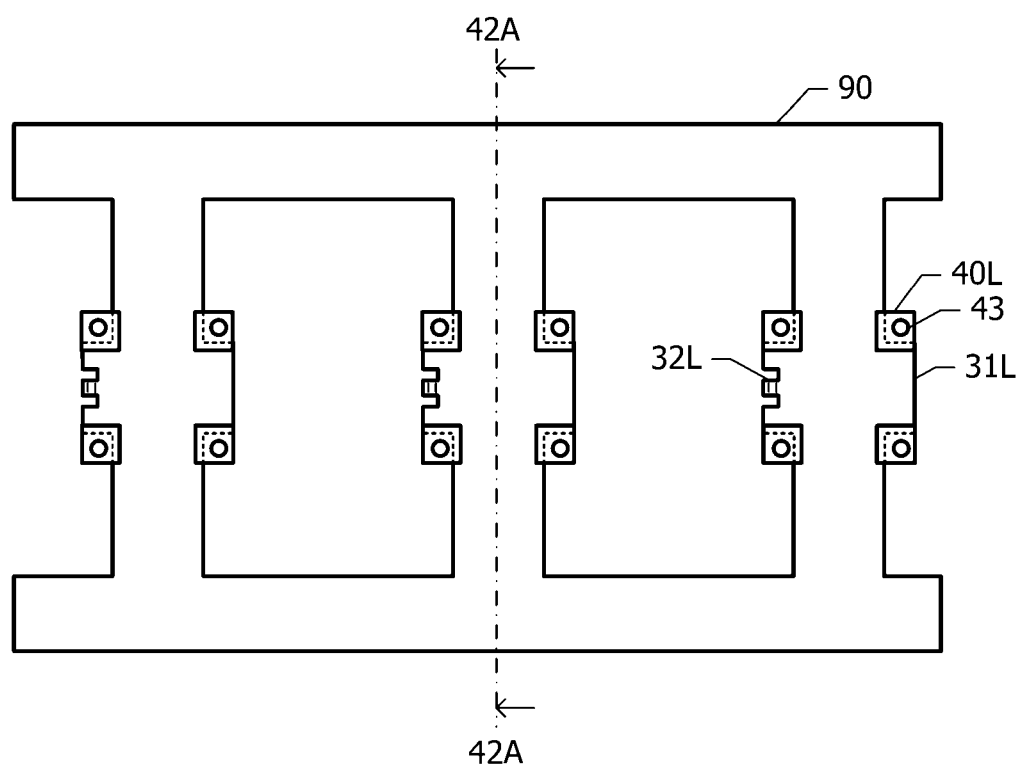
FIG. 40 is a plan view of the lower part of the antenna device that is in the process of being produced.

FIG. 39A to FIG. 40 are plan views of the lower part 30L of the antenna device 30 that is in the process of being produced. As illustrated in FIG. 39A, a metal plate 90, which is substantially strip-shaped, is subjected to plastic work such as die cutting, where outer shapes of the radiation conductor 31L and the lead-out portion 32L in the lower part 30L (see FIG. 19) are defined. The metal plate 90 includes a metal core plate plated with a metal having a conductivity higher than the conductivity of the core plate. The metal plate 90 is shaped in such a manner as to provide the radiation conductors 31L, which are laid side by side in the longitudinal direction of the metal plate 90. Referring to FIG. 39A, portions that are to be formed into the radiation conductors 31L are enclosed by the corresponding broken lines 91.

As illustrated in FIG. 39B, the lead-out portions 32L are bent. As illustrated in FIG. 40, the radiation conductors 31L and the corresponding dielectric members 40L (resin members) are brought into close contact with each other by insert molding. Consequently, an integrally molded structure including the metal plate 90 and the dielectric members 40L is obtained. In this stage, the projections 43 are formed. Referring to FIG. 40, which is a plan view of the lower part 30L (see FIG. 19), each dielectric member 40L is illustrated as discrete blocks in the four corners of the corresponding one of the radiation conductors 31L. The discrete blocks of the dielectric member 40L in the four corners are connected to each other on the bottom face side of the radiation conductor 31L.

Figure 41A:
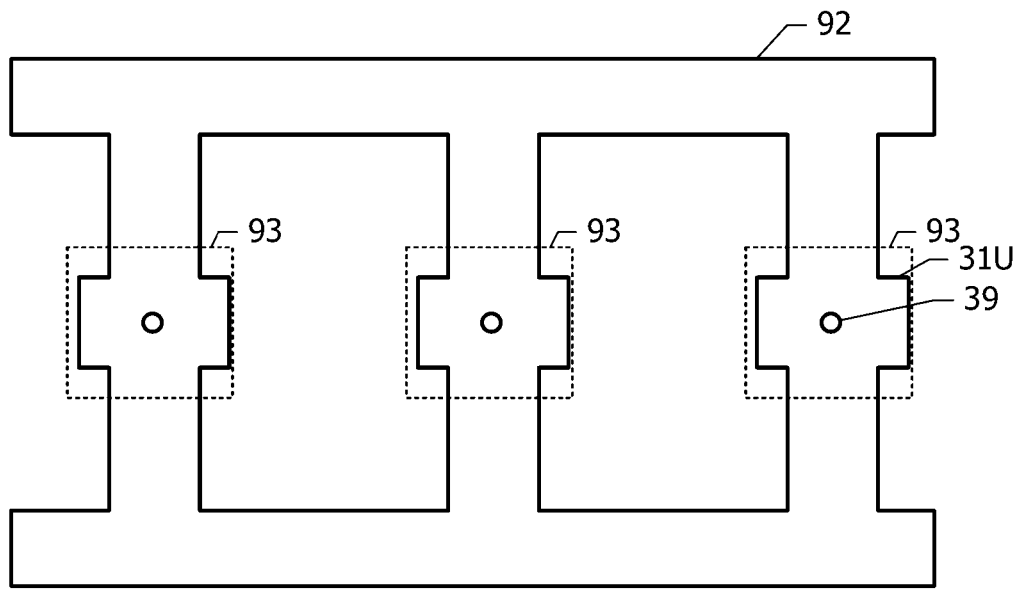
FIGS. 41A and 41B are plan views of an upper part of the antenna device that is in the process of being produced.
Figure 41B:
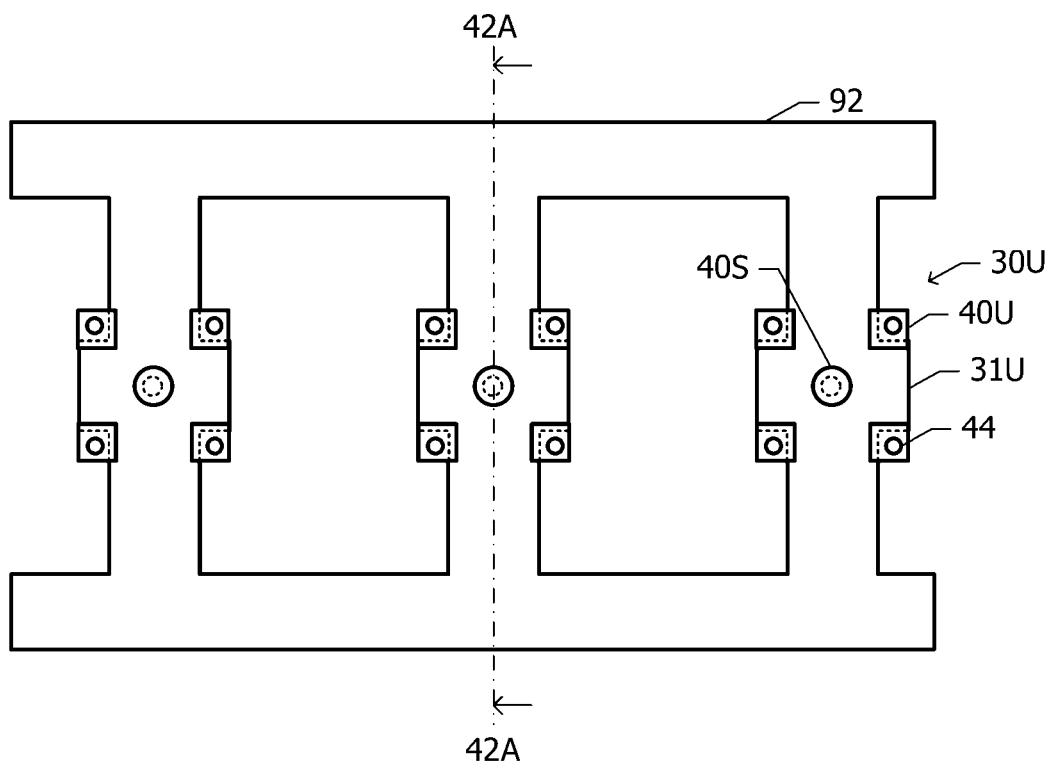

FIGS. 41A and 41B are plan views of the upper part 30U of the antenna device 30 that is in the process of being produced. As illustrated in FIG. 41A, a metal plate 92, which is substantially strip-shaped, is subjected to plastic work such as die cutting, where outer shapes of the radiation conductor 31U in the upper part 30U (see FIG. 19) are defined. The metal plate 92 has a layer structure identical to the layer structure of the metal plate 90 (see FIG. 39A) for the lower part 30L. The metal plate 92 is shaped in such a manner as to provide the radiation conductors 31U, which are laid side by side in the longitudinal direction of the metal plate 92. Referring to FIG. 41A, portions that are to be formed into the radiation conductors 31U are enclosed by the corresponding broken lines 93. In this stage, the openings 39 are provided substantially at the center of the respective radiation conductors 31U.

As illustrated in FIG. 41B, the radiation conductors 31U and the corresponding dielectric members 40U are brought into close contact with each other by insert molding. Consequently, an integrally molded structure including the metal plate 92 and the dielectric members 40U is obtained. In this stage, the spacers 40S and the through-holes 44 are formed.

Figure 42A:
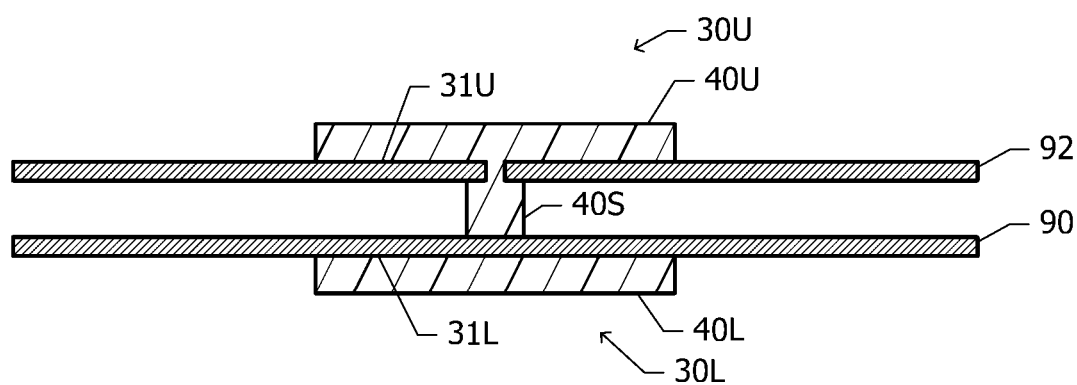
FIG. 42A is a sectional view of the lower part taken along dash-dot line 42A-42A in FIG. 40 and the upper part taken long dash-dot line 42A-42A in FIG. 41B, illustrating the state subsequent to staking.

Subsequently, the projections 43 (see FIG. 40) in the lower part 30L are inserted into the corresponding through-holes 44 (see FIG. 41B) in the upper part 30U and are subjected to staking (e.g., heat staking) such that the upper part 30U is fitted to the lower part 30L. FIG. 42A is a sectional view of the lower part 30L taken along dash-dot line 42A-42A in FIG. 40 and the upper part 30U taken along dash-dot line 42A-42A in FIG. 41B, illustrating the state subsequent to the staking. The spacer 40S integral with the dielectric member 40U in the upper part 30U is in contact with the radiation conductor 31L in the lower part 30L to keep a gap between the radiation conductors 31L and 31U.

Figure 42B:
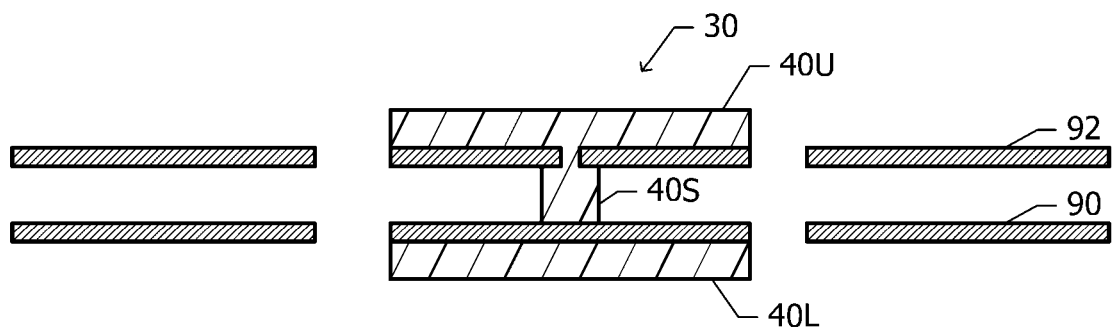
FIG. 42B is a sectional view of the lower part taken along dash-dot line 42A-42A in FIG. 40 and the upper part taken long dash-dot line 42A-42A in FIG. 41B, illustrating the state in which an antenna device is cut off.

As illustrated in FIG. 42B, the antenna device 30 is then cut off from the metal plate 90 including the lower parts 30L laid side by side and from the metal plate 92 including the upper parts 30U laid side by side. This completes the production of the antenna device 30.

Figure 43A:
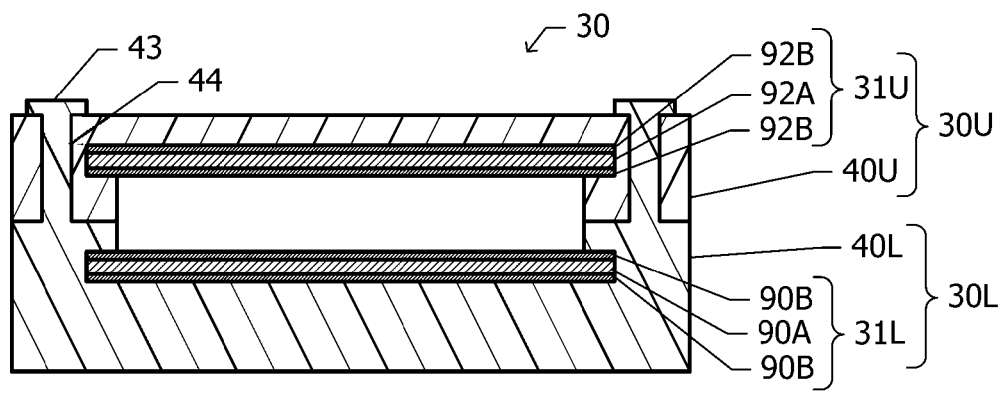
FIG. 43A is a sectional view of an antenna device produced in accordance with the production procedure in Example 24.

FIG. 43A is a sectional view of the antenna device 30 produced in accordance with the production procedure in Example 24. The upper part 30U is fastened to the lower part 30L by staking. The radiation conductor 31L in the lower part 30L has a three-layer structure including a core plate 90A and surface layers 90B, which cover the corresponding surfaces of the core plate 90A. The surface layers 90B are made of a metallic material different from the metallic material of the core plate 90A. End faces of the core plate 90A are exposed at the corresponding end faces formed by plastic work (see FIG. 39A). Similarly, the radiation conductor 31U in the upper part 30U has a three-layer structure including a core plate 92A and surface layers 92B, which cover corresponding surfaces of the core plate 92A. The surface layers 92B are made of a metallic material different from the metallic material of the core plate 92A.

For example, phosphor bronze, brass, pure copper, nickel silver, beryllium copper, copper-titanium alloys, and Corson alloys may be used as the core plates 90A and 92A. Phosphor bronze, which is suited to plastic work, is particularly preferred. A plating method may be used to form the surface layers 90B and 92B. Au, Ag, Sn, and Pd are preferred as the surface layers 90B and 92B in terms of higher surface conductivity and protection of electrodes. Ni and Cu are preferred as undercoating layers below the surface layers 90B and 92B.

The following describes advantageous effects of Example 24.

The radiation conductor 31L in the lower part 30L and the radiation conductor 31U in the upper part 30U are constructed respectively of the metal plates 90 and 92, each of which is a single metal plate. This is possible because the radiation conductors 31L and 31U have shapes that can be developed on a plane. Unlike the production procedure involving the use of more than one plates for a radiation conductor, the production procedure in Example 24 simplifies production processes and enables a reduction in production cost.

The radiation conductor 31L and the dielectric member 40L in the lower part 30L are formed as one member by insert molding. Similarly, the radiation conductor 31U and the dielectric member 40U in the upper part 30U are formed as one member by insert molding. It is thus easy to provide a structure in which the radiation conductors 31L and 31U are supported respectively by the dielectric members 40L and 40U.

When including the core plates 90A and 92A suited to plastic work, the metal plates 90 and 92 may be processed with ease and accuracy. The radiation conductor 31 including the surface layers 90B and 92B has added mechanical strength and is less prone to chemical deterioration. Furthermore, the surface layers 90B and 92B having a conductivity higher than the conductivity of the core plates 90A and 92A ensure that the radiation conductors 31L and 31U exhibit satisfactory electrical characteristics.

Figure 43B:
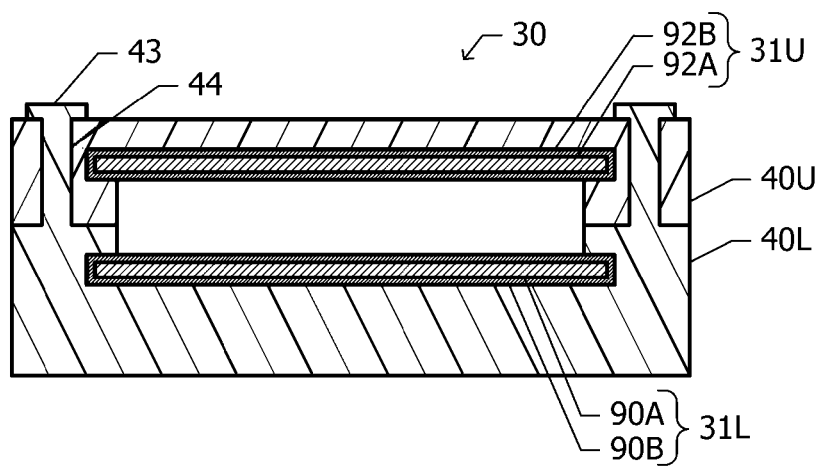
FIG. 43B is a sectional view of an antenna device produced in accordance with a production procedure in a modification of Example 24.

The following describes a modification of Example 24 with reference to FIG. 43B.

FIG. 43B is a sectional view of the antenna device 30 produced in accordance with a production procedure in a modification of Example 24. In Example 24, each of the core plates 90A and 92A is overlaid with the surface layers 90B or 92B and is then subjected to plastic work. In this modification, meanwhile, each of the core plates 90A and 92A is subjected to die cutting before being overlaid with the surface layers 90B or 92B. Consequently, end faces of the core plate 90A are covered with the surface layers 90B, and end faces of the core plate 92A are covered with the surface layers 92B.

In this modification, the end faces of the core plate 90A are covered with the surface layers 90B, and the end faces of the core plate 92A are covered with the surface layers 92B. The surface layers 90B and 92B made of a metallic material having a conductivity higher than the conductivity of the metallic material of the core plates 90A and 92A may further increase the surface conductivity of the radiation conductor 31.

In Example 24, the radiation conductors 31L and 31U are prepared by processing sheet metal. Alternatively, the radiation conductors 31L and 31U may be prepared, for example, by subjecting metal powder to the firing process.

Example 25

Figure 44:
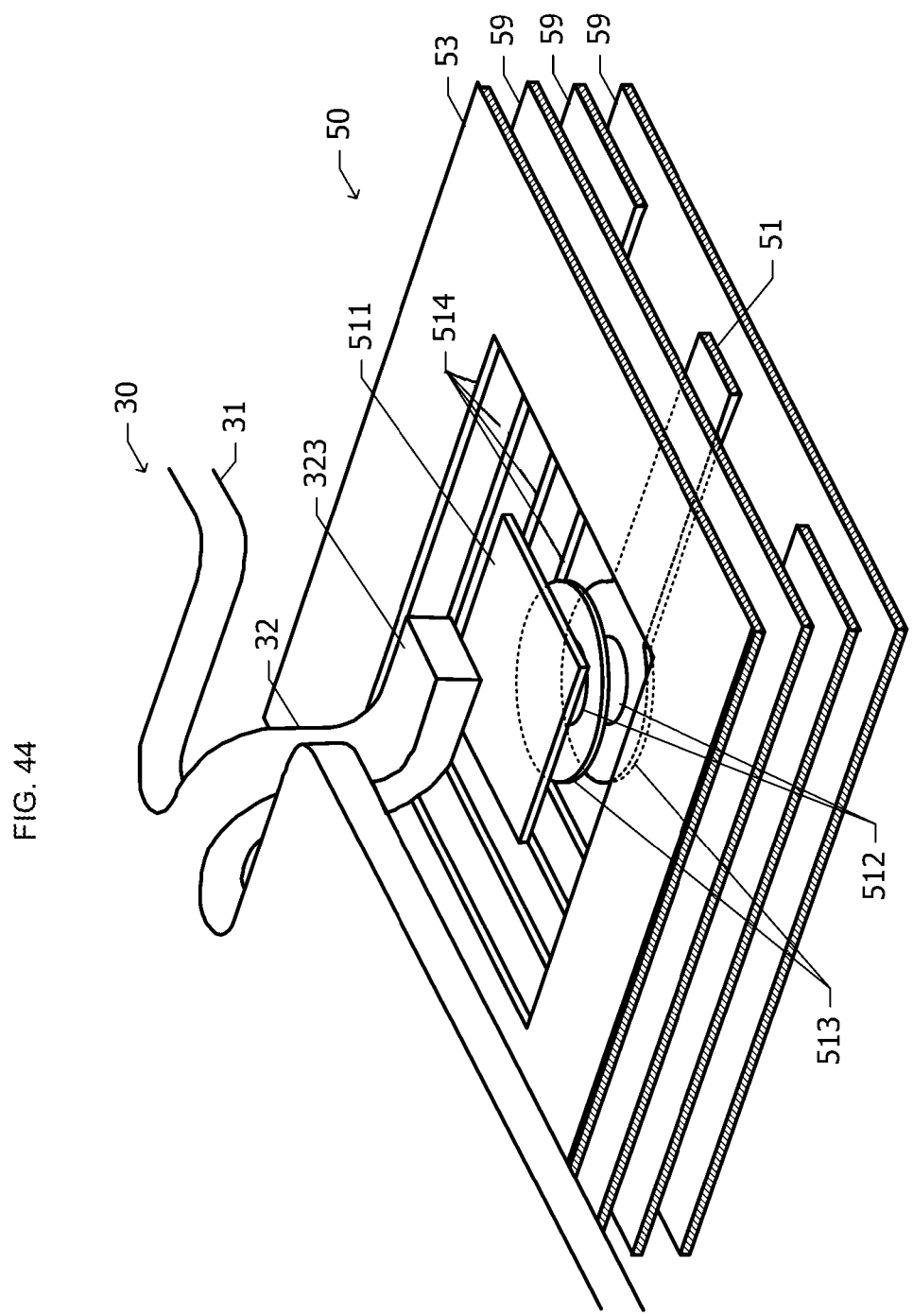
FIG. 44 is a perspective view of a region including a spot in which a radiation conductor of an antenna device in Example 25 is coupled to a feed line.
Figure 45:
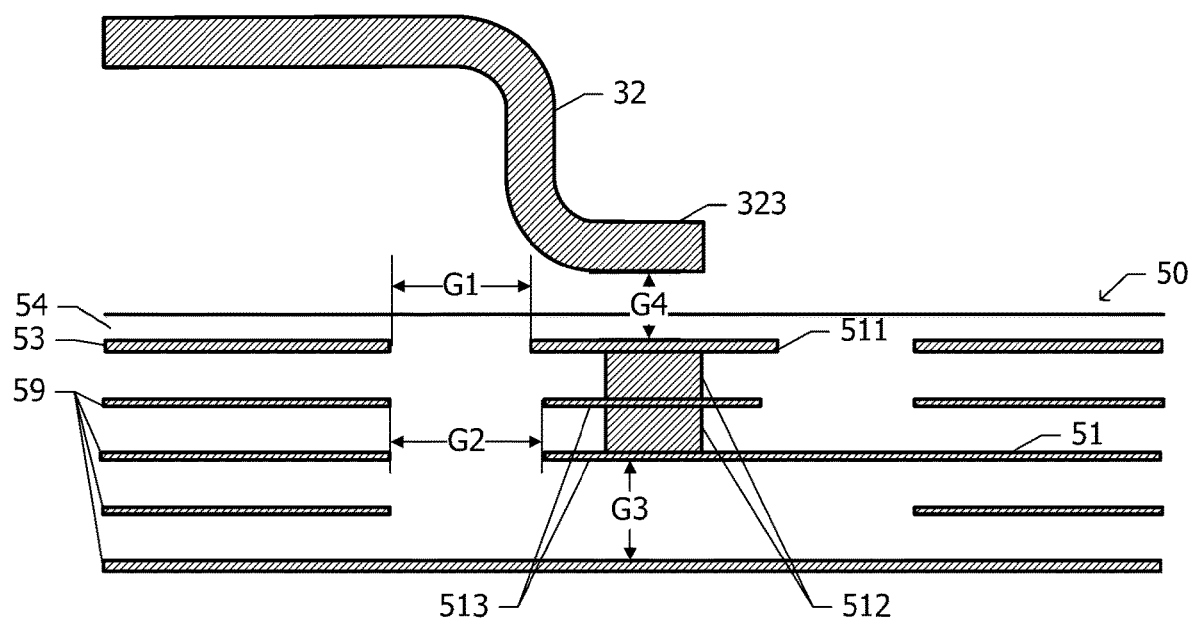
FIG. 45 is a sectional view of part of the antenna device in Example 25.

The following describes an antenna device in Example 25 with reference to FIGS. 44 and 45. Configurations common to the antenna device in the modification of Example 5 (see FIG. 6B) and the antenna device in Example 25 will not be further elaborated here.

FIG. 44 is a perspective view of a region including a spot in which the radiation conductor 31 of an antenna device in Example 25 is coupled to the feed line 51. In Example 25, the coupled section 323 including the tip of the lead-out portion 32 of the antenna device 30 is capacitively coupled to the coupled section 511 disposed in the mounting substrate 50 and connected to the feed line 51 as in the modification of Example 5 (see FIG. 6B). In Example 25, the coupled section 323 of the lead-out portion 32 is smaller than the coupled section 511 of the mounting substrate 50 and is encompassed within the coupled section 511 when viewed in plan. The coupled section 323 of the lead-out portion 32 herein refers to a region including the tip of the lead-out portion 32 and having a facing surface parallel to the coupled section 511.

On the upper face side of the mounting substrate 50, the coupled section 511, which is made of a conductive film, is disposed in the first conductor layer, and the feed line 51 is disposed in the third conductor layer. The coupled section 511 is connected to the feed line 51 via a via conductor 512 between the first and second layers, an inner-layer land 513 in the second layer, another via conductor 512 between the second and third layers, and another inner-layer land 513 in the third layer.

The ground conductor 53 is disposed in the first conductor layer. Each of the ground conductors 59, which are provided as inner layers, are disposed in the corresponding one of the second to fourth conductor layers. Each of the ground conductors 53 and 59 has an opening 514, which encompasses the coupled section 511 when viewed in plan. The coupled section 511, the inner-layer lands 513, and the via conductors 512 are located in the opening 514. The ground conductor 59 in the third layer and the feed line 51 are disposed with a prescribed spacing therebetween. The feed line 51 is a strip line of a triplate structure.

FIG. 45 is a sectional view of part of the antenna device in Example 25. The solder resist film 54 is disposed on the first conductor layer of the mounting substrate 50. Of the faces of the mounting substrate 50, a face (hereinafter referred to as a lower face) opposite to another face facing the coupled section 323 of the lead-out portion 32 has a lower-face ground conductor 59 laid thereon. The ground conductor 53 in the first layer and the ground conductors 59 in the second to fourth layers have the respective openings 514, whereas the lower-face ground conductor 59 does not have the opening 514. Since the ground conductor 59 in the fourth layer has the opening 514, no metal film is disposed between the inner-layer land 513 in the third layer and the lower-face ground conductor 59.

G1 denotes the minimum spacing in the lateral direction between the coupled section 511 and the ground conductor 53 in the first layer. G2 denotes the minimum spacing in the lateral direction between the inner-layer land 513 and the ground conductor 59 in the second layer or the minimum spacing in the lateral direction between the inner-layer land 513 and the ground conductor 59 in the third layer. G3 denotes the minimum spacing in the thickness direction between the inner-layer land 513 in the third layer and the lower-face ground conductor 59. G4 denotes the spacing between the coupled section 323 of the lead-out portion 32 and the coupled section 511 in the mounting substrate 50. The spacing G4 is smaller than any one of the spacings G1, G2, and G3.

The following describes advantageous effects of Example 25.

In Example 25, the feed line 51 and the radiation conductor 31 are electromagnetically coupled to each other without solder therebetween as in the modification of Example 5 (see FIG. 6B). In Example 25, the coupled section 323 is smaller than the coupled section 511 and is encompassed within the coupled section 511 when viewed in plan. With a slight misalignment between the mounting substrate 50 and the antenna device 30 mounted thereon, the coupled section 323 may remain encompassed within the coupled section 511 when viewed in plan. Thus, the strength of the coupling between the coupled sections 323 and 511 remains at a target value despite such a misalignment between the coupled sections 323 and 511. With device-to-device variations in the shape of the lead-out portion 32, the area of the facing surface of the coupled section 323 is to fall within an allowable range so that the coupling between the coupled sections 323 and 511 will remain at the target value.

The dimensions of the coupled sections 323 and 511 viewed in plan are to be determined in accordance with the degree of the positioning accuracy needed for the mounted antenna device 30 and the processing accuracy needed for the lead-out portion 32 so that misalignment of the antenna device 30 and device-to-device variations in the processing of the lead-out portion 32 may be accommodated to a sufficient degree. For example, the maximum circle that can be enclosed within coupled section 511 when viewed in plan is to have a diameter greater than that of the minimum circle that can enclose the coupled section 323. The difference in diameter between these circles is preferably more than or equal to about 50 µm and is more preferably more than or equal to about 100 µm.

In Example 25, the spacing G4 is smaller than any one of the spacings G1, G2, and G3. Device-to-device variations in the spacing G4 may be produced depending on how accurately the antenna device 30 is positioned during mounting or on how accurately the lead-out portion 32 is processed. These device-to-device variations in the spacing G4 have little effect on the state of coupling between the coupled sections 323 and 511 as long as the spacing G4 is smaller than any one of the minimum spacings G1, G2, and G3. The spacings G1 to G4 are to be determined in such a manner as to ensure that the spacing G4, which may vary from device to device, is smaller than any one of the minimum spacings G1, G2, and G3. According to a preferred design, the difference between the spacing G1, G2, or G3 that is smaller than the other two spacings and the spacing G4 is more than or equal to about 1.2 times the spacing G4.

Figure 46A:
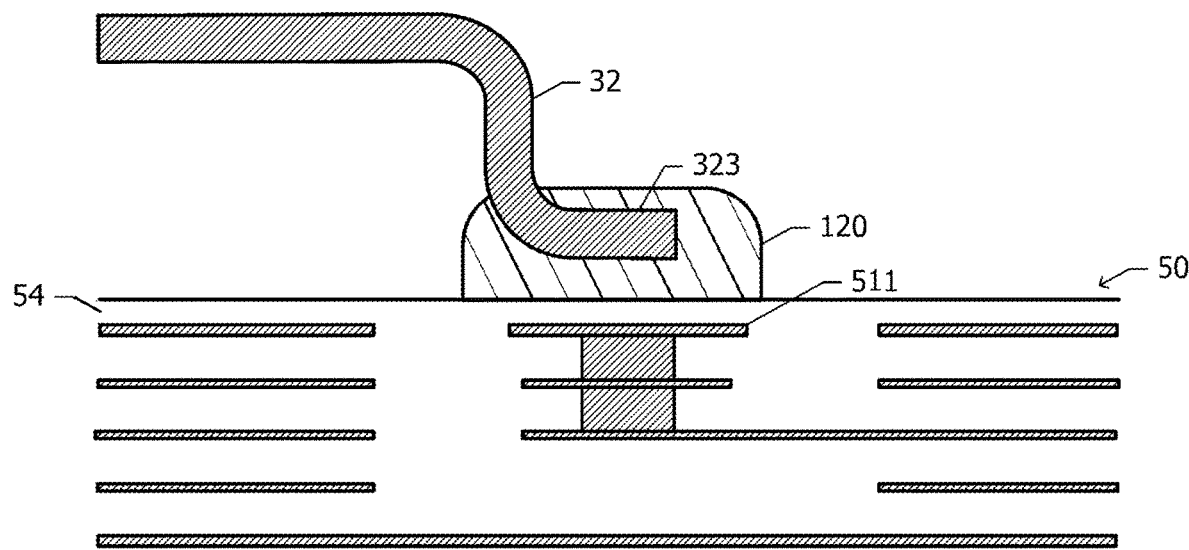
FIG. 46A is a sectional view of part of an antenna device in a modification of Example 25.
Figure 46B:
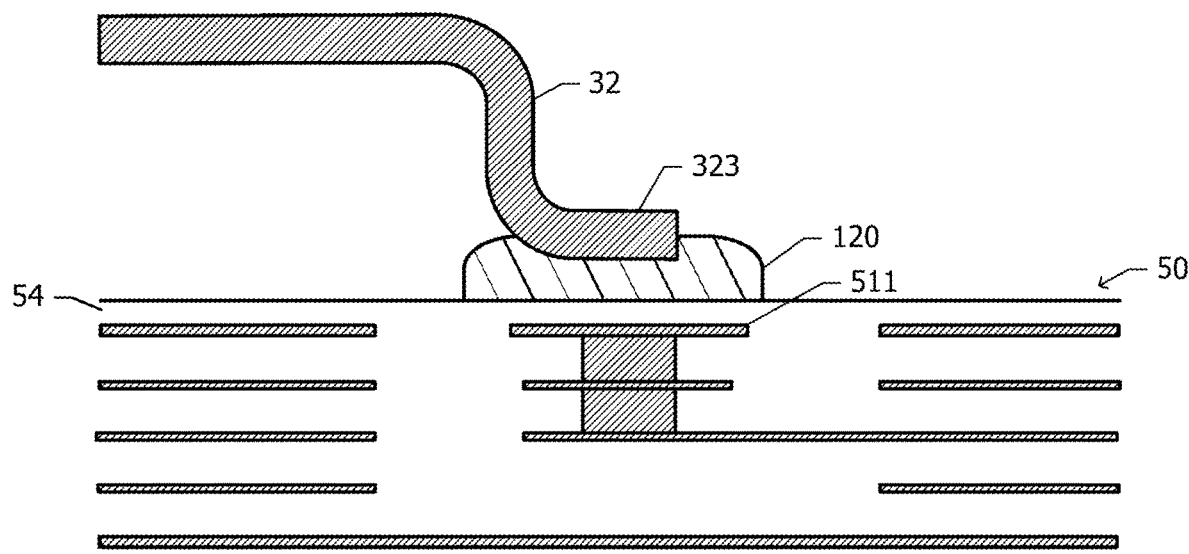
FIG. 46B is a sectional view of part of an antenna device in another modification of Example 25.

The following describes a modification of Example 25 with reference to FIG. 46A and FIG. 46B.

FIG. 46A is a sectional view of part of an antenna device in the modification of Example 25. In Example 25, a gap is provided between the mounting substrate 50 and the coupled section 323 of the antenna device 30. The gap is filled with air. In the modification illustrated in FIG. 46A, meanwhile, the coupled section 323 including the tip of the lead-out portion 32 is fastened to the mounting substrate 50 with an adhesive 120. The coupled section 323 is entirely embedded in the adhesive 120; thus, the space between the coupled section 323 and the mounting substrate 50 is filled with the adhesive 120.

FIG. 46B is a sectional view of part of an antenna device in another modification of Example 25. In the modification illustrated in FIG. 46B, the facing surface of the coupled section 323 is embedded in the adhesive 120, whereas a face (upper face) of the coupled section 323 opposite to the facing surface is exposed outside the adhesive 120. In this modification as well, the spacing between the facing surface of the coupled section 323 and the mounting substrate 50 is filled with the adhesive 120.

In the modifications illustrated respectively in FIGS. 46A and 46B, there is no air in the space between the coupled sections 323 and 511. Instead, the space is filled with the solder resist film 54 and the adhesive 120. The electrostatic capacity between the coupled sections 323 and 511 is greater in these modifications than in Example 25 (see FIGS. 44 and 45). At the same electrostatic capacity, the coupled sections 323 and 511 may be smaller in these modifications than in Example 25. These modifications also produce an advantageous effect that the lead-out portion 32, the tip of which is fastened to mounting substrate 50, is less prone to breakage.

Example 26

Figure 47A:
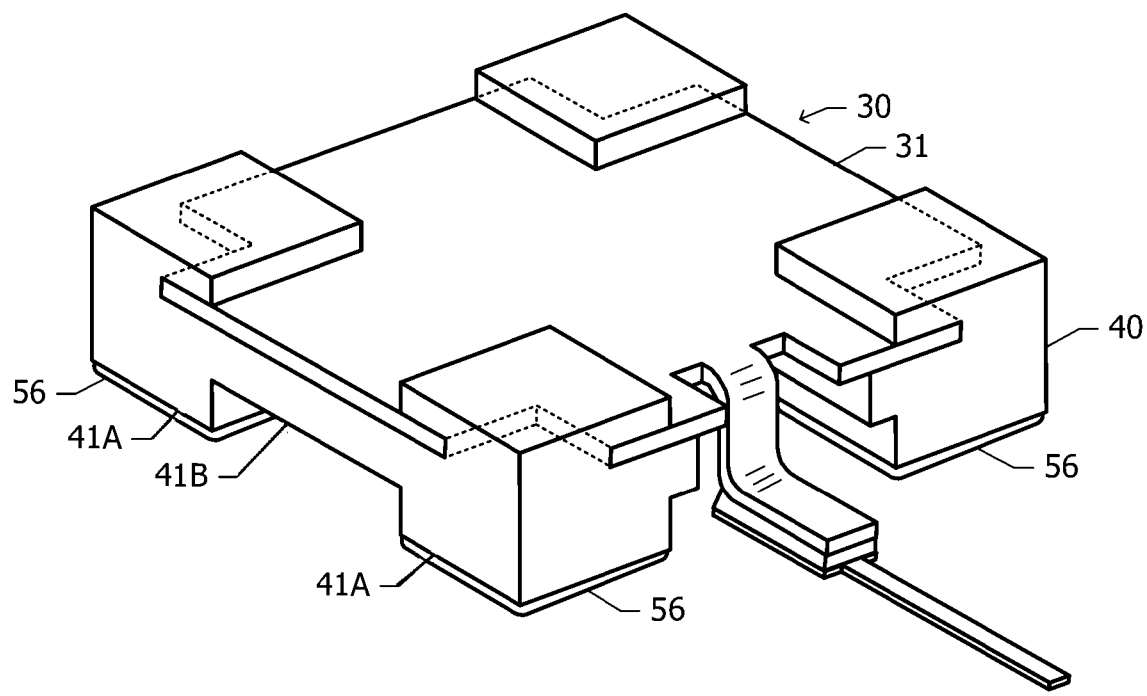
FIG. 47A is a perspective view of an antenna device in Example 26.
Figure 47B:
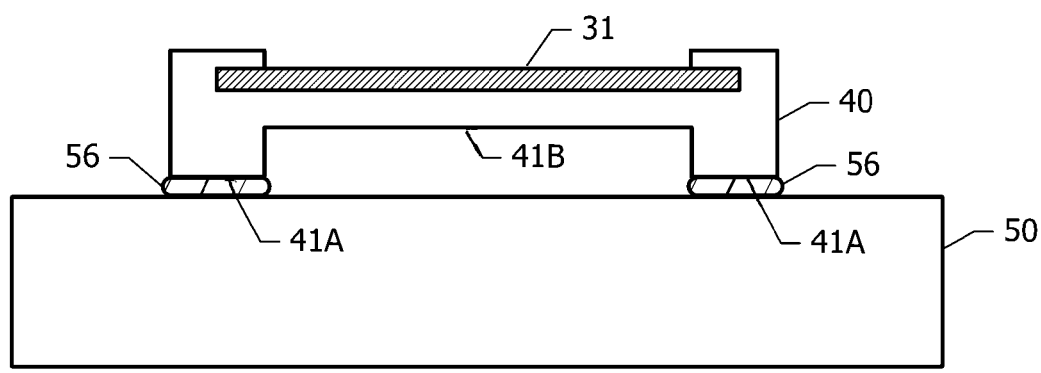
FIG. 47B is a sectional view of the antenna device in Example 26.

The following describes an antenna device in Example 26 with reference to FIGS. 47A and 47B. Configurations common to the antenna device in Example 7 (see FIGS. 9A, 9B, and 9C) and the antenna device in Example 26 will not be further elaborated here.

FIGS. 47A and 47B are a perspective view and a sectional view, respectively, of the antenna device in Example 26. In Example 7 (see FIGS. 9A, 9B, and 9C), an adhesive is applied not to the first regions 41A in the four corners of the dielectric member 40 but to the second region 41B, and the antenna device 30 is then fastened to the mounting substrate 50 with the adhesive. In Example 26, meanwhile, the bottom faces of the first regions 41A in the four corners are coated with the adhesive 56. The antenna device 30 is fastened to the mounting substrate 50 with the adhesive 56. That is, instead of being applied to the second region 41B, which is a relatively low region of the bottom face of the dielectric member 40, the adhesive 56 is applied to the first regions 41A, which are relatively high regions of the bottom face of the dielectric member 40.

The following describes advantageous effects of Example 26.

In Example 7, the thickness of the coating of adhesive would be smaller than the height of each first region 41A with respect to the second region 41B if the amount of adhesive applied to the second region 41B is not enough. This would result in inadequate adhesion. Adhesive in an amount large enough to rise above the bottom faces of the first regions 41A is needed to ensure adequate adhesion. In Example 26, meanwhile, a small amount of adhesive may ensure the adequate fastening of the antenna device 30 to the mounting substrate 50.

Figure 48A:
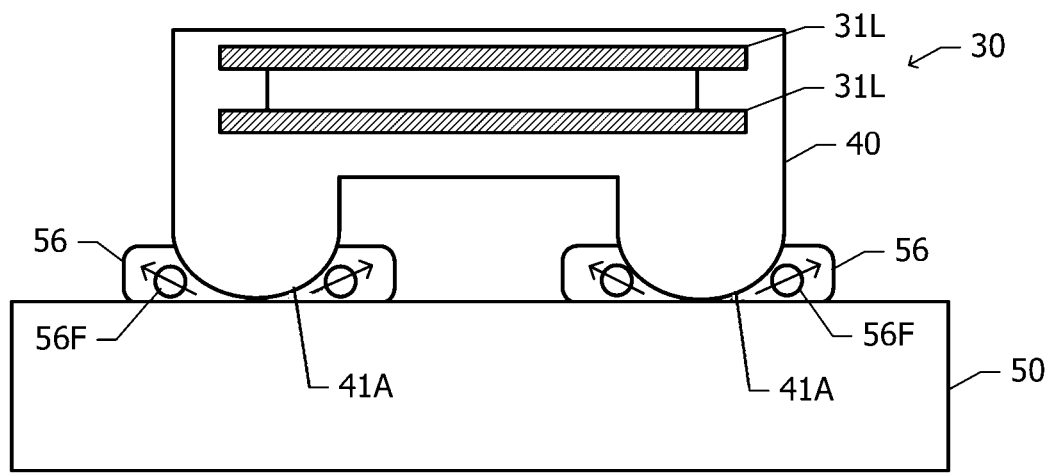
FIG. 48A is a schematic sectional view of an antenna device in a modification of Example 26.
Figure 48B:
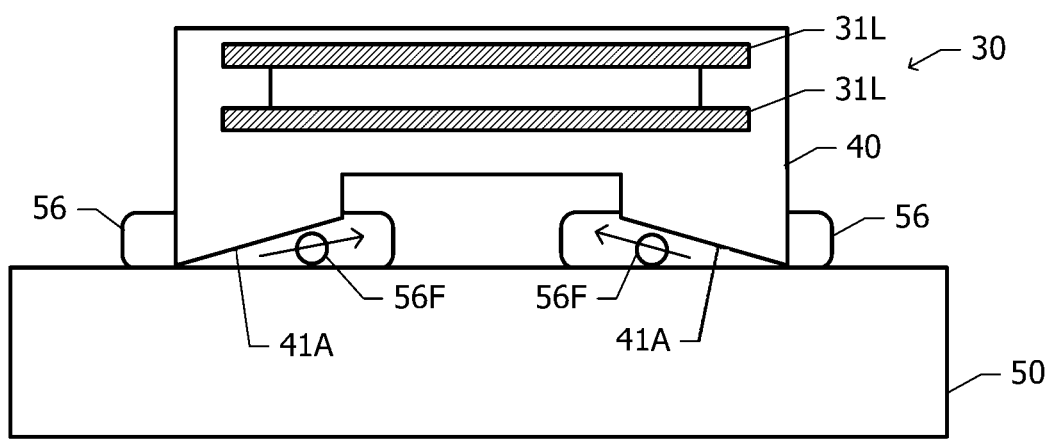
FIG. 48B is a schematic sectional view of an antenna device in another modification of Example 26.

The following describes antenna devices in modifications of Example 26 with reference to FIGS. 48A and 48B. In Example 26, the antenna device 30 includes one radiation conductor 31. Meanwhile, the following describes the modifications in which the antenna device 30 includes two radiation conductors (the radiation conductors 31L and 31U) as in Example 12 (see FIG. 17). It should be noted that the modifications may be implemented in an alternative configuration in which the antenna device 30 includes one radiation conductor 31.

FIG. 48A is a schematic sectional view of an antenna device in the modification of Example 26. In Example 26 (see FIGS. 47A and 47B), the first regions 41A of the bottom face of the dielectric member 40 are parallel to the upper face of the mounting substrate 50. In the modification illustrated in FIG. 48A, meanwhile, each first region 41A is curved like a spherical surface. Each first region 41A is in contact with the mounting substrate 50 substantially at one point. The adhesive 56 contains filler 56F dispersed therein. When the antenna device 30 is pressed against the mounting substrate 50 with the adhesive 56 being located between each first region 41A and the mounting substrate 50, the filler 56F between the first region 41A and the mounting substrate 50 is moved aside from the point at which the first region 41A is in contact with the mounting substrate 50. This makes it easy for the first regions 41A to be in point contact with the mounting substrate 50.

FIG. 48B is a schematic sectional view of an antenna device in another modification of Example 26. In this modification, each first region 41A lies obliquely to the upper face of the mounting substrate 50 and is in line contact with the mounting substrate 50. In this modification as well, the filler 56F is moved aside from the line on which the first region 41A is in contact with the mounting substrate 50. This makes it easy for the first regions 41A to be in line contact with the mounting substrate 50.

The modifications illustrated respectively in FIGS. 48A and 48B produce an advantageous effect that the antenna device 30 has improved evenness in inclination and height owing to the filler 56F moved aside from the points at which the first regions 41A are in contact with the mounting substrate 50 or owing to the filler 56F moved aside from the lines on which the first regions 41A are in contact with the mounting substrate 50.

Example 27

Figure 49:
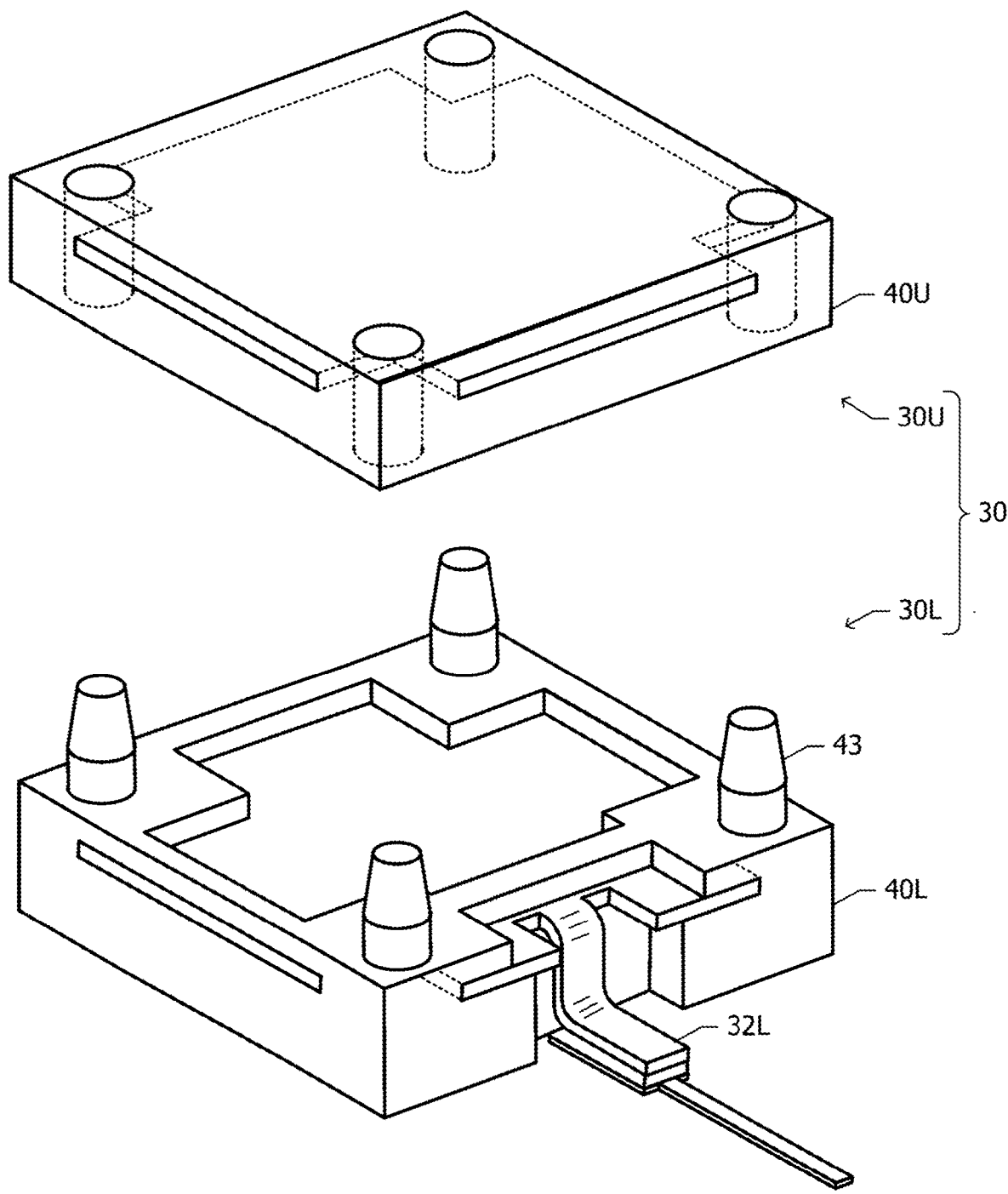
FIG. 49 is an exploded perspective view of an antenna device in Example 27.
Figure 50:
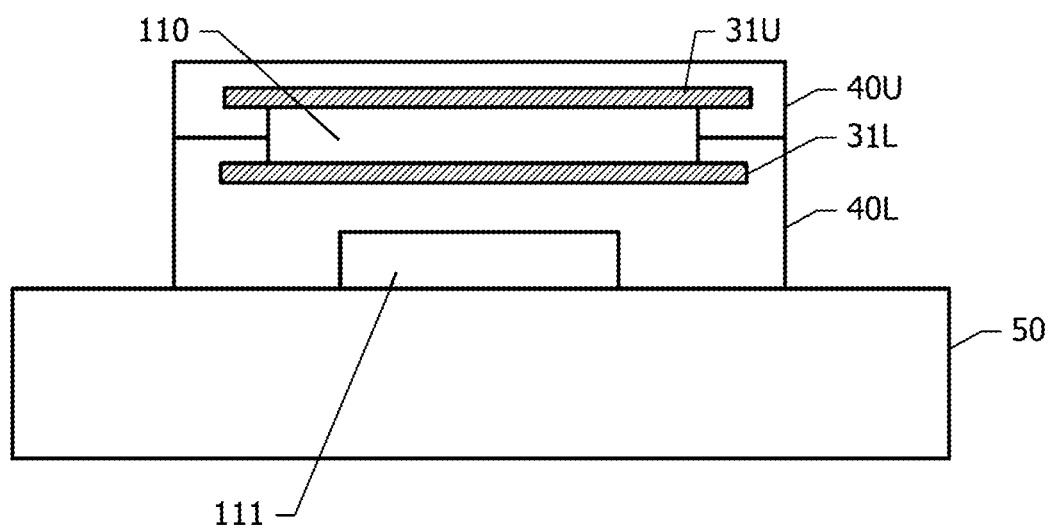
FIG. 50 is a sectional view of the antenna device in Example 27.

The following describes an antenna device in Example 27 with reference to FIGS. 49 and 50. Configurations common to the antenna device in Example 12 (see FIGS. 17, 18A, and 18B) and the antenna device in Example 12 will not be further elaborated here.

FIGS. 49 and 50 are an exploded perspective view and a sectional view, respectively, of the antenna device in Example 27. In Example 12, the cavity (see FIG. 18B) between the radiation conductor 31L on the lower side and the radiation conductor 31U on the upper side communicates with a space outside the antenna device 30. In Example 27, meanwhile, not only the four corners but also the peripheral edge portion of the upper face of the radiation conductor 31L on the lower side are overlaid with the dielectric member 40L on the lower side. The peripheral edge portion of the lower face of the radiation conductor 31U on the upper side is covered with the dielectric member 40U on the upper side. When the upper part 30U is fitted to the lower part 30L, portions being part of the dielectric member 40L on the lower side and covering the peripheral edge portions of the radiation conductor 31L are in contact with the corresponding portions being part of the dielectric member 40U on the upper side and covering the peripheral edge portions of the radiation conductor 31U. Thus, a cavity 110 (see FIG. 50) between the radiation conductor 31L and the radiation conductor 31U is isolated from the outer space.

In Example 7 (see FIGS. 9A, 9B, and 9C), the first regions 41A corresponding to the four corners of the facing surface 41 of the dielectric member 40 are higher than the second region 41B corresponding to the rest of the facing surface 41. Thus, the cavity between the facing surface 41 of the dielectric member 40 and the mounting substrate 50 communicates with the outer space. In Example 27, meanwhile, the entirety of the peripheral edge portion extending in a circumferential direction along the outer periphery of the facing surface 41 of the dielectric member 40L on the lower side is a protruding region and the inner region of the facing surface 41 is a recessed region. Thus, a cavity 111 (see FIG. 50) between the facing surface 41 of the dielectric member 40L on the lower side and the mounting substrate 50 is isolated from the outer space. The cavities 110 and 111 isolated from the outer space does not need to ensure the degree of airtightness that prevents entry of air. It is only required that the cavities 110 and 111 be isolated in such a manner as to block the entry of microparticles and foreign matter.

The following describes advantageous effects of Example 27.

In Example 27, foreign matter in the outer space is less likely to enter the cavity 110 or 111. The variability of antenna characteristics that would be otherwise caused by the entry of foreign matter into the cavity 110 or 111 may be eliminated or reduced accordingly.

These examples are merely illustrative. Needless to say, partial replacements or combinations of configurations illustrated in different examples are possible. Not every example refers to actions and effects caused by similar configurations. Furthermore, the present disclosure is not intended to be limited to the above-described examples. For example, it will be obvious to those skilled in the art that various changes, improvements, combinations, and the like may be made.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An antenna device comprising:
    a radiation conductor constructed of a metal plate having a pair of main surfaces pointing in opposite directions, each main surface of the pair of main surfaces including a first surface region, the first surface region including at least a part of a peripheral edge portion of the main surface, at least one main surface of the pair of main surfaces including a second surface region, the second surface region being a region other than the first surface region;
    a dielectric member holding the radiation conductor in such a manner that the first surface region of each main surface of the pair of main surfaces is sandwiched between portions of the dielectric member in a thickness direction of the radiation conductor; and
    a housing supporting and accommodating the dielectric member,
    wherein the second surface region of the at least one main surface is exposed to air.

2. The antenna device according to claim 1, wherein
    the housing includes a plurality of claws protruding from the housing, and
    the dielectric member is supported by the housing in such a manner as to be clamped with the plurality of claws.

3. The antenna device according to claim 1, wherein the dielectric member is supported by the housing in such a manner as to be embedded in the housing.

4. The antenna device according to claim 1, further comprising a mounting substrate accommodated in the housing, wherein
    the dielectric member supports a ground conductor, the ground conductor being disposed between the radiation conductor and the mounting substrate and having a slot,
    the mounting substrate includes a feed line, and
    the radiation conductor is slot-coupled to the feed line through the slot.

5. The antenna device according to claim 1, further comprising a mounting substrate accommodated in the housing, wherein
    the mounting substrate includes a ground conductor and a feed line, the ground conductor being disposed between the radiation conductor and the feed line and having a slot, and
    the radiation conductor is slot-coupled to the feed line through the slot.

6. The antenna device according to claim 1, wherein the dielectric member covers a region extending from the first surface region of one main surface of the pair of main surfaces across end faces of the radiation conductor to the first surface region of the other main surface.

7. The antenna device according to claim 6, wherein regions being a part of the end faces of the radiation conductor and covered with the dielectric member are positioned in such a manner that the radiation conductor is fastened to the dielectric member in a given direction orthogonal to the thickness direction of the radiation conductor.

8. An antenna module comprising:
the antenna device according to claim 1; and
a radio-frequency integrated circuit element accommodated in the housing to supply radio-frequency signals to the radiation conductor or to receive radio-frequency signals from the radiation conductor.

9. A communication apparatus comprising:
the antenna module according to claim 8; and
a baseband integrated circuit element accommodated in the housing to supply intermediate-frequency signals or baseband signals to the radio-frequency integrated circuit element.

10. The communication apparatus according to claim 9, wherein the housing is a display casing accommodating a display of a head-mounted display.

11. The antenna device according to claim 2, further comprising a mounting substrate accommodated in the housing, wherein
the dielectric member supports a ground conductor, the ground conductor being disposed between the radiation conductor and the mounting substrate and having a slot,
the mounting substrate includes a feed line, and
the radiation conductor is slot-coupled to the feed line through the slot.

12. The antenna device according to claim 3, further comprising a mounting substrate accommodated in the housing, wherein
the dielectric member supports a ground conductor, the ground conductor being disposed between the radiation conductor and the mounting substrate and having a slot,
the mounting substrate includes a feed line, and
the radiation conductor is slot-coupled to the feed line through the slot.

13. The antenna device according to claim 2, further comprising a mounting substrate accommodated in the housing, wherein
the mounting substrate includes a ground conductor and a feed line, the ground conductor being disposed between the radiation conductor and the feed line and having a slot, and
the radiation conductor is slot-coupled to the feed line through the slot.

14. The antenna device according to claim 3, further comprising a mounting substrate accommodated in the housing, wherein
the mounting substrate includes a ground conductor and a feed line, the ground conductor being disposed between the radiation conductor and the feed line and having a slot, and
the radiation conductor is slot-coupled to the feed line through the slot.

15. The antenna device according to claim 2, wherein the dielectric member covers a region extending from the first surface region of one main surface of the pair of main surfaces across end faces of the radiation conductor to the first surface region of the other main surface.

16. The antenna device according to claim 3, wherein the dielectric member covers a region extending from the first surface region of one main surface of the pair of main surfaces across end faces of the radiation conductor to the first surface region of the other main surface.

17. The antenna device according to claim 4, wherein the dielectric member covers a region extending from the first surface region of one main surface of the pair of main surfaces across end faces of the radiation conductor to the first surface region of the other main surface.

18. The antenna device according to claim 5, wherein the dielectric member covers a region extending from the first surface region of one main surface of the pair of main surfaces across end faces of the radiation conductor to the first surface region of the other main surface.

19. An antenna module comprising:
the antenna device according to claim 2; and
a radio-frequency integrated circuit element accommodated in the housing to supply radio-frequency signals to the radiation conductor or to receive radio-frequency signals from the radiation conductor.

20. An antenna module comprising:
the antenna device according to claim 3; and
a radio-frequency integrated circuit element accommodated in the housing to supply radio-frequency signals to the radiation conductor or to receive radio-frequency signals from the radiation conductor.

* * * * *